United States Patent
Eastburn et al.

[11] Patent Number: 5,831,851
[45] Date of Patent: Nov. 3, 1998

[54] APPARATUS AND METHOD FOR CONTROLLING HIGH THROUGHPUT SPUTTERING

[75] Inventors: Lindsey Eastburn, Pleasanton; Leon Mass, Cupertino, both of Calif.

[73] Assignee: Seagate Technology, Inc., Scotts Valley, Calif.

[21] Appl. No.: 407,826

[22] Filed: Mar. 21, 1995

[51] Int. Cl.$^6$ .................... G05B 19/18; G06F 19/00
[52] U.S. Cl. .................. 364/167.01; 364/468.21; 364/468.26; 364/469.02
[58] Field of Search .................. 364/500, 167.01, 364/468.25, 468.26, 468.27, 469.02, 468.24, 468.2, 468.21, 469.01

[56] References Cited

U.S. PATENT DOCUMENTS

| | | |
|---|---|---|
| 4,643,629 | 2/1987 | Takahashi et al. ............... 414/331 |
| 4,663,009 | 5/1987 | Bloomquist ..................... 204/192.2 |
| 4,774,757 | 10/1988 | Sakamoto et al. . |
| 4,858,556 | 8/1989 | Siebert ........................... 118/664 |
| 4,864,536 | 9/1989 | Lindmayer ........................ 365/119 |
| 4,879,644 | 11/1989 | Gottshall . |
| 5,062,771 | 11/1991 | Satou et al. ..................... 417/201 |
| 5,291,416 | 3/1994 | Hutchins . |

FOREIGN PATENT DOCUMENTS

| | | |
|---|---|---|
| 40 17 888 C1 | 10/1991 | Germany . |
| 2146795 | 4/1985 | United Kingdom . |

*Primary Examiner*—Paul P. Gordon
*Attorney, Agent, or Firm*—Fliesler, Dubb, Meyer & Lovejoy LLP

[57] ABSTRACT

A control system for a film deposition apparatus having a plurality of processing chambers. The control system includes a plurality of control processors, each of the plurality of processors including a memory, being coupled to a subset of the plurality of chambers and controlling processing in said subset of the plurality of chambers. Each processor includes a data structure, provided in said memory, having configuration data for said plurality of processing chambers, and control routines for controlling processing in the apparatus. In a second aspect, the system includes a facility for determining the position of the substrate in the system. The transport system of the deposition apparatus includes hardware position sensors which indicate the presence or absence of a substrate at said sensor. The facility determines the position of substrates when the output of one or more of the hardware sensors is unavailable. The facility determines substrate position based on the output of one or more other sensors which provide a known position of the substrate, encoder data, and the rate of movement of the substrate at each transport stage of the system.

28 Claims, 47 Drawing Sheets

| CONTROLLER | CHAMBER | VENT VALVE | ROUGH VALVE | HI VAC | DRO | DRI | ADJ | STAT | DYN | CONFIG[ ] |
|---|---|---|---|---|---|---|---|---|---|---|
| MINT B | CHAMBER 1 | • | | | | | | | | 218 |
| | CHAMBER 2 | | • | • | • | • | | • | | 50 |
| | CHAMBER 3 | | | • | • | | | • | | 50 |
| | CHAMBER 4 | | | • | | | | • | | 34 |
| MINT C | CHAMBER 5 | • | • | • | • | • | • | | | 252 |
| | CHAMBER 6 | | | • | | | • | | | 36 |
| | CHAMBER 7 | | | • | | | • | | | 36 |
| | CHAMBER 8 | | | | | | | | | 1 |
| MINT D | CHAMBER 9 | • | • | • | • | • | • | | | 252 |
| | CHAMBER 10 | | | | | | | | • | 1 |
| | CHAMBER 11 | | | • | | | • | | | 36 |
| | CHAMBER 12 | | | • | | | | | • | 33 |
| | CHAMBER 13 | • | | • | • | • | • | • | | 250 |
| | CHAMBER 14 | | | | | | | | • | 36 |
| MINT E | CHAMBER 15 | | | | | | | | • | 1 |
| | CHAMBER 16 | | | • | | | • | | • | 36 |
| | CHAMBER 17 | | | • | • | | | • | | 50 |
| | CHAMBER 18 | | | | | • | | • | | 42 |
| | CHAMBER 19 | | | | | • | | • | | 42 |
| | CHAMBER 20 | • | • | • | • | • | | • | | 218 |

CONFIG TABLE

FIG. 5

| bit | STATUS[n] | COMMENTS |
|---|---|---|
| bit 0 | Waiting IN (WTI) | |
| bit 1 | Load Request | |
| bit 2 | Stop Request | |
| bit 3 | Waiting OUT (WTO) | |
| bit 4 | Unload request | |
| bit 5 | Open (1) / Close (0) DRI Request | |
| bit 6 | Open (1) / Close (0) DRO Request | |
| bit 7 | Enable to open DRI | |
| bit 8 | Enable to open DRO | |
| bit 9 | Process bit | |
| bit 10 | Pause Request bit | |
| bit 11 | Atmosphere Pressure | |
| bit 12 | Low Vacuum | |
| bit 13 | Mid Vacuum | |
| bit 14 | High Vacuum | |
| bit 15 | | |
| bit 16 | Rough Valve portial permissive | |
| bit 17 | Vent Valve portial permissive | |
| bit 18 | Mode bit | |
| bit 19 | Mode bit | |
| bit 20 | DRI Open limit switch | |
| bit 21 | DRI Close limit switch | |
| bit 22 | DRO Open limit switch | |
| bit 23 | DRO closed limit switch | |
| bit 24 | SEN INP | |
| bit 25 | SEN MID | |
| bit 26 | SEN OUT | |
| bit 27 | HiVac Closed limit switch | |

STATUS TABLE

FIG. 6

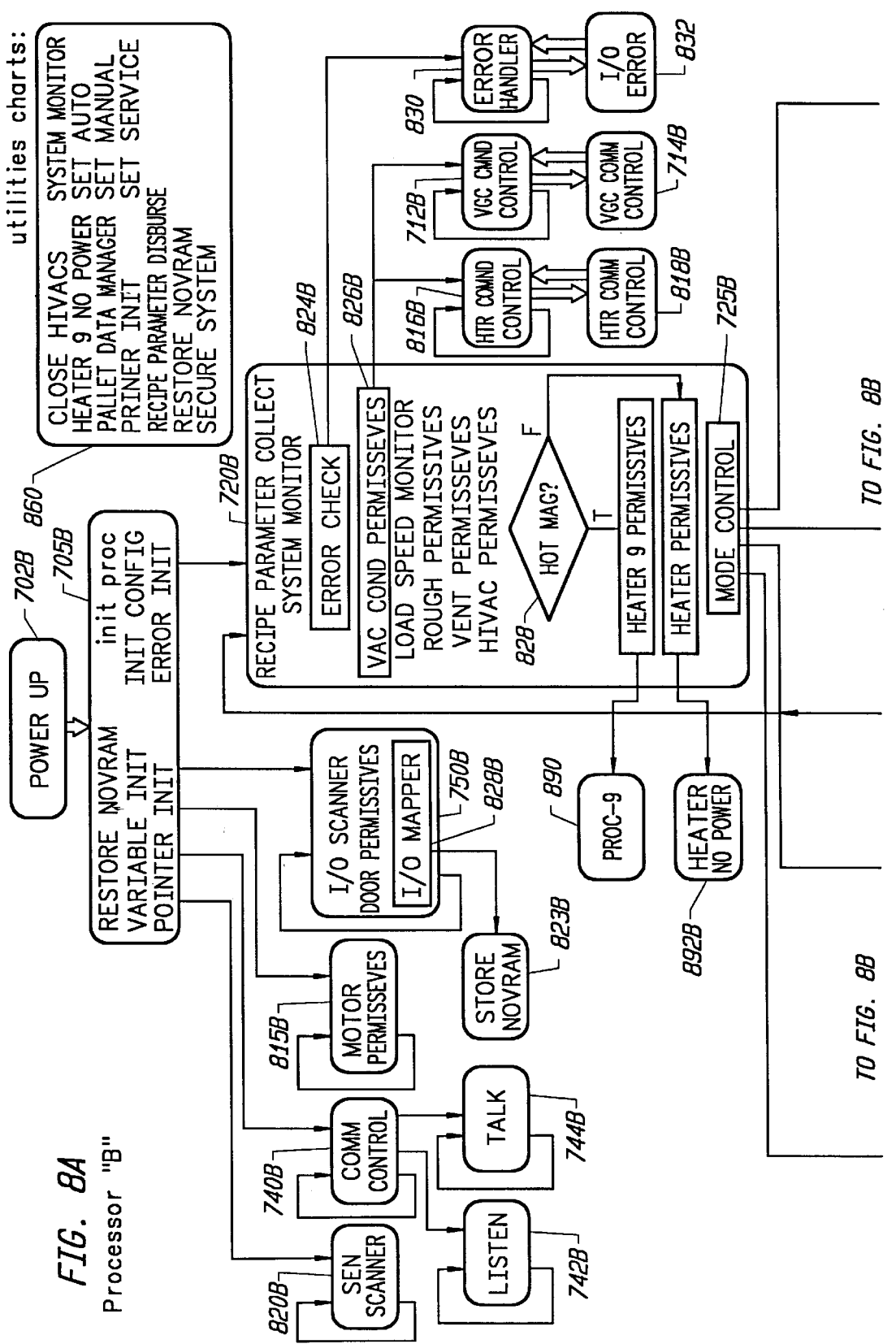

Processor "C"

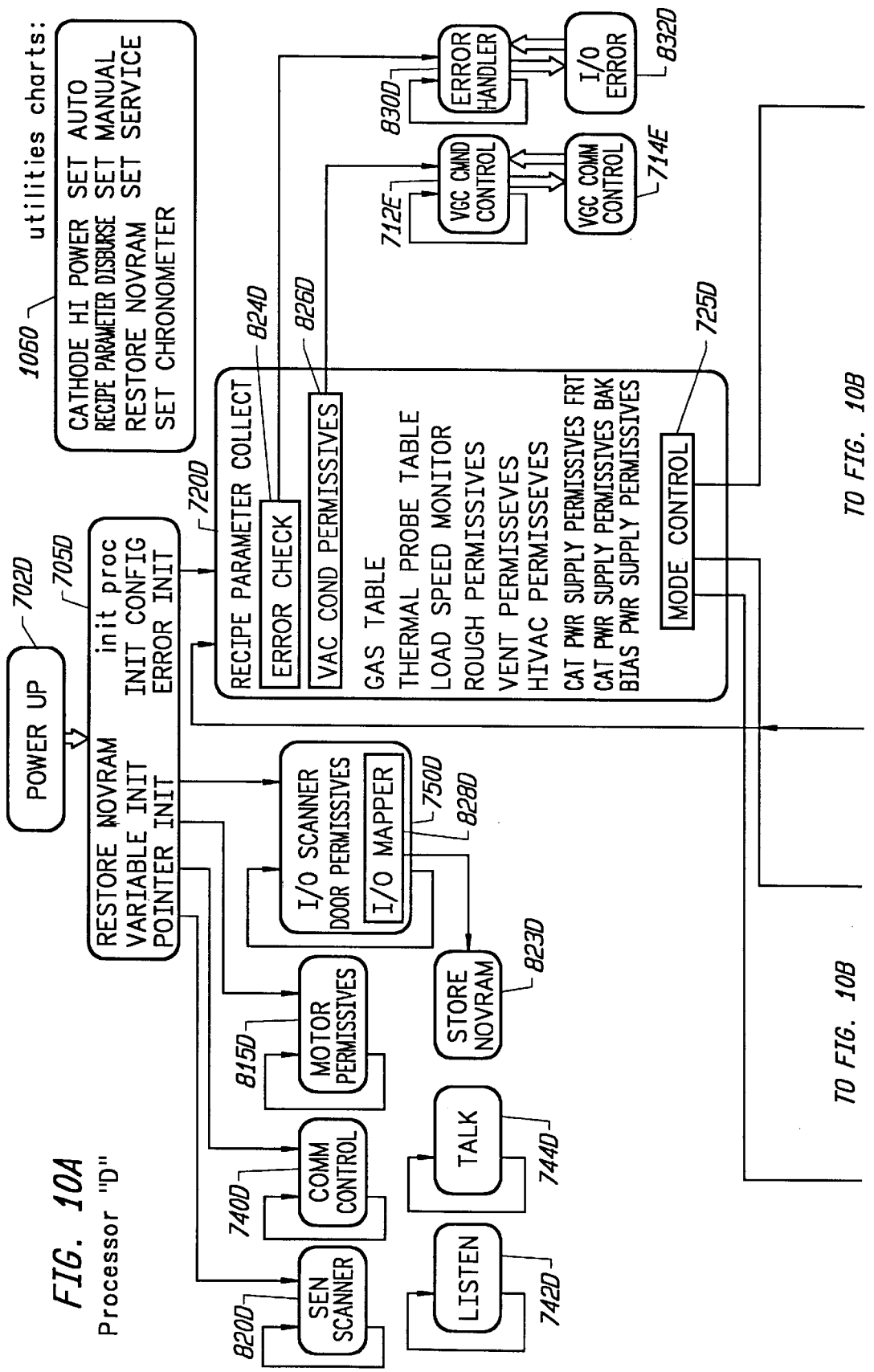
FIG. 10A Processor "D"

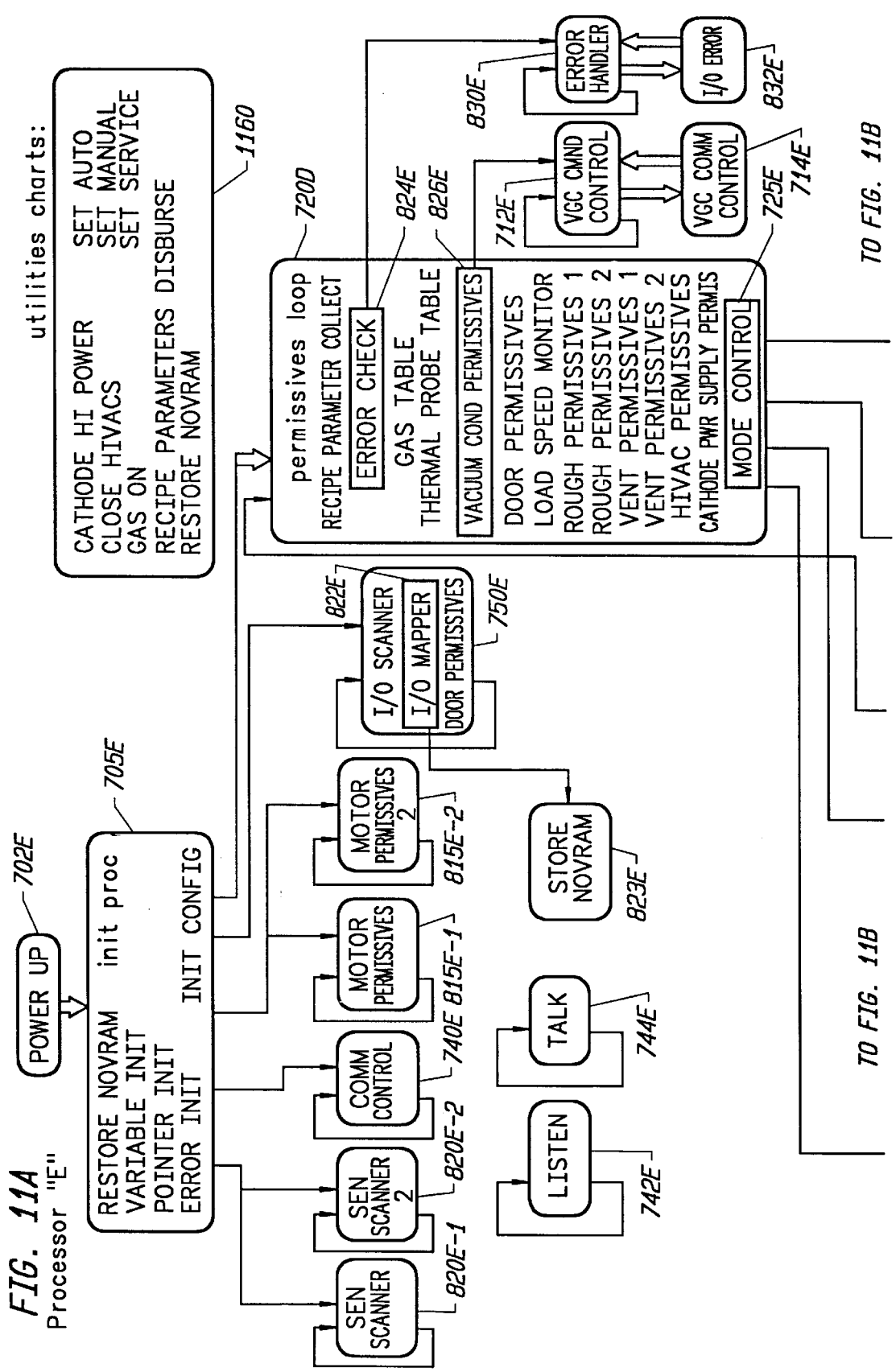

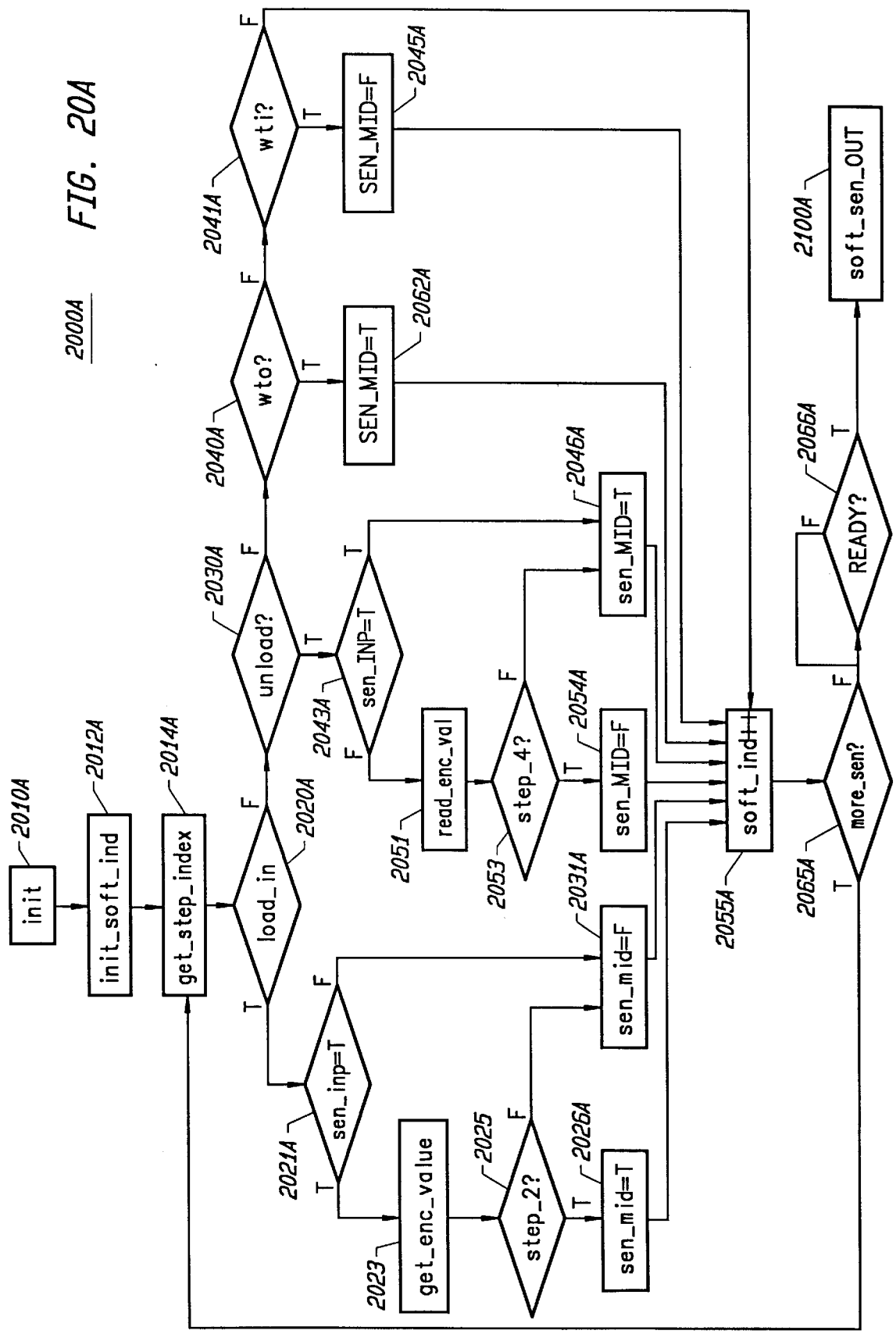

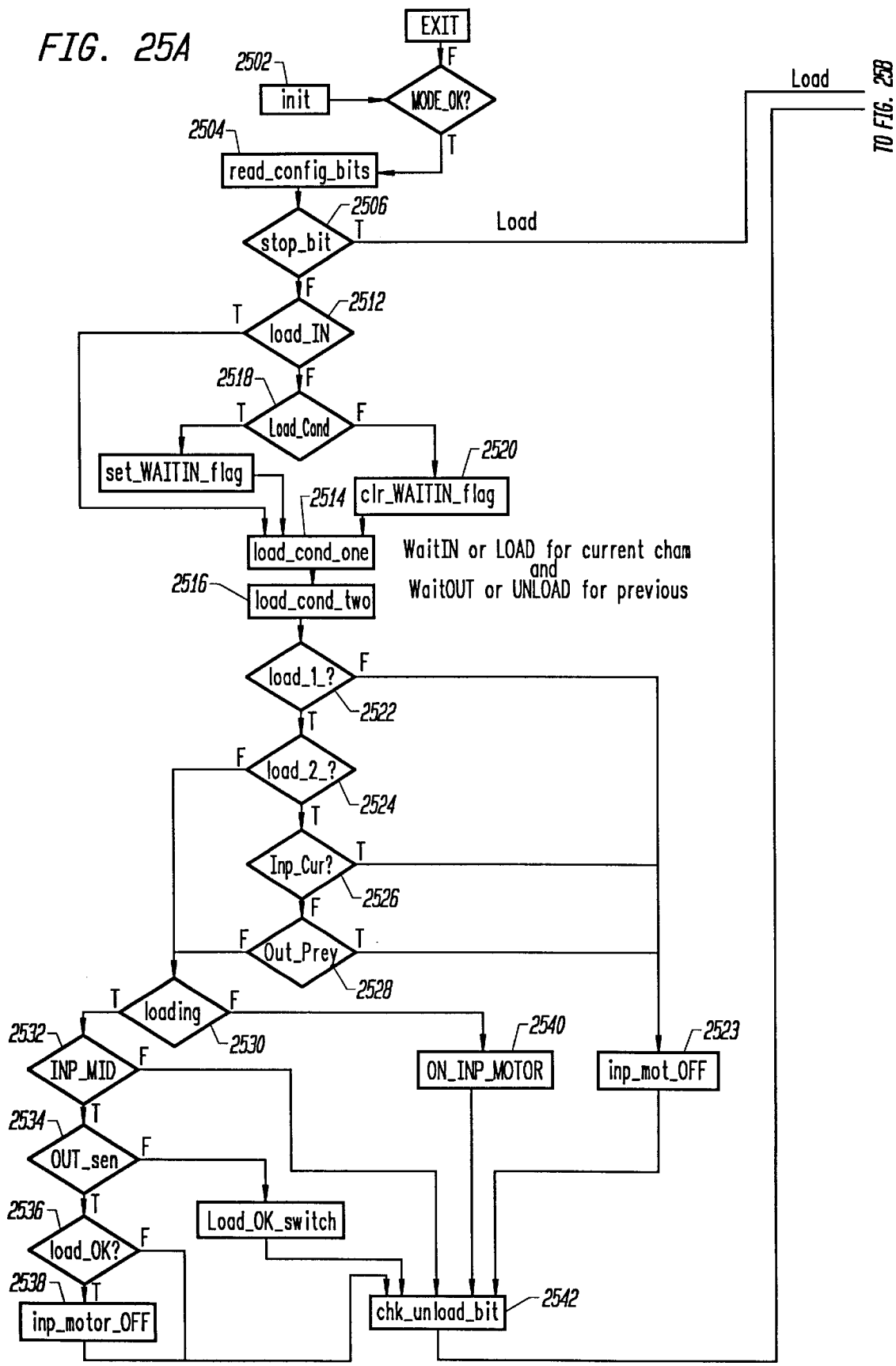

APPARATUS AND METHOD FOR CONTROLLING HIGH THROUGHPUT SPUTTERING

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

CROSS-REFERENCE TO RELATED APPLICATIONS

APPARATUS AND METHOD FOR HIGH THROUGHPUT SPUTTERING, Ser. No. 08/552,250, filed Nov. 2, 1995, which is a file wrapper continuation of Ser. No. 08/121,959, filed Sep. 15, 1993 now abandoned, which is a file wrapper continuation of application Ser. No. 07/681,866, filed Apr. 4, 1991, pending, inventors Dennis R. Hollars, Delbert F. Waltrip, Robert B. Zubeck, Josef Bonigut, Robert M. Smith, Gary L. Payne, assigned to the assignee of the present application.

APPARATUS AND METHOD FOR SPUTTERING CARBON, Ser. No. 08/311,529, filed Sep. 23, 1994, inventors Taesun E. Kim, Hyung J. Lee, Yao-Tzung R. Shih, John C. Bruno, Robert B. Zubeck, Dennis R. Hollars, assigned to the assignee of the present application isssued on May 16, 1997.

Each of the aforementioned applications is hereby specifically incorporated by reference into the present application.

FIELD OF THE INVENTION

The invention relates to controlling an apparatus and method for depositing multilayer thin films in a sputtering process. More particularly, the invention relates to a control system for an in-line sputtering apparatus.

BACKGROUND OF THE INVENTION

Sputtering is a well-known technique for depositing uniform thin films on a particular substrate. Sputtering is performed in an evacuated chamber using an inert gas, typically argon, with one or more substrates remaining static during deposition, being rotated about the target (a "planetary" system) or being transported past the target (an "in-line" system).

In addition to achieving high film deposition rates, sputtering offers the ability to tailor film properties to a considerable extent by making minor adjustments to process parameters.

Generally, prior art sputtering devices utilize centralized control systems for controlling the sputtering processes occurring therein. Such control systems may comprise standard optical or electrical metering monitored by a system operator, with direct electrical or electro-mechanical switching of components utilized in the system by the system operator or a central control processor. Such systems have been adequately successful for limited throughput of sputtered substrates. However, a more comprehensive system is required for higher throughput sputtering operations. Specifically, a control system is required which provides to the operator an extensive amount of information concerning the ongoing process through a relatively user-friendly environment. In addition, the control system must adequately automate functions both in series and in parallel where necessary to control every aspect of the sputtering system. Further, it is desirable to include within such a control system the capability to preset a whole series of operating parameters to facilitate rapid set-up of the system for processes employing myriad sputtering conditions.

In general, an in-line sputtering apparatus is described in Applicants' co-pending application Ser. No. 08/121,959 (abandoned), the parent of which (Ser. No. 07/681,866) pending was published under the Patent Cooperation Treaty as International Application Serial No. PCT/US92/00722.

In application Ser. No. 08/121,959 (now abandoned), a control system is described wherein a central processing unit is utilized in conjunction with a programmable logic controller to centrally coordinate the motion and deposition processes in the in-line sputtering device.

The in-line sputtering system described in Applicants' co-pending application generally includes a number of process chambers, for sputtering a multi-layer coating onto a plurality of substrates carried in a pallet. The pallets are transported through the system using a transport mechanism which includes a plurality of motors and transport stages, each motor controlling the transport speed at each stage so that the speed of a particular pallet may be varied as it is processed through the system. Isolation doors separate each of the process chambers and are generally under the control of the control system. A heating subsystem is utilized to increase the temperature of the substrates prior to sputtering. The heating improves the deposition characteristics of the sputtered films onto the substrates. A pumping system is utilized to evacuate the process chambers to a pressure which is in a range of about $1 \times 10^{-7}$–$1 \times 10^{-10}$ Torr which is suitable for enabling sputtering operations. A network of valves is utilized between the mechanical and/or turbo pumps from the process chambers. Control of the position and flow rates for each of the valves can be automated and directed by the control system.

In a high throughput sputtering apparatus described in co-pending application Ser. No. 08/121,959 (now abandoned), a control system which is comprehensive and which operates at a short recycle time is necessary to ensure high throughput of the system. This is necessary to coordinate all the components of the various subsystems which must operate in conjunction with each other to provide high output for the system.

A further desirable aspect of the system with as many chambers as that described in Applicants' co-pending application Ser. No. 08/121,959 (now abandoned) is for an expandable, modular control system which allows for changes in the mechanics and the use of the processing chambers. For example, if one is desirous of adding yet another process chamber to the system, it is desirable that the control system might be easily adapted to insert the addition of control algorithms for controlling the particular processes.

SUMMARY OF THE INVENTION

The invention comprises a control system for a film deposition apparatus having a plurality of processing chambers. The control system includes a plurality of control processors, each of the plurality of processors including a memory, being coupled to a subset of the plurality of chambers and controlling processing in said subset of the plurality of chambers. Each processor includes a data structure, provided in said memory, having configuration data for said plurality of processing chambers. Generally, the deposition apparatus may comprise an in-line sputtering machine having an input end, an output end, with the plurality of processing chambers between the input end and the output end, a pumping system, a heating system, a transport system, and a sputtering gas control system, the transport system including a plurality of position sensors. Each said system cooperates to process a plurality of substrates as the substrates pass from the input end to the output end. A network hub, coupled to the control processors, may also be provided.

In a second aspect, the system includes a facility for determining the position of the substrate in the system. The transport system of the deposition apparatus includes hardware position sensors which indicate the presence or absence of a substrate at said sensor. The facility determines the position of substrates when the output of one or more of the hardware sensors is unavailable. The facility determines substrate position based on the output of one or more other sensors which provide a known position of the substrate and the rate of movement of the substrate at each transport stage of the system.

The present invention thus provides a highly modular and flexible control system with distributed processing to increase processing efficiency.

Another advantage of the present invention is that it provides a control system for a deposition apparatus which utilizes a plurality of different processors, each processor being dedicated to control a particular portion of the machine, rather than a particular subsystem of the machine.

Yet another advantage of the invention is that the control system allows software overriding of hardware data input such that, upon failure of a given hardware component, a software notification will be made to the system operator to allow the system operator to choose between replacing the hardware component upon failure, or overriding the input signal from the hardware component until repair can be made at a later time.

BRIEF DESCRIPTION OF THE DRAWINGS

The invention will be better understood by reference to the figures of the drawings wherein like numbers denote like parts throughout and wherein:

FIG. 5 is a representation of a configuration table utilized by the software of the present invention to store the configuration of each chamber utilized in the sputtering apparatus.

FIG. 6 is a representation of a dynamic status table for a given chamber N, which is used to manage the state of the chamber during processing of substrates in the sputtering apparatus.

FIGS. 8A and 8B are flow diagrams of the functional control routines utilized by a second processor, processor B, in the control system of the present invention.

FIGS. 10A and 10B are flow diagrams of the functional control routines utilized by a fourth processor, processor D, in accordance with the present invention.

FIGS. 11A and 11B are flow diagrams of the functional control routines utilized by a fifth processor, processor E, in accordance with the present invention.

FIGS. 20A and 20B are flow diagrams of an encoder version and timer version, respectively, of the substrate position sensor software override routine for the position sensor at the midpoint of a given chamber.

FIGS. 25A and 25B are flow charts of the process steps for correcting the location of a substrate in the load lock chamber in the control system of the present invention.

DESCRIPTION OF THE PREFERRED EMBODIMENT

The invention will be described herein with respect to controlling an in-line apparatus and method for applying multilayer thin films to a substrate. The invention is particularly useful in controlling such an apparatus in accordance with the teachings of application Ser. No. 08/121,959 (abandoned), as such apparatus is capable of applying the multilayer coatings to a substrate within a time frame of less than five minutes.

However, it should be understood that the control system described herein is not limited to in-line systems, nor to systems using sputtering as a method of film deposition, but could be utilized with other various types of processing systems.

The comprehensive in-line sputtering system disclosed in application Ser. No. 08/121,959 (abandoned) utilizes matched hardware component elements to process multiple large single sheet or pallet transported discrete substrates in a continuous, variable speed, sputtering process wherein each substrate has a start-to-finish process time which is relatively constant. The control system described therein optimizes processing by simultaneously controlling a vacuum pump system, a transport system, a heating system, and a power supply system which provides power to sputtering cathode targets, as the system moves pallets through a series of substantially isolated, non-crosscontaminating sputtering steps.

Figure 1:
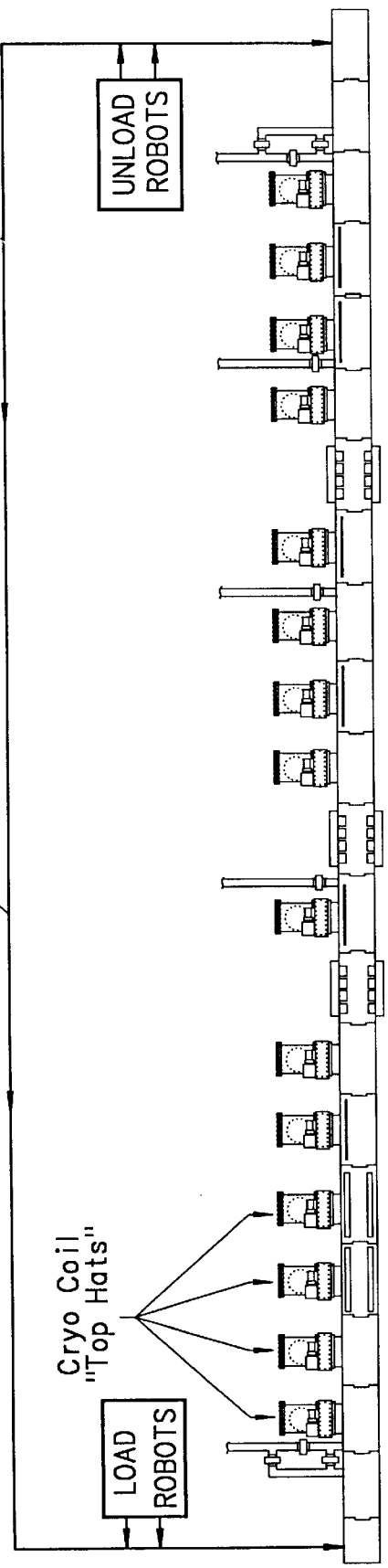
FIG. 1 is a top view of a sputtering apparatus suitable for use with the present invention.
Figure 2:
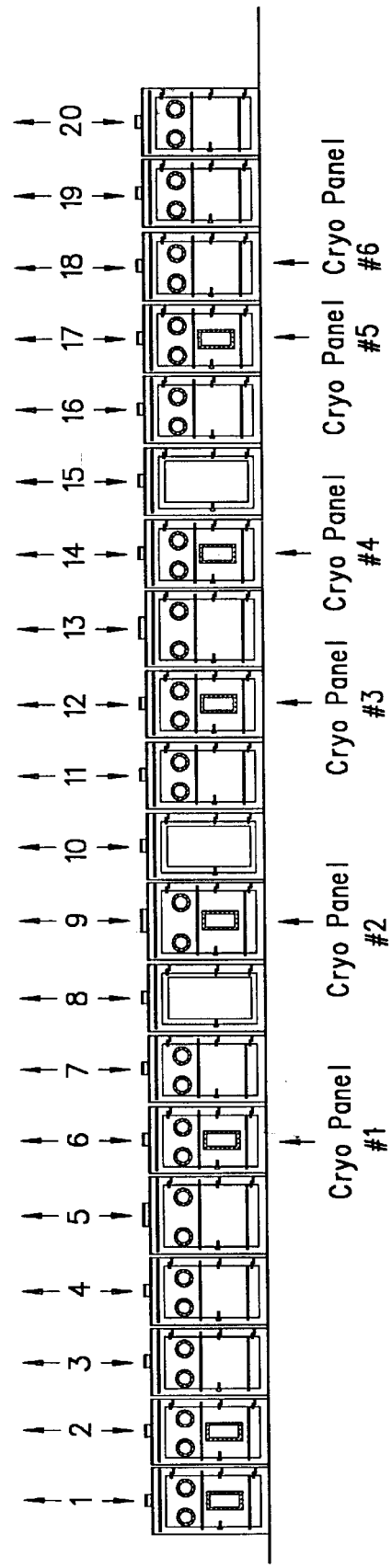
FIG. 2 is a side view of the apparatus shown in FIG. 1.

An exemplary deposition apparatus 100, similar to that disclosed in application Ser. No. 08/121,959 (abandoned) is shown in FIGS. 1 and 2. In general, the steps involved in depositing films on a substrate by sputtering include providing substrates in an evacuated system wherein chambers of the sputtering system are maintained at a pressure of approximately $1 \times 10^{-7} - 9 \times 10^{-7}$ Torr and backfilled with a suitable sputtering gas, such as argon; heating the substrates to a temperature conducive to optimal film deposition; and sputtering the films to be deposited on the substrates.

The electronic control system for deposition apparatus 100 provides one or more system operators with the means to comprehensively and efficiently control production throughput, applied sputtering power, and other sputtering apparatus parameters. The electronic control system is preferably programmable to allow a plurality of different operating parameter settings to be stored for each of the adjustably controlled elements of the sputtering process. Thus, the electronic control system generally performs two major functions: (1) monitoring deposition apparatus 100 by reading data input from the hardware of deposition apparatus 100, and providing status data to the system operator; and (2) controlling the sputtering process by automatically generating control signals to deposition apparatus 100.

As used herein, the term "substrate" generally refers to a disk substrate to which magnetic and coating films are applied and the term "pallet" refers to a disk carrier, such as those disclosed in application Ser. No. 08/121,959 (abandoned). As such, a number of substrates may be transported on a pallet and a number of pallets transported through the system. However, it should be understood that the terms "substrate" and "pallet" should not be read as limiting the use of the invention described herein to a pallet carrying multiple substrates. The invention, and apparatus 100, may, for example, be utilized to process a single sheet, planar substrate, such as glass, with films being applied directly thereto.

Deposition apparatus 100, used to apply a single or multilayer film to one or more substrates, will be discussed with reference to FIGS. 1 and 2.

Generally, substrates are provided through multiple sputtering chambers 8, 10, and 15 in apparatus 100 at a rate of speed ranging from about 3–6 feet/minute, in an evacuated environment after having been heated by soak heater chamber 4 and passby heater chamber 5. The apparatus may transport substrates at speeds from 0–12 feet per minute.

While the deposition apparatus 100 described in application Ser. No. 08/121,959 (abandoned) includes seventeen (17) chamber modules, apparatus 100 includes 20 chamber modules generally comprised of two basic types: process modules and pumping modules, each having similar construction.

Isolation doors are located between specific chamber modules 1, 2, 3, 4, 5, 6; 8, 9, 10; 13, 14, 15; and 17, 18, 19, 20 of deposition apparatus 100 as shown in FIG. 1. The doors may comprise slit values which are pneumatically operated by the control system to enable sequential process flow of substrates and isolation for specific processes occurring in each chamber.

In apparatus 100 shown in FIGS. 1–2, load lock chamber 1 functions as an isolation chamber between the ambient, sputtering environment and chambers 2–17 of deposition apparatus 100. Load lock chamber 1 is repeatedly evacuated to a pressure of approximately 50 Mtorr and vented to ambient atmospheric conditions. Generally, deposition within apparatus 100 takes place in an evacuated environment and chambers 2–17 are evacuated to the pressure of approximately $10^{-7}$ Torr, before argon gas is allowed to flow into the chambers to achieve a suitable sputtering pressure.

Chamber 2 serves as an entrance buffer between load lock chamber 1 and the internal sputtering environment in chambers 3–17; chamber 3 is a second buffer chamber which may optionally be used to provide a dry or wet etch to the substrates before further processing. Chamber 4 serves as a soak heating chamber for increasing the substrate temperature to optimize film deposition. Substrates are moved into chamber 4, which includes eight banks of quartz lamp heating elements, four banks mounted to each outer door, and remain idle therein for a period of time prior to further processing.

Passby heating chamber 5 includes a heating assembly comprising additional banks of quartz lamp heating elements, five mounted to each outer door of the chamber. Substrates pass through chamber 5 and are heated while in motion therethrough. Both soak heater 4 and passby heating chamber 5 are designed to insure uniform substrate temperature prior to film deposition.

Three coating modules—chromium deposition chamber 8, magnetic deposition chamber 10, and carbon deposition chamber 15—having dimensions roughly equal to those of load lock chamber 1, may be utilized to sputter single or multilayer films on a substrate passing through apparatus 100. Four pairs of sputtering cathodes are mounted, four magnetrons per door, on the doors of each chamber 8, 10, and 15, respectively. Target materials are mounted to the sputtering cathodes; gas manifolds, and shielding are also attached to the outer doors of chambers 8, 10, and 15. Mounting these components to the doors facilitates target changes and chamber maintenance. Further, conduits (not shown) for power, cooling, and process gas lines are provided in the outer doors of the chambers.

Chamber 9 is a buffer chamber between chambers 8 and 10, and may optionally include a second bank of pass-by heaters.

Chamber 13 may comprise a dynamic buffer chamber to provide complete isolation between magnetic deposition chamber 10 and carbon deposition chamber 15 (as discussed in co-pending application Ser. No. 08/311,351). Cooling panels utilizing circulating coolant may be provided in chamber 14 to cool the pallet, thus providing a "cold carbon" deposition process in chamber 15.

Two exit buffer modules 18 and 19 are provided and are essentially identical to buffer 2. Exit buffer modules 18, 19 provide a buffer area to facilitate removal of pallets or substrates from sputtering apparatus 100 to exit lock chamber 20 and further isolates the sputtering process from the external environment.

Exit lock chamber 20 is essentially identical to load lock chamber 1 and operates in reverse pumping order, allowing substrates to be transferred from the evacuated environment of sputtering apparatus 100, to the ambient external environment.

Apparatus 100 incorporates a highly efficient, high capacity vacuum pump system. The vacuum pump system must furnish and maintain an evacuated environment at about $1-9\times10^{-7}$ Torr to ensure substantially unobstructed paths between the bombarding species and the target surface, and between dislodged target species and the substrates.

The vacuum pump system comprises a combination of five turbo-molecular pumps with mechanical and blower pumps for backing. The mechanical pumping system is set up with multiple mechanical pump and blower combinations. Three pumps are needed at all times for the entrance lock, exit lock and turbo-pump backing. Two pumps may be held in reserve. In addition, base pressure pump down and water vapor pumping are expedited using cryogenic coils and a Polycold® refrigeration generator. Two cryogenic coils or "top hats" per circuit are used. The vacuum system also features a network of valves. Chamber vent valves are used to vent the internal environment of sputtering apparatus 100 to atmosphere. Roughing valves and foreline valves isolate the mechanical pumps from sputtering apparatus 100. The valves allow apparatus 100 to be divided into five separate pumping sections, such that each individual section can be vented and pumped down as desired, to facilitate maintenance of apparatus 100. High vacuum valves allow controlled pump-down deposition apparatus 100 from atmospheric pressure. Foreline valves isolate one or more of the five mechanical pumps from the pumping system conduits, allowing flexibility in the number of mechanical pumps operating at a given time. The valves may be arranged such that any one pump can be coupled to pump any given section of apparatus 100 and any one mechanical pump/blower can replace any other mechanical pump/blower that is shut down without disrupting processing.

A transport system suitable for use with apparatus 100 utilizes a plurality of individually powered transport platforms. Each transport platform may be individually controlled with respect to motion and speed by controlling a motor assembly (not shown) associated with each platform. Hence, the transport speed of each individual platform can be controlled at varying rates separate and apart from the speed of other platforms. Each transport platform is provided with proximity sensors at the input, midpoint and output of the stage (not shown) which provide pallet position signals to the electronic control system of the present invention. This allows the electronic control system and the system operator to identify the location of each and every substrate in deposition apparatus 100 and along return path 50 at any given time. Three such proximity sensors per transport platform are provided for each of the platforms used in conjunction with deposition apparatus 100. These sensors are identified at the input (SEN_INP), midpoint (SEN_MID), and output (SEN_OUT) of the chamber. Each sensor provides a digital output signal to indicate the presence or absence of a substrate at the sensor's position. In the event a hardware sensor fails, a unique aspect of the control system "replaces" the hardware sensor with a "soft" sensor, which allows processing to continue without interruption until a convenient time to effect repairs on the hardware sensor.

The transport system also includes a plurality of transport stages, each being approximately equivalent in length to the length of a chamber, and one motor per stage, which drives pallets through the system.

Additional position sensors (not shown) are provided on a return path 50 which circulates pallets from the output of apparatus 100 (at chamber 20) to the input of apparatus 100 (at chamber 1).

A gas flow control system includes valves and valve controls for the sputtering gas (for example, argon), which is supplied to apparatus 100 to create a sputtering environment in the deposition chambers. In conjunction with gas flow control system, gas pressure is monitored as a component of the internal system pressure in apparatus 100 through a series capacitance manometers.

Power supplies are provided to generate sputtering from the magnetron cathode assemblies in chambers 8, 10, and 15.

Circulating coolant fluid, such as water, is provided to heaters, sputtering shields, and sputtering cathodes to maintain temperatures within acceptable operating levels during production and to prevent rapid deterioration of these system components. A coolant control sub-system monitors the temperature level of the coolant in the coolant system and controls the open/close states of coolant flow control valves.

Figure 3:
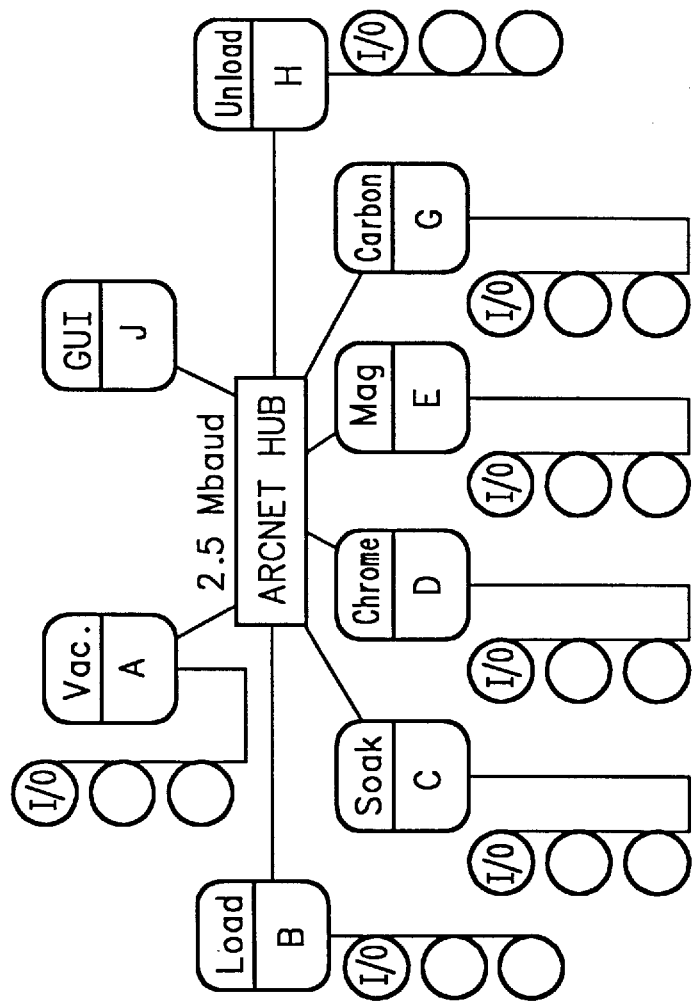
FIG. 3 is a block diagram of the hardware processor network which is suitable for use in controlling an in-line sputtering system in accordance with the teachings of the present invention.

As shown in FIG. 3, the control system hardware comprises a network of processors A–E, G, H, and J, coupled to a hub. Each processor may comprise a 32-bit microprocessor with intelligent, distributed I/O bricks. Data I/O of each such processor is handled directly by each processor linked directly to hardware of sputtering apparatus 100. Because the bricks are linked to their own microprocessor, these I/O bricks can be programmed to operate without a host computer. At the local processor level (processors A–E, G, H and J), the bricks can perform, for example, PID loop control, counting, latching, timing, analog alarming, and thermo couple linearization. As such, the control system of the present invention achieves reaction times on the order of one millisecond. Each processor A–E, G, H, and J may comprise an OPTO-22 "Mistic" model 200 processor and includes a high speed local I/O interface and four serial communication ports, including ARCNET, utilized in the present system. The processors are linked by an ARCNET network interface, such as that manufactured by Contemporary Control Systems, Inc., of Downers Grove, Ill.

A multi-tasking operating system for use with the model 200 Mistic sub-processors is provided, and is available from OPTO 22. The control system is programmed utilizing the "Cyrano" control language (also available from OPTO 22), a control language written using sequential flowcharts, such as those shown in FIGS. 14–31. Each sub-processor includes its own integrated communications hardware, and hardware protocol, also available from OPTO 22, utilized for communication between each of the sub-processors. Each of the sub-processors comprises a peer of another sub-processor, and thus can communicate directly with any of the other sub-processors, via the hub.

The hub comprises a model SY401600-12C processor provided by Contemporary Control Systems, Inc., of Downers Grove, Ill.

A unique aspect of the present invention is the fact that each of the processors A–E, G, H, and J is utilized on a specific physical area (or subset of chambers) of apparatus 100, rather than specific functional areas (e.g. pumping, sputtering, etc.) performed by apparatus 100. In Applicants' aforementioned application Ser. No. 08/121,959 abandoned, a significantly different control system is utilized which utilizes a central processor and a programmable logic controller to direct all the functions of the sputtering apparatus. In contrast, in the control system of the present invention, each processor A–E, G, H, and J runs a physical section of the manufacturing process. Generally, six of the processors direct substrate transport and processing, while two direct system preparation and status.

Figure 4:
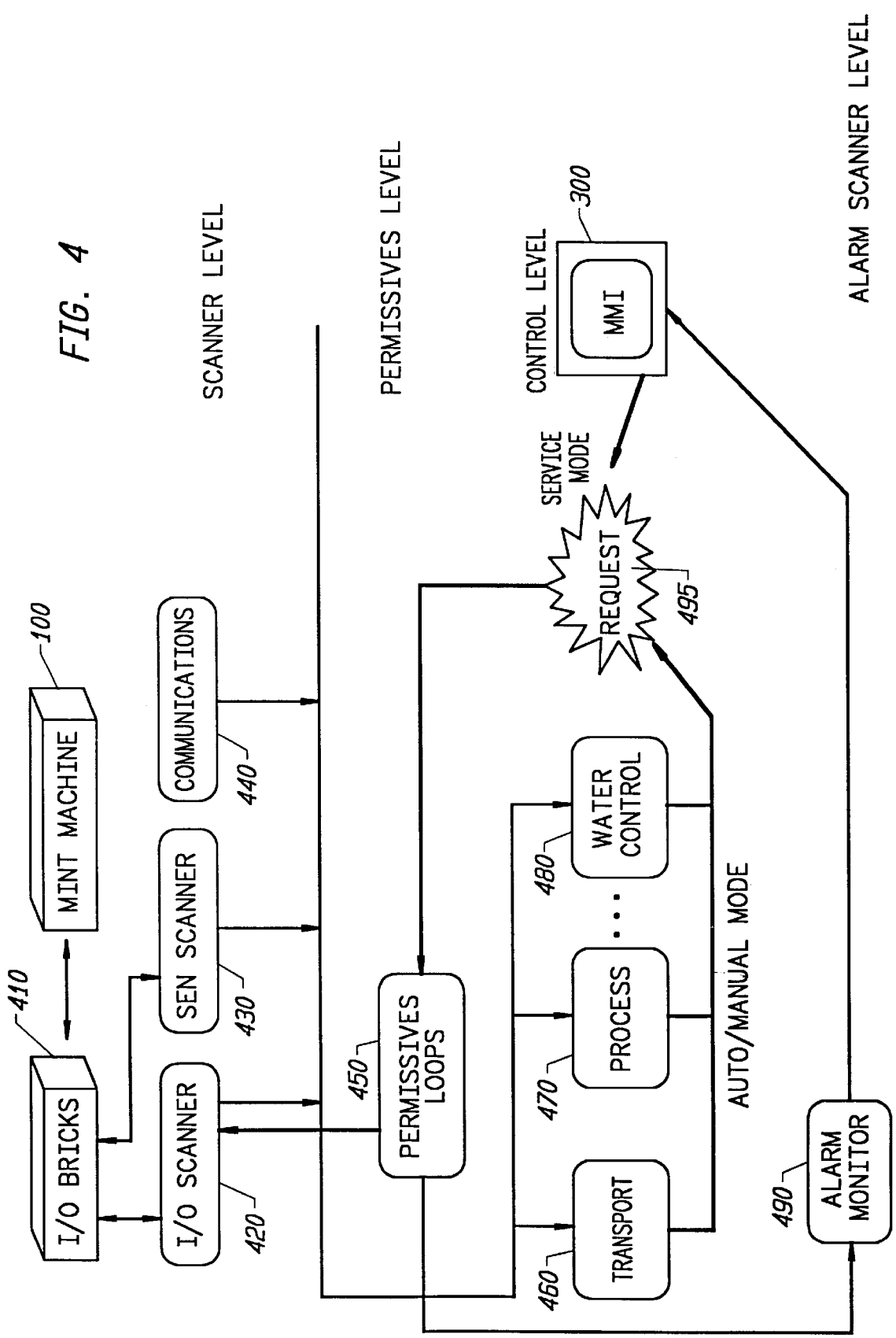
FIG. 4 is a block diagram of the general structure of the control software utilized in conjunction with the control hardware shown in FIG. 3.

FIG. 4 shows an overview of the software for controlling sputtering apparatus 100. As shown in FIG. 4, input and output from the hardware of the apparatus 100 is moved to and from the processors in the form of intelligent, distributed I/O bricks 410. These I/O bricks can comprise blocks of information which are supplied by the hardware such as the position sensors, heaters, and sputtering power supplies. I/O bricks 410 pass to the control level of the software from the hardware in the apparatus 100 via input/output scanner 420 and a sensor scanner 430. I/O scanner 420 communicates with functional hardware, such as heaters, pump valves, doors, motors, and turbo pumps. Sensor scanner 430 queries input from position detectors, heat sensors, and door state sensors. A communications block 440 completes the scanner level of the software, and includes a protocol and communications error scanning and correction facility.

At the control level, routines are arranged in blocks for specified functions (and utilized on specific processors, as described below) such as transport functions 460, substrate process functions 480, and water control functions 480. Each functional routine operates in automated or manual mode and interprets input level data from I/O scanner 420 and sensor scanner 430, and forwards control instructions in the form of a request 495 through permissive loops 450. The permissive loops comprise system state conditions which prohibit hardware actions having adverse consequences on the sputtering operation and process. If the request does not violate a system permissive condition, the request is forwarded to I/O scanner 420 and on to the system hardware in the form of I/O bricks 410. If the command violates a system permissive, an alarm monitor 490 outputs an alarm to the man-machine interface (MMI) 300. Requests are also generated by man-machine interface 300. MMI 300 may comprise a personal computer with any number of input/output hardware options.

FIG. 5 shows a configuration table which is utilized by the control system of the present invention to recognize the hardware configuration of particular chambers in the system. Apparatus 100 includes 20 chambers, with the process control being handled by one of four processors, B, C, D, or E. The configuration table stores, for each chamber: the presence or absence of a vent valve, roughing valve, high vacuum valve; the presence or absence of an output door (DRO) or an input door (DRI); and whether the chamber is a static chamber (generally, a process function chamber wherein a pallet is to stop for processing), a dynamic process chamber (generally, a process chamber in which the processing therein requires the pallet maintain a single speed), or is an "adjacent" chamber (being "adjacent" to a dynamic chamber). As shown in FIG. 5, processor B controls the processes for chambers 1–4, processor C for chambers 5–8, processor D for chambers 9–12, and processor E for chambers 13–20.

FIG. 6 shows a dynamic status map used by the control system of the present invention (as described below) to track the status of the various components of apparatus 100. A map is maintained for each chamber. FIG. 6 shows the map table for chamber N; separate chambers are maintained for chambers N+1, N+2, . . . etc. The control routines query and update the status of each map, when a request 495 is generated with respect to a given chamber N, N+1, N+2, etc.

The initial maps for each chamber are stored in the random access memory of each processor B–E at system initialization. Each processor can be provided with up to 4 megabytes of memory, although one megabyte is suitable for use in the control system of the present invention. As shown in FIG. 6, the information is stored as follows: bit 0 indicates the status of whether a pallet/substrate is waiting at the input of a chamber N by querying the sensor in chamber N–1; bit 1 indicates whether a load request has been made for a pallet to be loaded into chamber N; bit 2 indicates whether a stop request has been made; bit 3 indicates whether a pallet is waiting at the output of chamber N; bit 4 indicates the status of whether an unload request has been made for a pallet in chamber N; bit 5 indicates the condition of a request to open the input door (DRI) of chamber N; bit 6 indicates the condition of a request to open the output door (DRO) of chamber N; bit 7 and bit 8 are enable bits for the input door and output door, respectively, of chamber N; bit 9 indicates the status of whether a process is currently active in chamber N; bit 10 indicates whether a process request for chamber N has been made; bit 11 indicates the status of whether chamber N is at atmospheric pressure; bits 12, 13, and 14 indicate the low-vacuum, mid-vacuum, and high-vacuum valve states of chamber N; bit 15 is reserved; bit 16 indicates the roughing valve partial permissive status; bit 17 indicates the status of the vent valve portal permissive; bits 18 and 19 comprise a 2-bit pair which identify the particular operational mode of chamber N; bits 20 and 21 are open and closed limit switches for the chamber N input door (DRI); bits 22 and 23 are open and closed limit switches, respectively, for the chamber N output door (DRO); bits 24–26 chart the status of three position sensors in each chamber which detect the pallet position at the input (SEN_INP), midpoint (SEN_MID), and output (SEN_OUT) of chamber N; and bit 27 indicates the state of the high-vacuum valve closed limit switch.

The particular functions controlled by each subprocessor A–E, G, H, and J will be described with reference to FIGS. 7–13, with examples of specific control routines represented in FIGS. 7–13 shown in FIGS. 14–32. It will be hereafter recognized that the software utilized with the described embodiment of the present invention is a modular system and instructional routines can be loaded and called by different processors. Thus, in the following description, common reference numerals used in the figures represent common functional blocks present among various processors; as designated by the reference letter following the numeral, while the functions of the routine are similar, there may be minor differences in each routine resulting from differences in the hardware of apparatus 100 being controlled.

Figure 7:
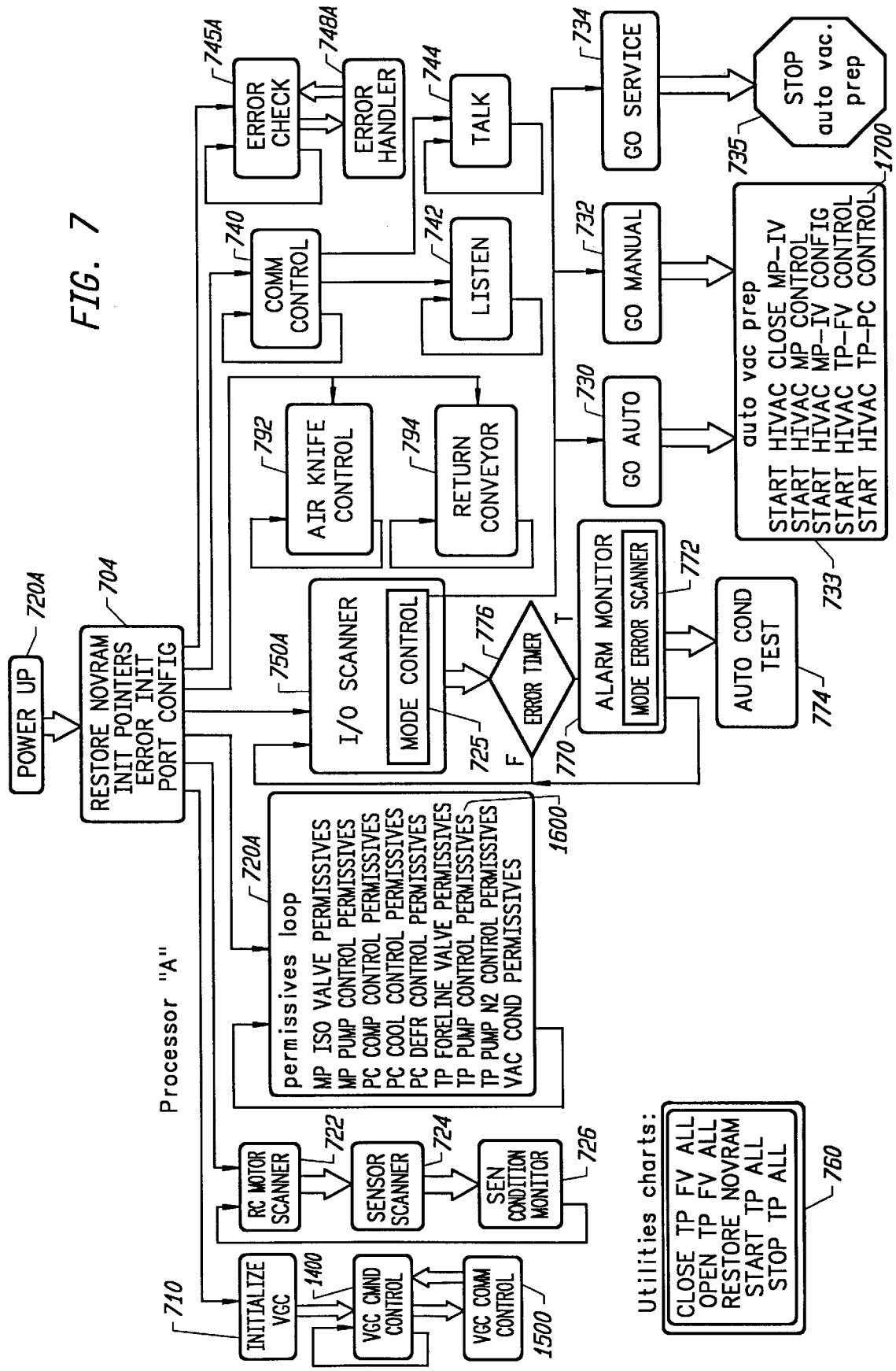
FIG. 7 is a flow diagram of the functional control routines utilized in a first processor, processor A, to control the apparatus shown in FIGS. 1–2, in accordance with the present invention.

FIG. 7 is a flow diagram of the functional processes implemented by processor A. Shown in FIG. 7 are the three basic levels of operation briefly described with reference to FIG. 4. The power initialization level (blocks 702/704), the parallel scanning and hardware control level blocks, and the machine run level 730,732,734.

At power up 702*a*, configuration information is available to each processor. The system initialization, shown in block 704*a*, includes the steps of restoring the non-volatile RAM (NOVRAM) of each processor, initializing the software pointers, initializing the error functional routines, and configuring processor communication ports. After block 704*a*, the vacuum gauge controller (VGC) block 710, RC motor scanner 722, permissive loop 720*a*, I/O scanner 750*a*, air knife control 792, return conveyor 794, communication control 740, and error check 745, are initialized.

Block 710 initializes vacuum gauge control functions which comprise vacuum gauge command controller loop 712 and vacuum gauge communications controller 714. Communication control loop 714 directs control input to the various vacuum gauge communication ports, and checks for errors in any communications to the vacuum gauges. Vacuum gauge command control loop 712 sets the status of data in the status tables based on commands run to control the vacuum pumps.

Figure 14A:
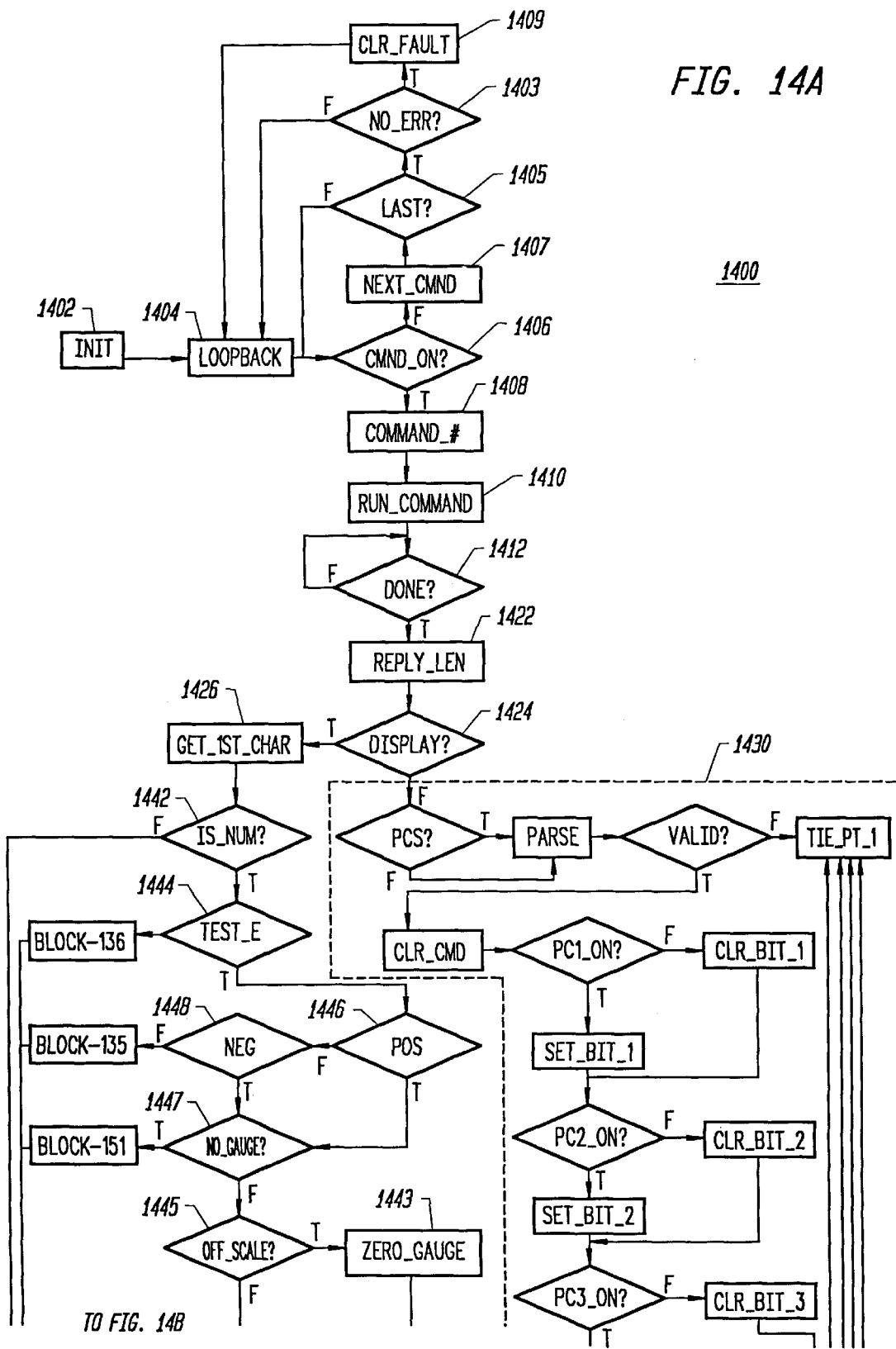
FIGS. 14A and 14B are flow diagram of the control routine controlling the vacuum gauge commands.
Figure 14B:
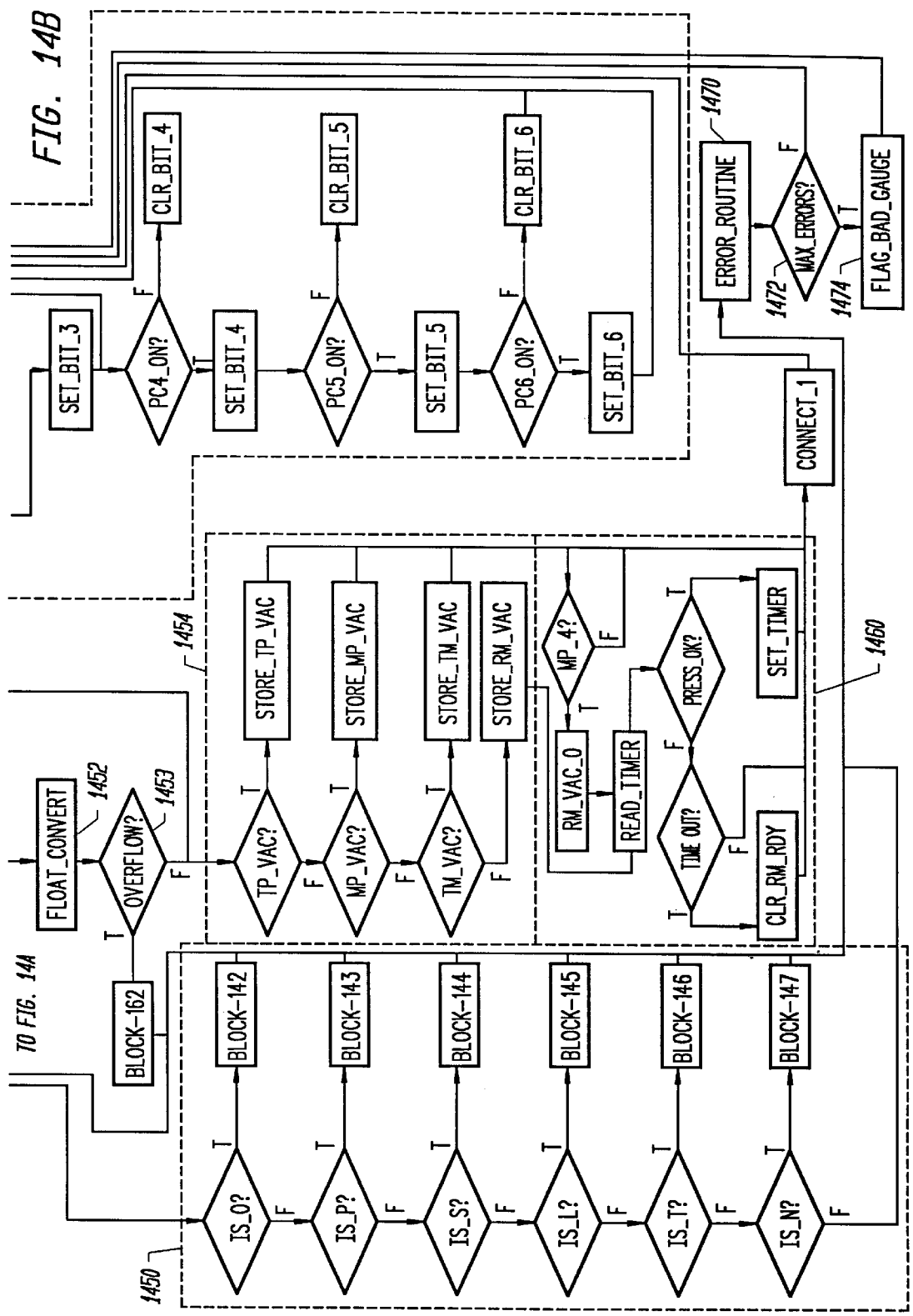
Figure 15:
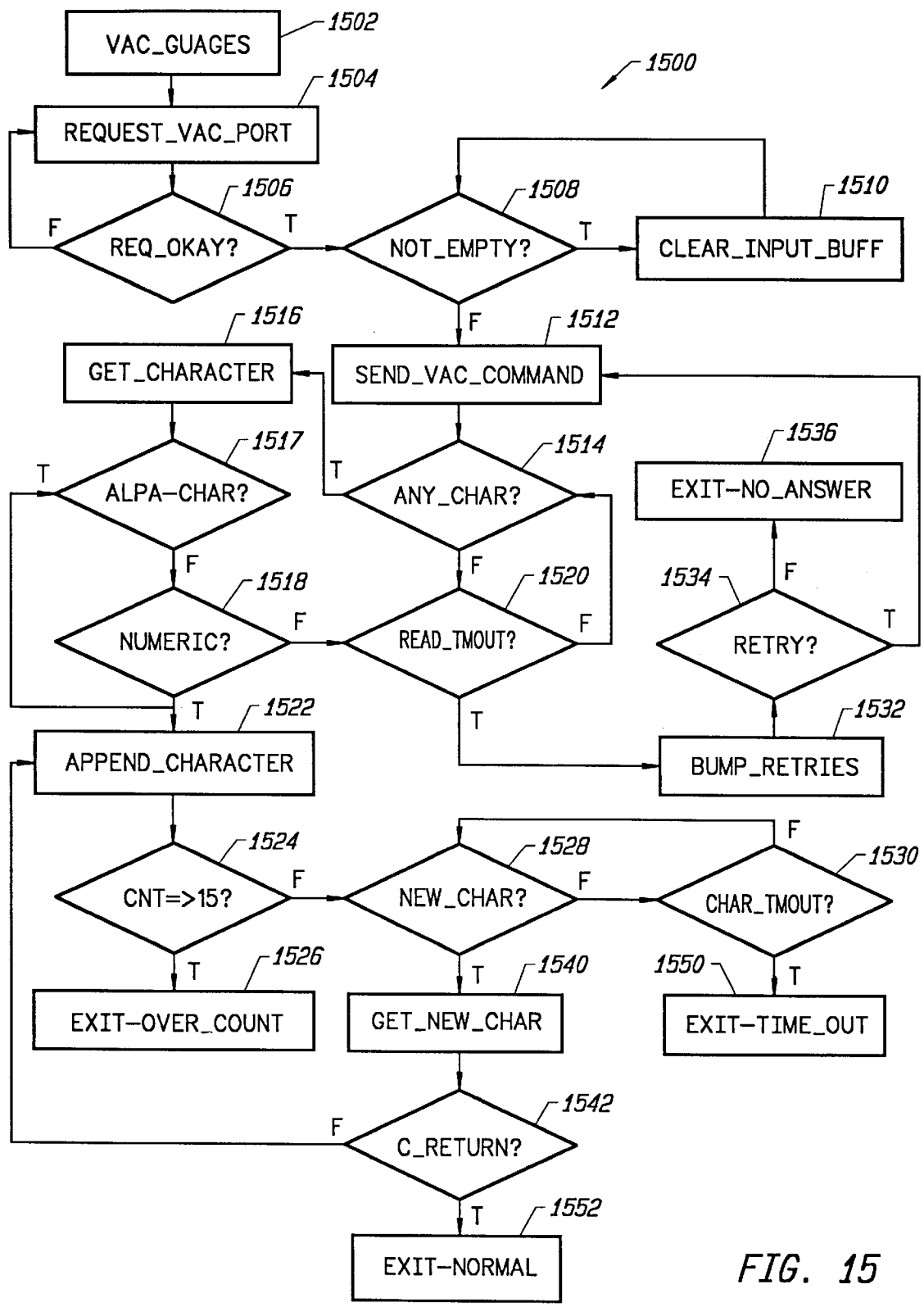
FIG. 15 is a flow chart of the control routine controlling the vacuum gauge communication.
Figure 16A:
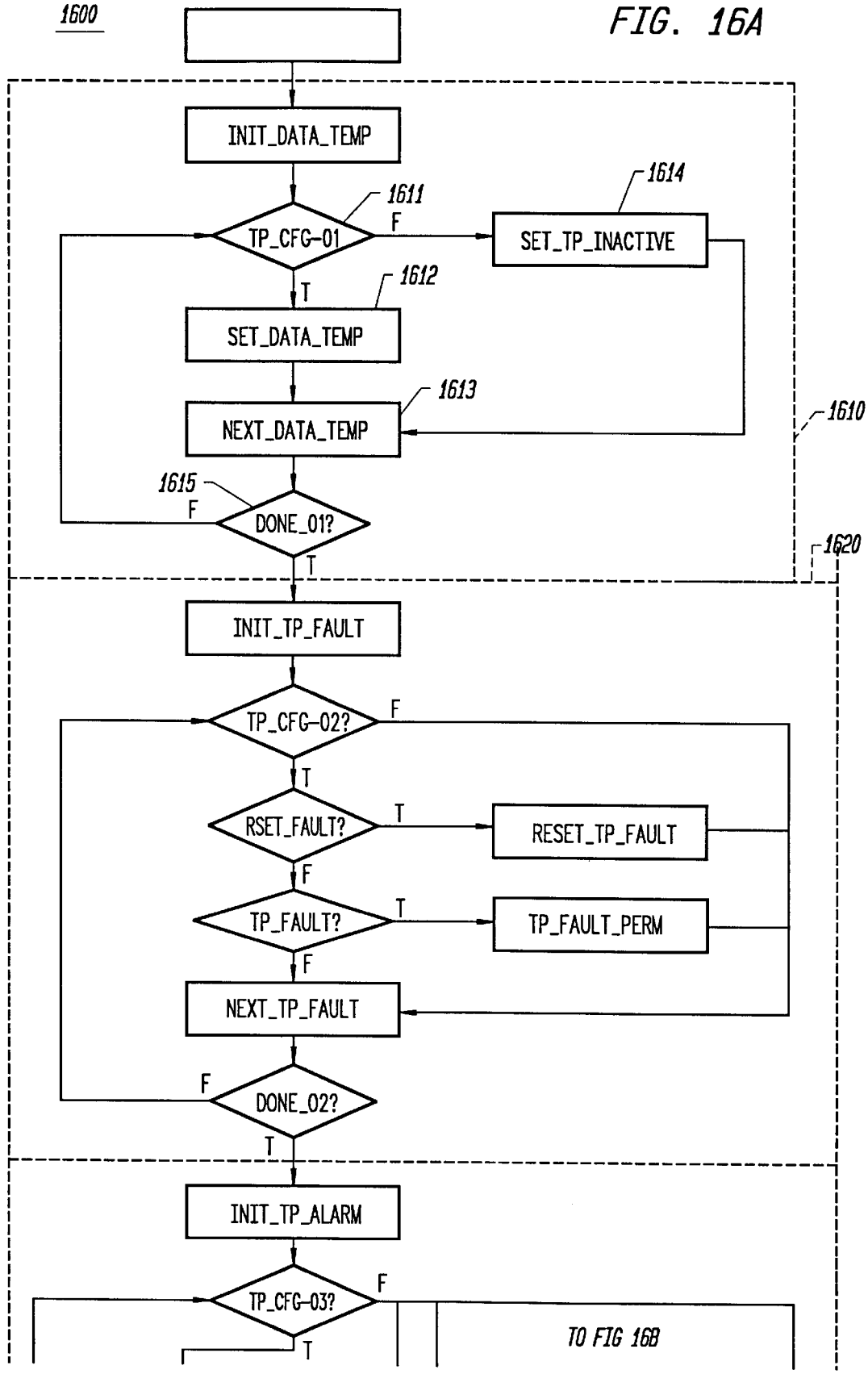
FIGS. 16A, 16B, 16C and 16D are flow diagrams of the turbo pump permissive conditions of the control system of the present invention.
Figure 16B:
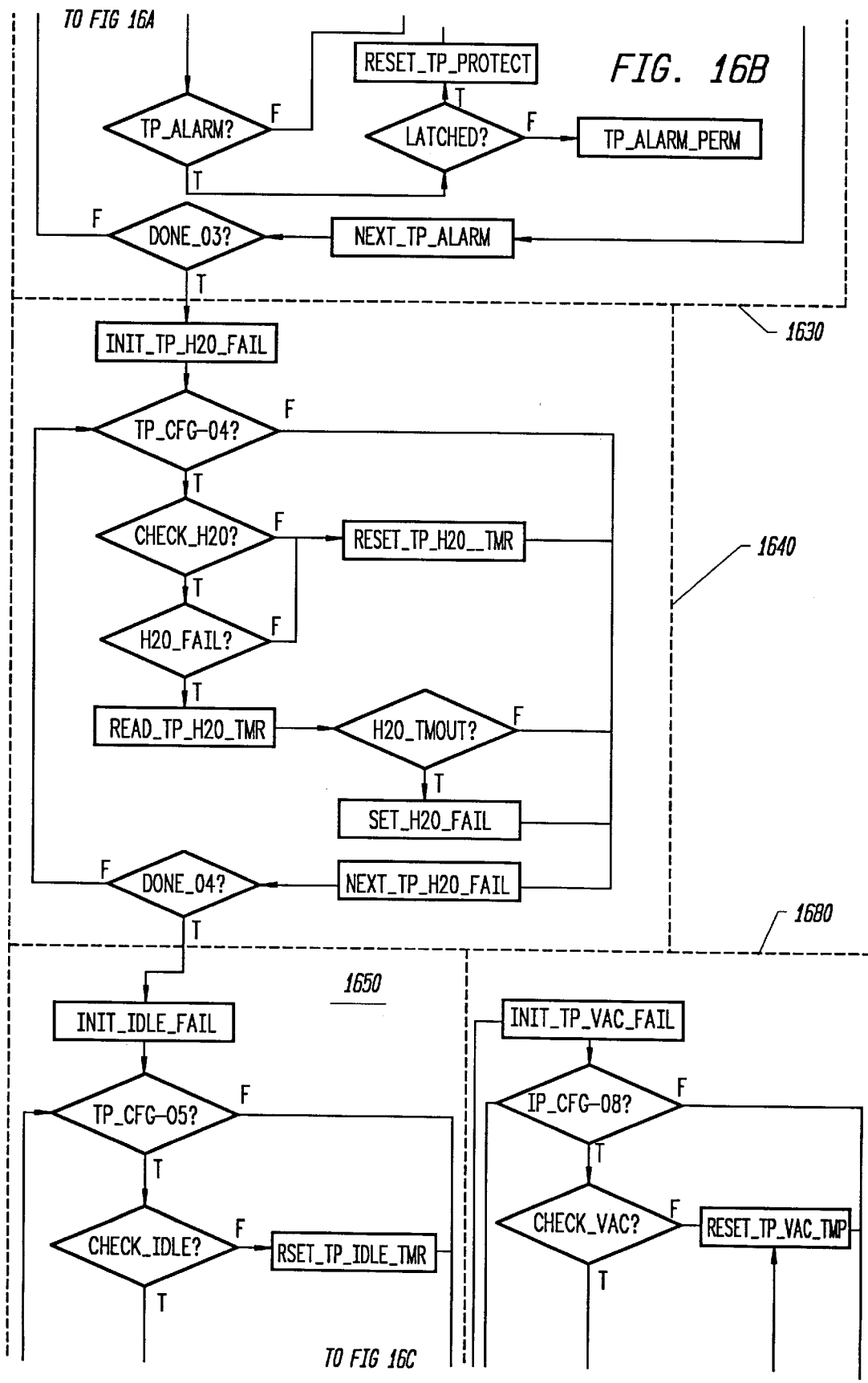
Figure 16C:
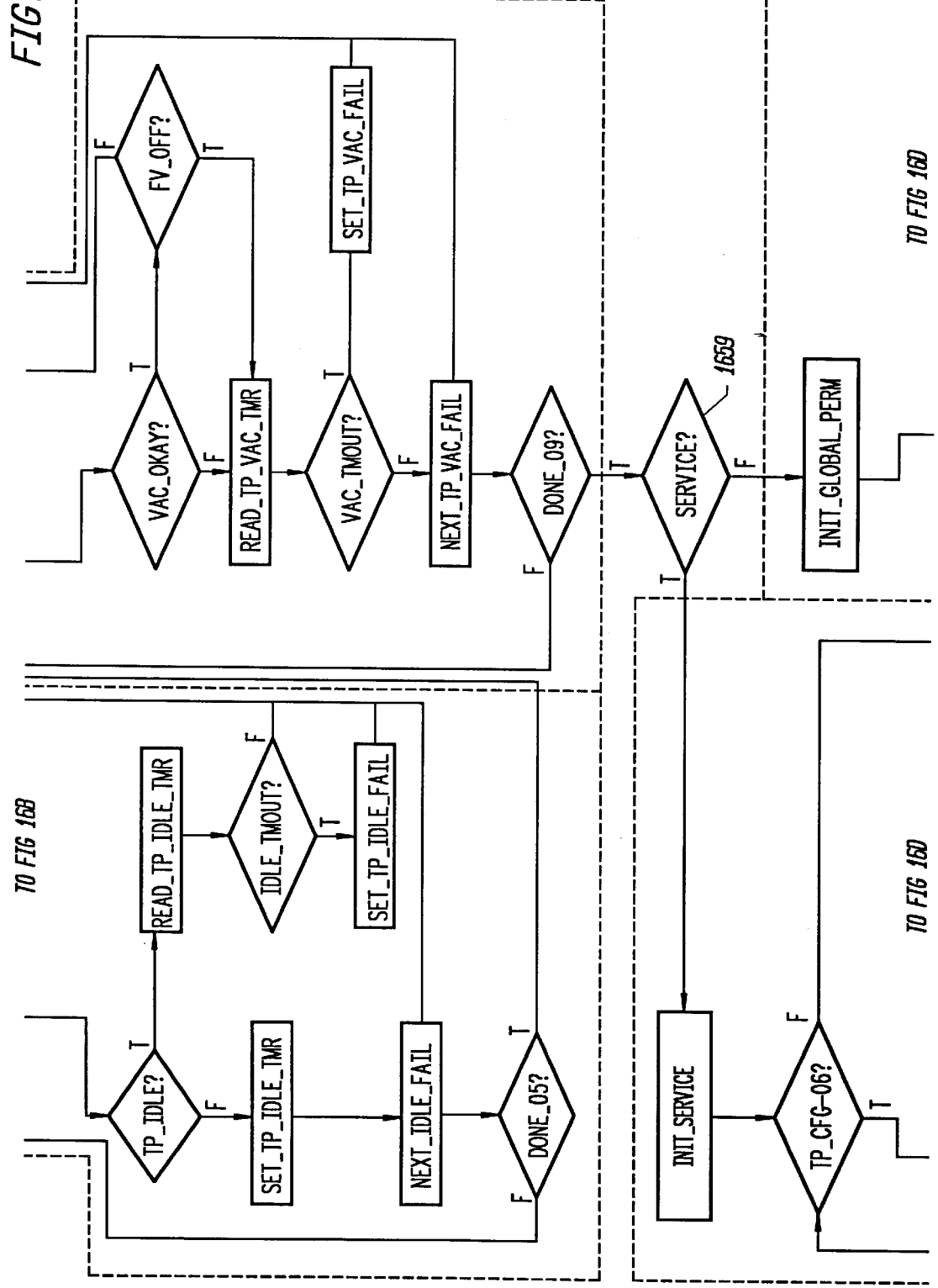
Figure 16D:
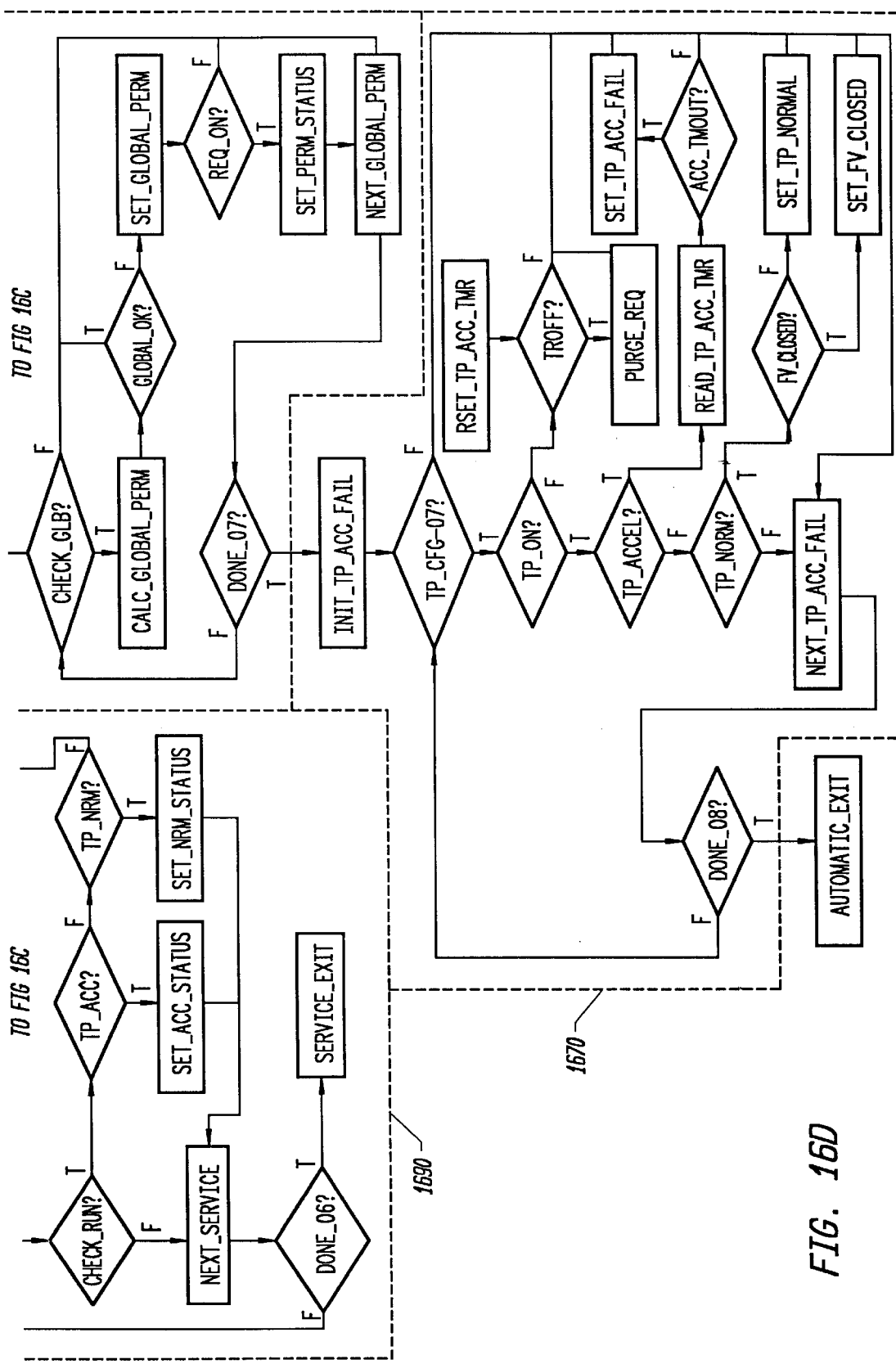

FIGS. 14 and 15 show the process flow for the vacuum gauge command controller 1400 (FIG. 14) and communications control 1500 (FIG. 15) for the vacuum gauge control assigned to processor A. As shown in FIG. 14, after system initialization at 1402, a check is made at step 1406 to see if a command directed to the vacuum gauges has been requested. The next command (1408) number is run (at step 1410) until completed (step 1412). The reply length is stored in buffer 1422 (REPLY_LEN). At 1424, a determination is made as to whether a display of the command must occur, the result of block 1424 is true, and the routine proceeds through a decision query tree which first determines the first character in the command string at the variable GET_1ST_CHAR at step 1426. At decision block 1426, the value stored in GET_1ST_CHAR is queried to determine whether it is an alpha or numeric character. At block 1442 if the character is not numeric, routine 1430 proceeds to determine which alpha-type character is present in the command and stores it in address blocks 142 through 147 respectively. An error routine counter 1470 is then checked to determine if a maximum number of errors has been reached. If the character is numeric, routine 1400 tests for an error in block 1444 and whether the command is positive or negative at blocks 1446 and 1448. A check for a vacuum gauge command is made at step 1447, and if the command is not a gauge command, the command is routed to address BLOCK_151. If a gauge command is present, a scale check is made at step 1445, and if the scale exceeds a threshold, it is zeroed at step 1443. A floating point conversion is made at step 1452, and if no overflow is detected (step 1453), the command routed to variables STORE_TP_VAC, STORE_MP_VAC, STORE_TM_VAC, or STORE_RM_VAC in sub-routine 1454. A timer sub-routine 1460 checks whether the command has requested mechanical pump 4 (MP_4). If the output of the display query at step 1424 is false, the command is parsed and checked by poly-cold pump sub-routine 1430, and the state bit of one of the poly-cold pumps set according to whether the pump is operating or not. SET_BIT_1–SET_BIT_6 are set or cleared. The output of timer loop 1460 and parse loop 1430 is provided to TIE_PT_1 which loops to interpret the next command at step 1407. A check is made at block 1405 to determine whether the last command has been reached, whether an error has occurred (block 1403) and any faults are cleared at step 1409.

FIG. 15 describes communication control of vacuum gauge commands by VGC communication control block 1500 which checks the command string for errors. When communication with a vacuum gauge is required (as represented at input block 1502), a request for a vacuum communications port "REQUEST_VAC_PORT" is made at step 1504. If the request is valid (step 1506), and the buffer is not empty (step 1508), the input buffer is cleared (step 1510). If the buffer is empty, the vacuum command send bit is enabled (step 1512). Next, a query to determine whether alphabetic characters are present in the command string (step 1514). If so, the character variable GET_CHARACTER is queried and a determination is made as to whether the character is an alphabetic character or a numeric character (steps 1517, 1518). In either instance, alphanumeric characters are appended to the variable APPEND_CHARACTER (step 1522). If the count of characters in APPEND_CHARACTER is greater than 15 (step 1524), the routine exits (step 1526) and the EXIT_OVER_COUNT variable is set at step 1526. If the count of characters is less than 15, the character is checked to see if it is a new character (step 1528) and if so, it is stored in the variable GET_NEW_CHAR (step 1540). If it is not a new character, a timer time-out may occur (step 1530) and the routine exits (step 1550). Once the variable is stored in the variable GET_NEW_CHAR, the routine loops to the APPEND_CHARACTER variable or routine exits.

Also shown in FIG. 7 is permissive loop 720*a*. The system permissives, as stated above, are control conditions which act as system fail-safes by inhibiting improper commands from being executed by the system control routines which would be detrimental to apparatus 100. As shown in loop 720*a*, processor A uses the following permissive loops: mechanical pump isolation valve permissives; mechanical pump pump control permissives; poly-cold compressor control permissives; poly-cold fluid control permissives; poly-cold defrosting control permissives; turbo-pump foreline valve permissives; turbo-pump pump control permissives; turbo-pump nitrogen control permissives; and vacuum condition permissives. It should be noted that the particular permissive loops used by each processor will vary depending upon which section of apparatus 100, and hence which specific hardware, that processor controls.

An example of one of the permissive loops, the turbo pump control permissive loop 1600, shown in permissive loop block 750*a*, is shown in FIG. 16. The routine consists of a series of decision fault blocks 1610, 1620, 1630, 1640, 1650, 1660, 1670, 1680, and 1690, which interrogate and initialize the following values for the turbo pumps: temperature (1610), pump faults (1620), alarms (1630), water failure (1640), idle failure (1650), global permissives (1660), pump acceleration (1670), vacuum (1680), and a service exit (1690). Each decision fault block is similar in that the permissive variables for each fault are set based upon a query to the configuration variable for the fault of interest. For example, step 1611 in loop 1610 is a query to variable TP_CFG_01 (turbo-pump configuration 01) in an integer table initialized on start-up of the control system which contains one component of the status of the turbo pump. Pointers to the turbo pump configuration table, which initializes values in each variable (for example TB_CFG_01 at 1611) are established at system initialization.

An exemplary decision loop, 1610, begins by setting an initial temperature value at INIT_DATA_TEMP at step 1609. At decision block 1611, the turbo pump configuration variable TP_CFG_01 is queried and if this index has been set to true, the data temperature is set at step 1612 in SET_DATA_TEMP, and the next data temperature value obtained at step 1613 (SET_DATA_TEMP). Routine 1610 waits for completion by looping from step 1615. If TP_CFG_01 is not true, at step 1614, the turbo pump is set inactive (SET_TP_INACTIVE).

Similar operations are performed at routines 1620, 1630, 1640, 1650, 1660, 1670, 1680, and 1690. Loop 1620 queries and sets the turbo pump faults (TP_FAULT) and fault permissive (TP_FAULT_PERMISSIVE); loop 1630 queries and sets the turbo pump alarms (TP_ALARM); loop 1640 queries and sets the water flow alarms (TP_H$_2$O_FAIL); loop 1650 sets the idle alarms; loop 1660 checks the global permissive states; loop 1670 checks the turbo pump acceleration parameters; and loop 1680 checks the vacuum alarms on the turbo pumps. Loop 1690 is a service loop which is accessed via decision block 1659.

It should be noted by one of average skill in the art that similar permissive routines may be utilized by the other processors utilized in the present invention to control deposition apparatus 100.

Returning to FIG. 7, an input-output (I/O) scanner 750a includes a mode control block 725 which allows a system operator to select automated run mode 730, manual run mode 732, or service mode 734.

In general, I/O scanner 750a scans multiple bricks of I/O information generated by the various hardware components of the system and processes command requests to the hardware. The I/O scanner 750a triggers an error timer 776 which is coupled to an alarm monitor block 770, including a mode error scanner 772, which checks for command errors in requests to implement auto mode 730a, manual mode 732a, and service mode 734a. If any errors are detected, the output of the error timer signals an alarm monitor 770. Alarm monitor 770 checks for errors in: the mechanical pumps for external alarms, low water circulation or a violation of a global permissive; the mechanical pump isolation valves for a position failure or violation of a global permissive; turbo pump foreline values for position or a violation of global permissives; the turbo pumps for an external pump alarm, low water circulation idle fault, accelerations fault, high foreline valve pressure, or a global permissive lockout; and whether a position sensor has failed. Once the error is detected, the status of the queried hardware is saved and mode error scanner 772 checks for errors in each mode set-up, and enables auto mode testing routine 774. If a mode error is detected, an alarm is generated by alarm monitor 770.

The main function handled by processor A is vacuum preparation of the system 100. Auto vacuum preparation can be accessed through either an automatic or manually enabled manner via routines 730, 732, respectively, shown in block 733. Auto vacuum preparation block 733 includes routines which control high vacuum mechanical pump isolation closure, high vacuum mechanical pump control modules, high vacuum mechanical pump isolation valve configuration, high vacuum turbo pump foreline valve control, and high vacuum turbo pump poly-cold pump control (1700 shown in FIG. 17).

Figure 17:
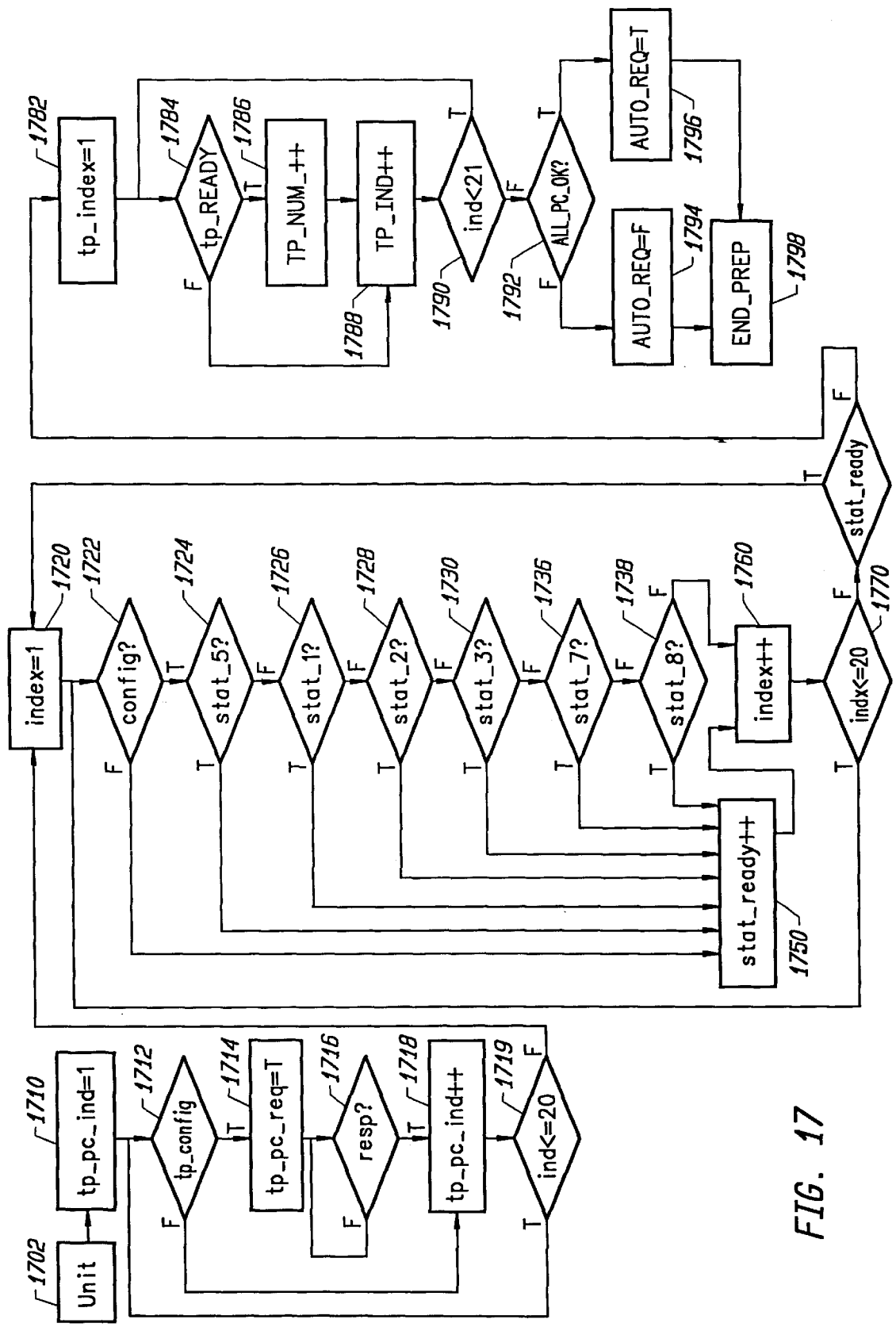
FIG. 17 is a flow diagram of the automated turbo pump control routine for the turbo pump system in the apparatus shown in FIGS. 1–2.

FIG. 17 represents the start turbo-pump, pump control (START HIVAC TP_PC CONTROL) loop found in block 733. With reference to FIG. 17, after initialization at step 1702, the turbo pump poly-cold index block (tp_pc_ind) is set equal to one (step 1710). At block 1712, a test of whether the turbo pumps have been configured is made, and if the turbo pumps do need to be configured, the turbo pump pump-control index is incremented at block 1718 (at block 1790). If the turbo pumps require configuring, a request is made at block 1714 to start the turbo pump (TP_PC_REQ= T). At block 1716, the routine waits for a response, and at block 1719, the routine checks whether the increment count is less than or equal to 20. If not, the index is set to 1 at block 1720, and a series of pump configuration checks is made. A preliminary general configuration check is made at block 1722. If configuration is necessary, at block 1724 the "STATUS=5" query determines if the turbo pump is at normal speed. If so, the stat_ready variable is incremented (block 1750) and the configuration index is incremented (block 1760). If the configuration index remains less than or equal to 20, 1770 returns to step 1720 to continue the status queries of the turbo pumps.

A check is made at step 1726 (STAT_1) to determine if an external pump alarm was generated. A query is made at step 1730 ("STATUS_3") for an idle fault. A check for a low water fault is made at block 1728. A foreline pressure check is made at step 1736 (STAT_7) and for the global permissive is made at block 1728 ("STATUS_8").

If step 1780 indicates that the turbo pumps are ready, the tp_index is set equal to 1 (step 1782). Step 1784 checks once again whether the turbo pump is ready, and if so, the pump number is incremented at step 1786, and the index is incremented at step 1788. Step 1790 checks to determine if the index is less than 21, and steps 1792, 1794 and 1796 enable the automated start of the turbo pumps.

Returning to FIG. 7, as shown therein, a service mode 734 is also provided which disables vacuum preparation of the system and allows selective shut-down of pumping in individual chambers (assuming chamber isolation is achieved).

Utilities routines, shown in block 760, represent control routines directed to specific functions and thus different routines, are assigned to each processor. As shown in block 760, the routines available to processor A may be utilized to close all turbo pump foreline valves, open the turbo pump foreline valves, restore the non-volatile random access memory in processor A, start all turbo pumps, and stop all turbo pumps.

Also shown in FIG. 7 are an air knife control 792 and return conveyor control 794. An air knife is positioned at a location just prior to chamber 1 of system 100. Generally, apparatus 100 is maintained in a clean room environment, and substrates are loaded onto pallets for processing by automated load robots in a separate, adjacent clean room.

The air knife is utilized to isolate the substrate loading area environment and the environment which is maintained about the apparatus.

Return conveyor control routine 794 controls the return conveyor 50 carrying pallets returning to chamber 1 after substrates have been removed from the pallets after processing at chamber 20.

Communications control 740 is also initialized after power up and constantly controls the interaction between processor A and the ARCNET system. The communications control routine initializes a listen module 742 and a talk module 744. Listen module 742 continuously checks network communications traffic and evaluates both the address and length of communications received by processor A. Errors in the communications stream can be brought to the attention of the system operator. Talk module 744 controls communications between processor A and the system hardware, and other processors in the control system.

Finally, an error check module 745a and error handler 748a are provided. The error check routine 745a looks for I/O errors which may arise from bad serial ports, command send time outs, bad table indexes, math overflows, un-real numbers, divide by zero errors, and bus errors.

Error handler 748a is flagged when an error is returned by error check routine 745a. The error is used to flag the failed I/O brick. The routine sets a flag to indicate that a brick has failed to respond. The brick is identified by a bit set in the variable BRICK_STATUS as well as a -1 set in a variable table. A RE_ENABLE_BRICK attempts to re-establish communications with a brick that was disabled due to a time-out error. Error handler 748a logs the current error message in a string variable "CURRENT_ERROR_MESSAGE" and in a brick error table.

Figure 8B:
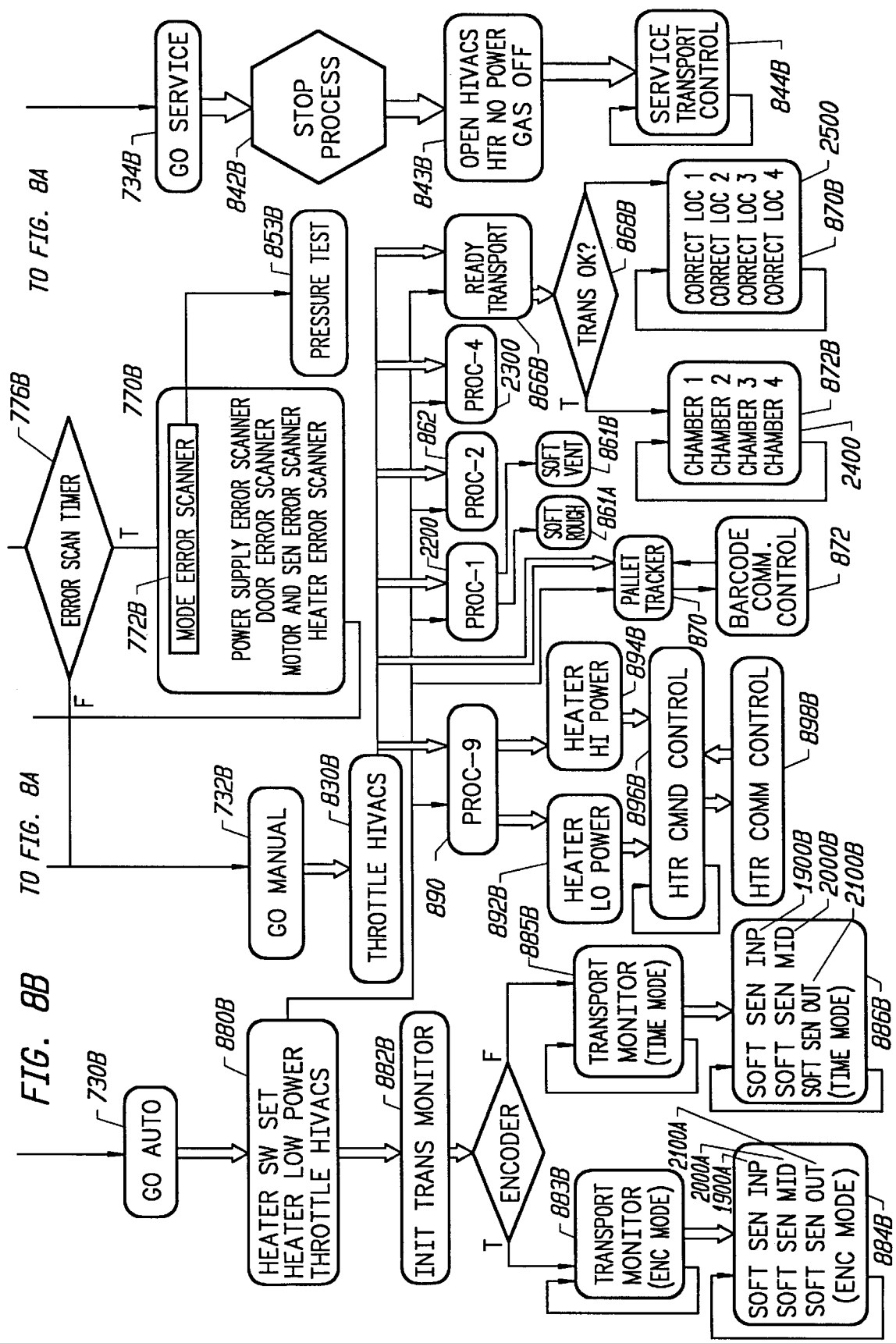

FIG. 8 is an overview flow diagram of the control routines generally executed by processor B.

Processor B controls the processing of substrates in chambers 1 through 4. Chambers 1 through 4 comprise, respectively, load lock chamber 1, buffer chamber 2, etching chamber 3, and soak heater chamber 4. Processor B also controls the heater set-up of a pre-heating process in chamber 9, prior to the magnetic sputtering chamber.

After power up of the control system at block 702b, initialization routine 705b restores the non-volatile memory, variables, pointers and error tables. As shown in FIGS. 8–13, the processors use similar program routines, the specifics of which will not be described in detail herein. Where similarities between control blocks exist, like reference numerals are used throughout the figures, with the processor specific letter designation changing accordingly. As such, many functional blocks in FIG. 8 are similar to those in FIG. 7.

For example, shown in FIG. 8 is communication control 740b including listen routine 742b and talk routine 744b, which are substantially equivalent to those set forth with respect to the A processor, but (as will be readily recognized by one of average skill in the art) configured to operate with the I/O to and from the system's B processor.

One routine not utilized by processor A is a sensor scanner 820b. Scanner 820b is required for processor B to interact with substrate position sensors in each chamber to allow the control system and the system operator to optimize substrate processing. As discussed above, each chamber includes three sensors, at the input (INP), midpoint (MID) and output (OUT) of the chamber.

Figure 18:
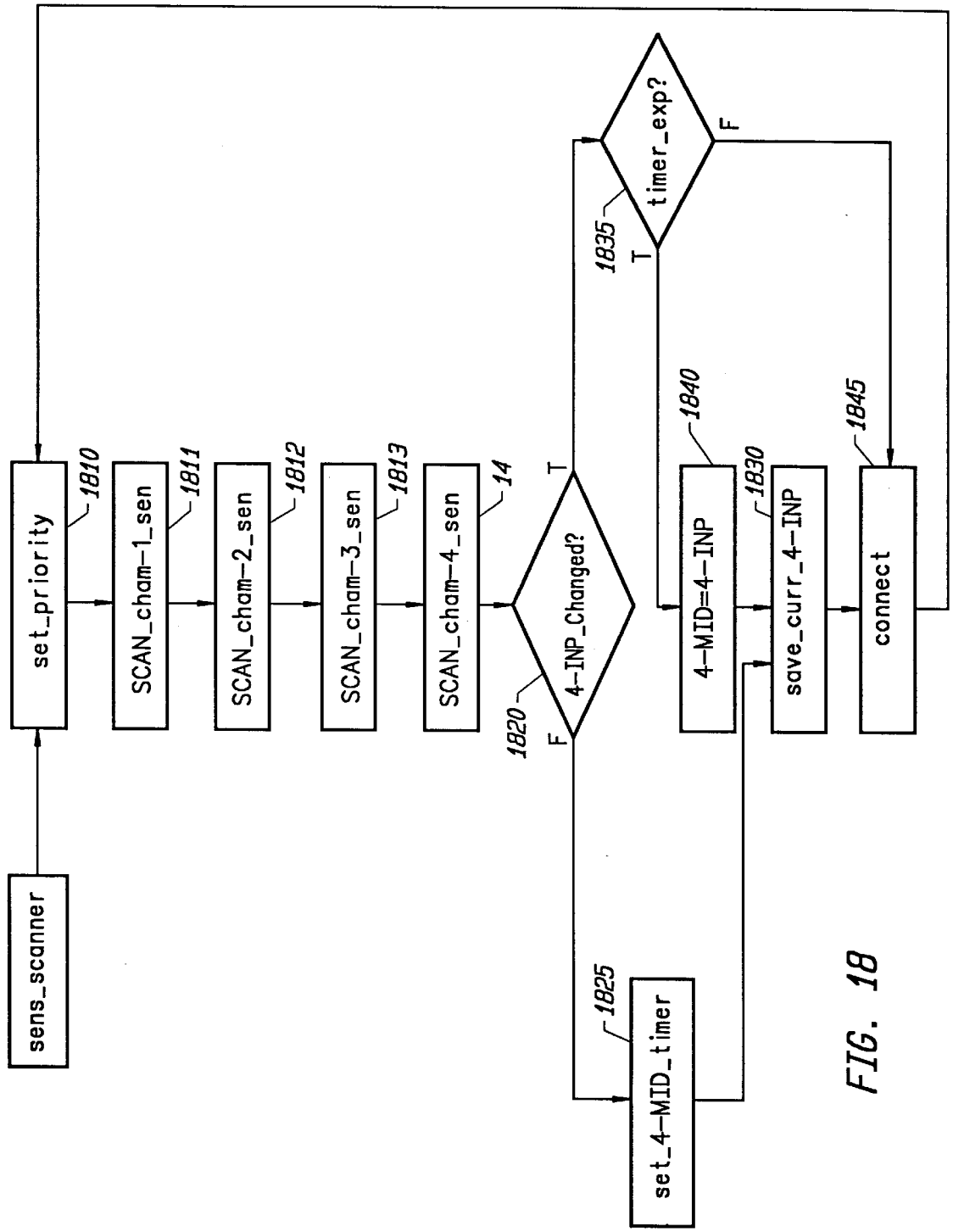
FIG. 18 is a flow chart of the hardware sensor scanning loop utilized in accordance with the system of the present invention.

FIG. 18 shows the sensor scanner routine utilized by processor B. Similar routines are used by processors B–E, although for different chambers. The input sensor is positioned close to the input door, with respect to the direction of pallet motion (from chamber 1 to chamber 20), the midpoint sensor is positioned midway between the input and the output, and the output sensor is positioned at the exit door of the chamber. Prior to scanning the chambers, the scanner routine priority is set at step 1810. As shown in FIG. 18, sensor scanner 820b scans the sensors in chambers 1, 2, 3, and 4 at steps 1811–1814, respectively. Each scanning step 1811–1814 comprises reading a brick of data to determine if the state of the input, midpoint, and output sensors have changed. If any of the input sensor values have not changed (block 1820), a timer for the pallet for each midpoint sensor is set (set_4_MID) to a two-second duration at step 1825, and the values of the input sensors during this particular scan are saved at step 1830. On the next scan, if the input sensor values have changed (block 1820), a check to determine if the midpoint timer is expired will be made at decision block 1835. If the timer has expired, at step 1840, the values for the four midpoint sensors in the given chambers are set to equal the values of the four input sensors in each of the chambers, and the values for the four input sensors during a given scan are saved at step 1830. If the timer has not expired, the routine loops at step 1845 and returns to step 1810.

As will be discussed below, if an error is detected in steps 1820, 1825, 1835, and 1840, the failure of the hardware sensor can be overridden by the control routines, and thus a system operator can judge the position of a pallet based upon where the pallet should be and overriding the presence of a faulty hardware sensor.

After the initial values have been saved, the scanning loop continually scans through the loop shown in FIG. 18 to check the status of chambers and substrates passing through the system.

A motor permissives routine shown at block 815 is utilized by processor B to control pallet motion in deposition apparatus 100. The motor permissives routine, like all other system permissives, is a set of conditions governing motor actions based on pallet location in a given chamber and in the system, and control speed for the motors operating to move the pallets through the chambers. The load speed monitor routine governs the load-in speed of pallets into apparatus 100.

An I/O scanner and door control permissives block 750b is provided which functions in a manner similar to the I/O scanner used with respect to Processor A. The door permissives are utilized to control chamber door states with respect to substrate processing. Block 750b includes an I/O mapper 828b which maps and stores the location of the state of the chamber doors, the input, midpoint, and output sensors, and the open/closed state of the high vacuum valves state into the non-volatile random access memory at step 823b.

Processor B also utilizes an I/O and permissive block 720b, which includes a recipe parameter collection routine which selects parameters used on the hardware of apparatus 100 used in preparing substrates in the first four chambers of the system; a system monitor routine; an error check routine 824b which enables an input-output error handler loop 830 which accepts I/O error signals 832 and functions in a manner equivalent to routines 745a and 748a in processor A; vacuum valve permissives routines 826b which enable a heater command controller 816b and heater communication controller 818b, and vacuum gauge condition command controller 712b and VGC communications control 714b; a load speed monitor routine which acts as a permissive with respect to the transport speeds of chamber 1; and permissives routines for the roughing valves, venting valves, and high vacuum valves.

Also included is a "HOT MAG" (hot magnetic) sputtering process test 828 to determine whether the second passby heater, provided in chamber 9, is to be used to heat the pallet prior to deposition of the magnetic film layer. If not, the chamber 9 heater permissives disable heater power in chamber 9 at step 892*b*. If so, the heater 9 permissives are enabled and allow process loop 9 (block 890) to control the heaters in chamber 9. A mode control 725*b* allows a choice between the auto mode 730*b*, manual mode 732*b*, or service mode 734*b*.

Permissive loop 720*b* initializes the error scan timer 776*b*, which provides an error time out for permissives 720*b*. A timer expiration initializes the alarm monitor block 770*b*, which includes a mode error scanner 772*b*, a power supply error scanner, door error scanner, motor and sensor error scanner, and heater error scanner.

In the automated processing mode 730*b*, initialization step 880*b* includes routines for setting the heater enable switches, enabling the heaters at low power, and throttling the high vacuum valves. Initialization step 880*b* begins the transport monitor initialization at step 882*b*, the pre-magnetic sputtering heater control process (PROC 9) 890, a pallet tracking controller 870 in communication with the bar code communications controller 872, process loops 860, 862, and 864, controlling movement of the substrates through chambers 1–4, and a transport controller 866*b*.

A unique feature of the control system of the present invention is the incorporation of a substrate position detection system which allows for hardware faults in the substrate position sensors, thus allowing the balance of the control system to continue operation until a convenient time for repair of the hardware is established. This feature is represented in FIGS. 8–11 as the transport monitor control loops (883*b*, 885*b* in FIG. 8) and the soft sensor control loops (884*b*, 886*b*, in FIG. 8). Two separate checks are simultaneously run on the pallet position: one encoder-based, the other time-based. In the encoder-based loops 883*b*, 884*b*, the position of the pallet is determined relative to the values provided by encoders measuring rotation of each transport stage motor to which an encoder is coupled. In the timer-based loops 885*b*, 886*b*, the position of the pallet is determined based on a calculated speed of the pallet relative to the known motor speed setpoints. It should be understood that either system would be suitable for use in the control system of the present invention in a manner suitable to allow continued operation of apparatus 100 in the event of a hardware failure.

As shown in FIG. 8, two transport monitor and soft sensor routines, one encoder-based, the other timer-based, are used to track and override, in some instances, the position of a pallet in the system relative to the hardware position sensors. However, it should be understood that either system could be used alone.

Transport monitor routines 883*b*, 885*b* check each of the motors controlling the motion in individual chambers 1 through 4 to monitor for problems. The transport monitor checks the load sequence in a series of four load steps, and determines whether a problem with each individual motor is present based upon whether the step of motion has been completed within a given time window or encoder relationship. If not, a motor problem fault is generated. The transport monitor can also start the software position sensor override routines 884*b*, 886*b* (hereafter "soft sensor routines").

Soft sensor control routines 884*b*, 886*b* will be described with reference to FIGS. 19A–B through 21A–B. In conjunction with the sensor scanner 820, the soft sensor routines allow for the system operator to override mechanical failures in the hardware position sensors and continue processing, while tracking the position of pallets moving through the chamber with a faulty hardware sensor through software.

Figure 19A:
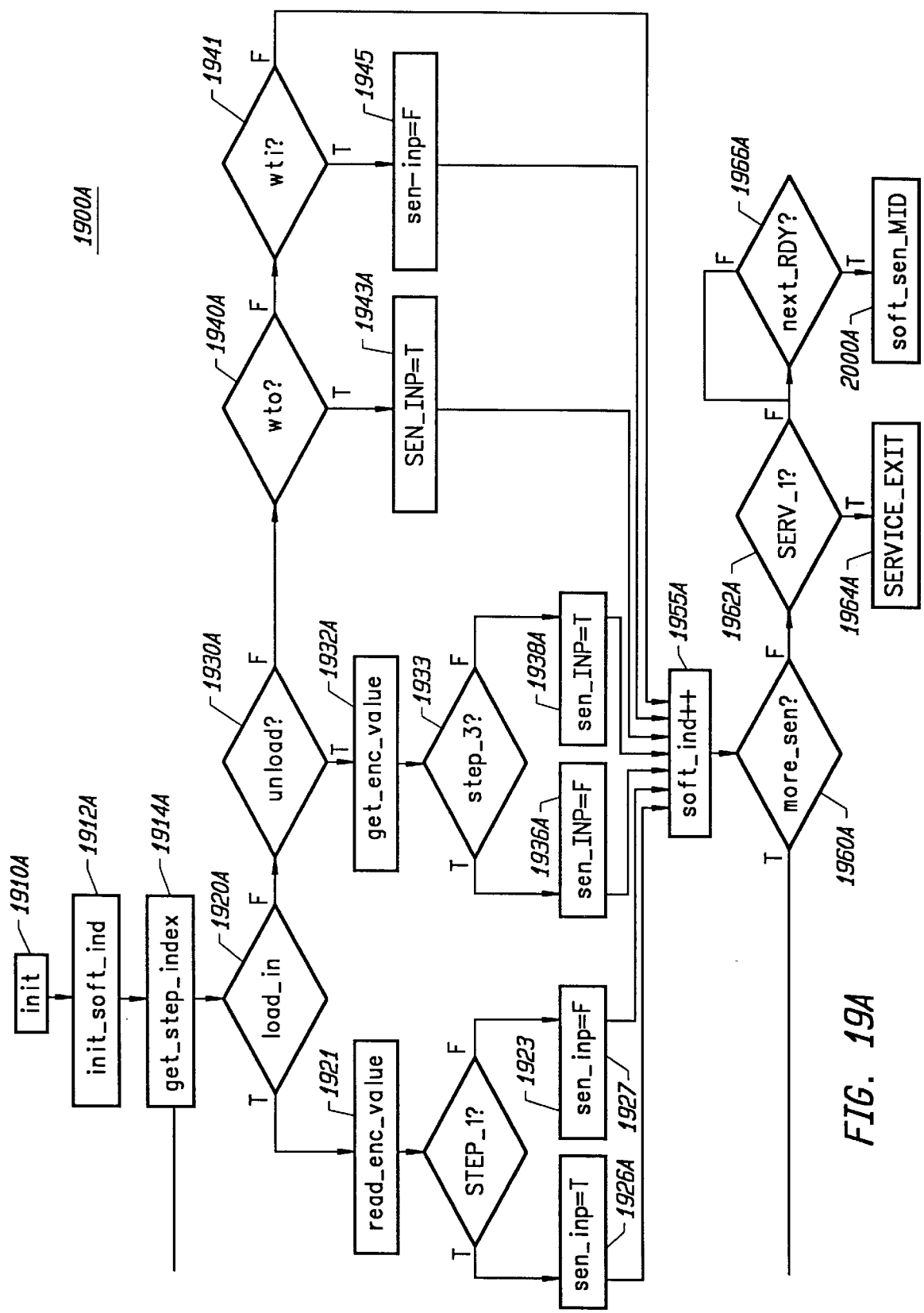
FIGS. 19A and 19B are flow diagrams of an encoder version and timer version, respectively, of the substrate position sensor software override control routines for the input position sensor at the input of a given chamber.
Figure 19B:
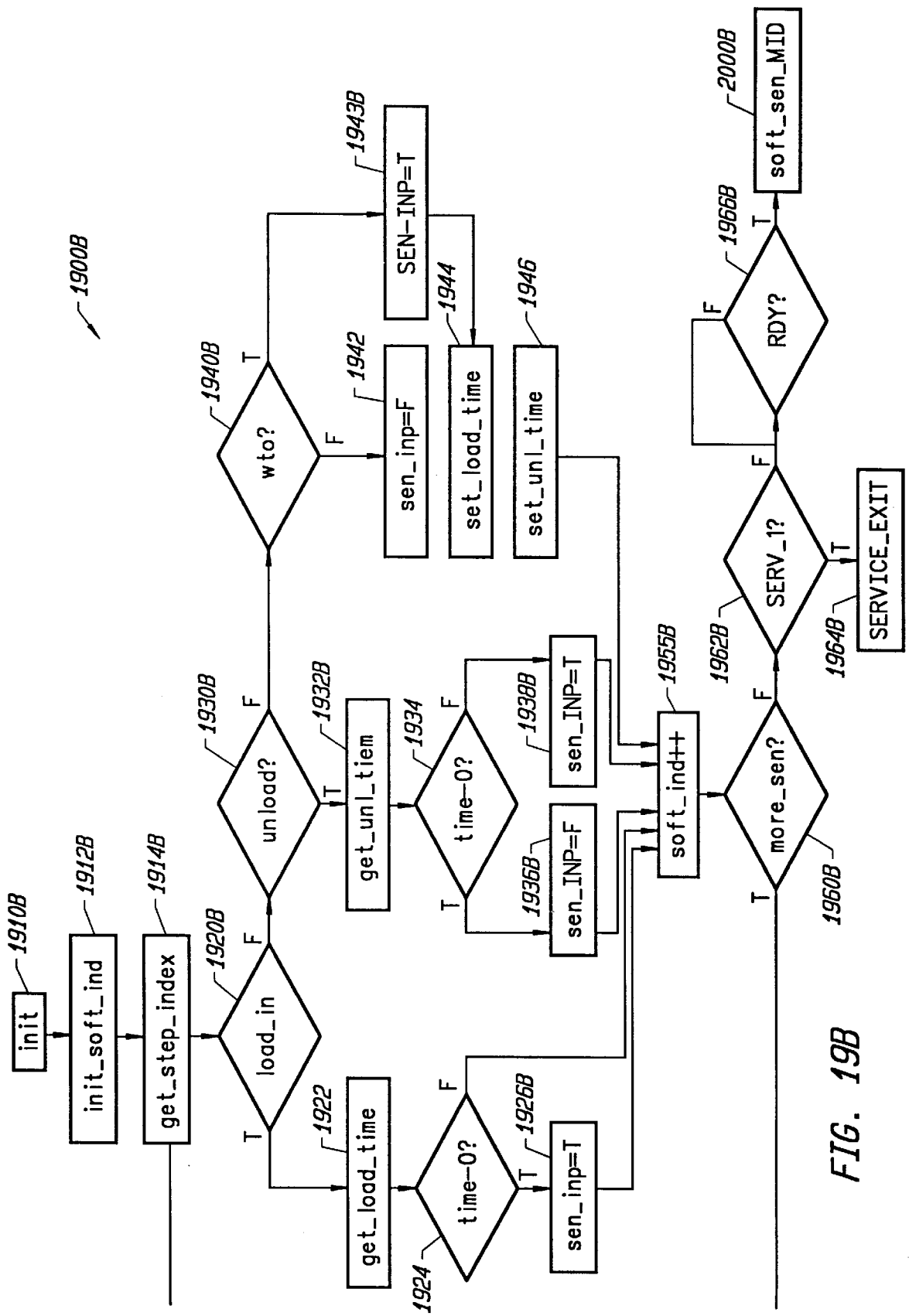

FIGS. 19A–B, 20A–B, and 21A–B represent the routines for the input, midpoint, and output sensor loops of the soft sensors for a given chamber. Routines 19A, 19B; 20A, 20B; and 21A, 21B, run in parallel to monitor the input, midpoint and output sensors of the individual chambers. As shown in FIGS. 19A and 19B, the input soft sensor routines 1900*a*, 1900*b* are initialized at step 1910*a*, 1910*b*, respectively. The processing hardware shown in FIG. 3 allows for execution prioritization of routines by processors; thus, at step 1910, the priority of the given soft sensor loop is set to ten, on a scale of one to ten. At steps 1912*a*, 1912*b*, the soft index is initialized by installing a value of one at the index location (soft_ind). The step index is returned at steps 1914*a*, 1914*b*. When the system is initialized, no pallets will be moving through the system, thus at decision steps 1920*a*, 1920*b* and 1930*a*, 1930*b*, no pallets will be loading or unloading on the particular input sensor. Thus, decision blocks 1940*a*, 1940*b* are executed as the values in decision blocks 1920 and 1930 for the load-in and unload processes of a given chamber will be initially false. Decision blocks 1940*a*, 1940*b* check the status of the "waiting-out" (WTO) bit from the status table shown in FIG. 6 to determine whether a pallet is waiting on the output of the given chamber. In the encoder version 1900*a*, if the output is false, a check is made to determine the status of the "waiting-in" (WTI) bit. If the test of the WTO bit at step 1940*a* returns true, the input sensor value is set to TRUE and the soft sensor index is incremented at step 1955*a*. In the timer version of the soft sensor loop, if the test at step 1940*b* indicates that there is no pallet waiting at the output of the chamber (as will be the case at initialization), the input sensor (sen_inp) value is set to false at step 1942, the load time value is set at step 1944 and the unload time value is set at step 1946, and the soft sensor index is incremented at step 1955*b*. In routine 1900*b*, if the WTO bit is true at step 1940*b*, the input sensor is set to TRUE. In both cases, if there are additional soft sensors, steps 1960*a*, 1960*b* cause a return to step 1955*a*, 1955*b*, which increments the index and loops to steps 1914*a*, 1914*b*, respectively.

If a "load-in" procedure has been initialized, a pallet will be waiting to be loaded into the chamber, the result of steps 1920*a*, 1920*b* will be true. In soft sensor encoder routine 1900*a*, the encoder value for a given motor is read at step 1921, and at step 1923, determines whether the load in process step number 1 has been activated. If so, the input sensor value is set to true at step 1926*a*; if not, the input sensor value is set to false at step 1927. In soft sensor timer routine 1900*b*, the current load time is retrieved at step 1922. If the load time is determined to be equal to zero at step 1924, the input sensor is set to true at step 1926*b*, indicating that the pallet will have entered the chamber and the soft index is then incremented at step 1955*b*. If the time is not equal to zero at step 1924, the soft index is immediately incremented. If an unload process is occurring in the given chamber, steps 1920*a*, 1920*b* will be false, and, at steps 1930*d*, 1930*b*, respectively, the routine determines if an unload procedure is underway. In sensor routine 1900*a*, the encoder value is retrieved at step 1932*a*. At step 1933, the routine checks whether encoder step 3 is completed. If so, the input sensor is set to false (1936*a*), while if not, the value is set to true (1938*a*). Again, the soft sensor index is incremented at step 1955*a*. In the timer routine 1900*b*, the unload time is retrieved at step 1932*b*. If the time is determined to be zero at step 1934, the sensor input is set to false at step 1936*b*. If the time is indicated as being equal to anything other than zero, at step 1938*b*, the input sensor value is set to true. The soft index is then incremented at step 1955*b*. If no additional input soft sensors are detected at steps 1960*a*, 1960*b*, a check is made to see whether a service request is made at steps 1962*a*, 1962*b*, and the routines exit to the service routine at step 1964. Next, when steps 1966*a*, 1966*b* determine the midpoint sensor routines are ready, the routines exit to the routines 2000*a*, 2000*b*, respectively, for the midpoint soft sensor.

Thus, for faulty input sensors, a value is assigned to the sensor status variable (SEN_INP) in the absence of a hardware assignment of that variable.

Figure 20B:
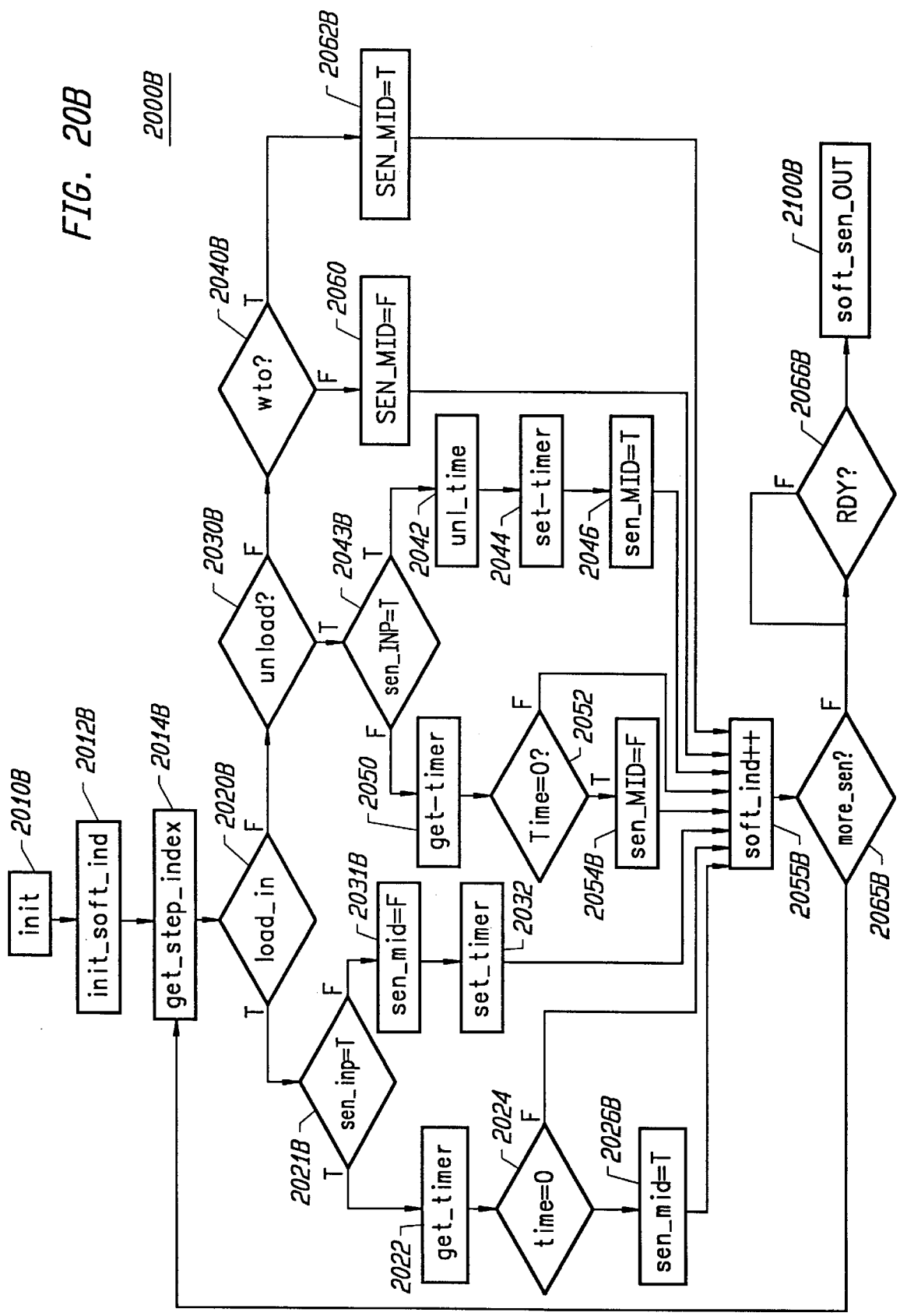

As shown in FIGS. 20A, 20B, the midpoint soft sensor control loops 2000*a*, 2000*b* are similar to that set forth in FIGS. 19A, 19B, respectively. Thus, similar reference numerals are used to indicate similar control steps.

Again, steps 2020*a*, 2020*b*; 2030*a*, 2030*b*; and 2040*a*, 2040*b* determine whether a loading condition in the system is being activated, whether an unload from the chamber is being conducted, or whether there is a pallet waiting at the output of the chamber.

At initialization, the system will be in neither a load-in nor unload mode and routines 2000*a*, 2000*b* will start at steps 1940*a*, 1940*b*. If the WTO bit is true, steps 2040*a*, 2040*b* direct that the midpoint sensor value be set to true (steps 2062*a*, 2062*b*). In routine 2000*a*, if the WTO bit is false, the WTI bit is queried, and if true, the midpoint sensor value set false at step 2045*a*. In routine 2000*b*, if the WTO bit is false, the midpoint sensor (SEN_MID) value is set to false at step 2060. If a load-in is being conducted (steps 2020*a*, 2020*b* return true), the state of the input sensor (SEN_INP) is queried at steps 2021*a*, 2021*b*. In routine 2000*a*, if the value is false, the value of the midpoint sensor is set to false at step 2031*a*, and the soft index incremented. In routine 2000*b*, the midpoint sensor value is set to false, a timer is set at step 2032, and the soft index is then incremented at step 2055*b*. In routine 2000*a*, if the input sensor value is true (2021*a*), the encoder value is returned at step 2023, a check made at step 2025 to determine whether encoder step 2 is completed. If so, the midpoint sensor value is set to true at step 2026*a*, and if not, set to false at step 2031*a*. In routine 2000*b*, if the value of the input sensor is true at step 2021*b*, the timer is retrieved at step 2022, and the value in the timer is read at step 2024 and if the timer value is zero, the midpoint sensor value is set to true at step 2026*b*.

If an unload condition is determined at steps 2030*a*, 2030*b*, the value of the input sensor is queried to determine whether it is true at steps 2043*a*, 2043*b*, respectively. If, in routine 2000*a*, the input sensor value is true, the encoder value is read at step 2051, a query is made at step 2053 to determine whether the encoder is at step 4 at step 2053 and if so, the midpoint sensor value is set to false at step 2054*a*. If the encoder value has not reached step 4, the midpoint sensor is set to true at step 2046*a*. In routine 2000*b*, if the value is true, the unload timer is retrieved at step 2042, the timer is initialized at step 2044, and the value of the midpoint sensor is set to true at step 2046. Subsequently, at step 2055*b*, the soft index is incremented. If, at step 2043*b*, the input sensor (SEN_INP) is false, the timer value is retrieved at step 2050, the value of the timer is queried at step 2052 and if the timer is equal to zero, the midpoint sensor value is set to false at step 2054*b*. If the timer value is other than zero, the soft index is incremented at step 2055*b*. In both loops, steps 2065*a*, 2065*b* check for additional sensors, and when ready (steps 2066*a*, 2066*b*), the routine 2000*a*, 2000*b* exit to the encoder and timer-based output soft-sensor control loops 2100*a*, 2100*b*, respectively.

Figure 21A:
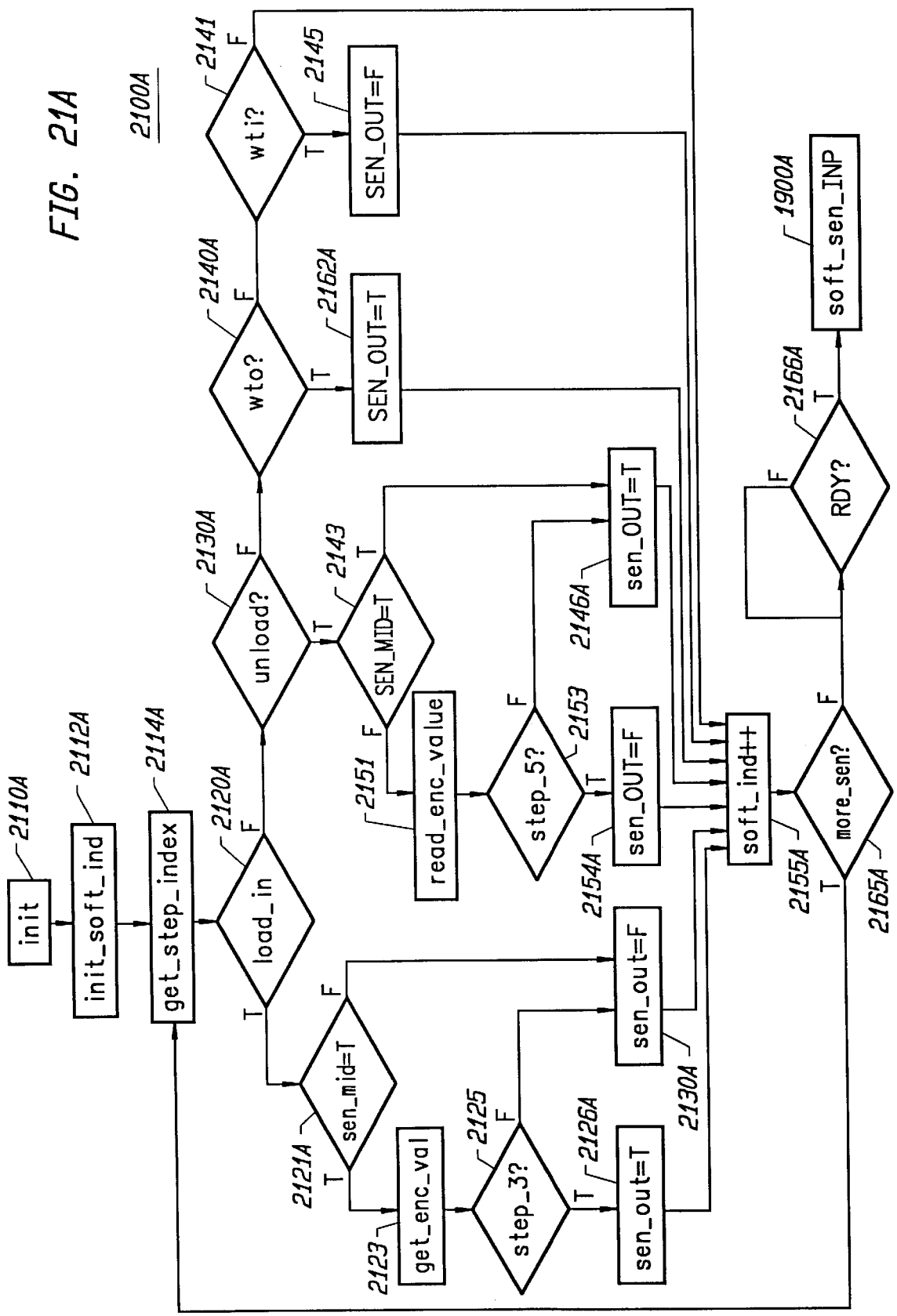
FIGS. 21A and 21B are flow diagrams of an encoder version and timer version, respectively, of the substrate position sensor software override control routine for the position sensor at the output of a given chamber.
Figure 21B:
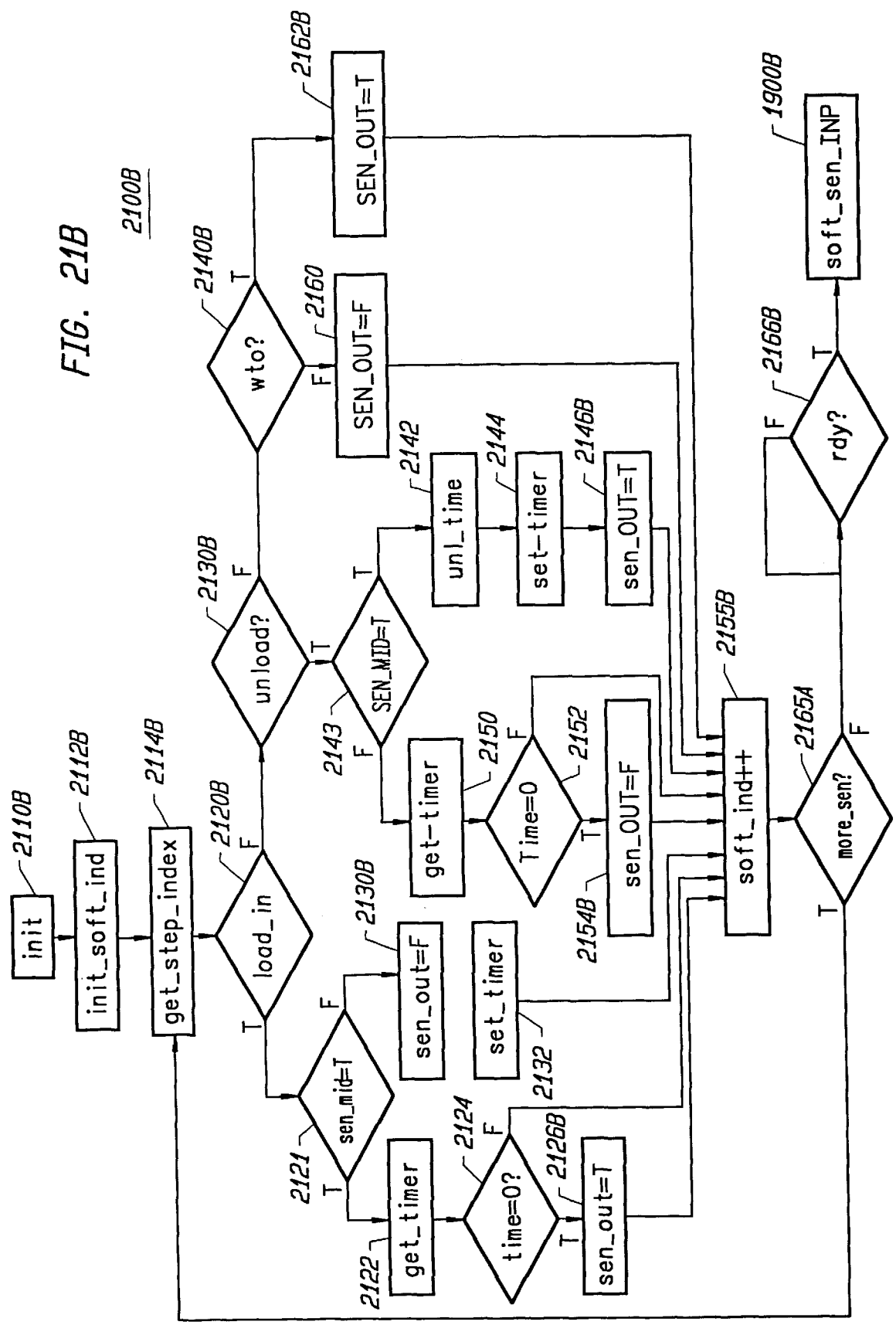

As shown in FIGS. 21A, 21B, the control routines 2100*a*, 2100*b* for the sensors at the output of a chamber are substantially identical to routines 2000*a*, and 2000*b*, respectively, set forth in FIGS. 20A, 20B, except that sensor variables and encoder step queries change where appropriate. Thus, for each chamber 1–20, upon failure of one or more hardware position sensors, the soft sensor routines can provide substitute sensor values for the balance of the routines in the system.

Returning to FIG. 8, also enabled when the auto mode is selected at step 730*b*, are the chamber 1 process routine (PROC-1) 860, chamber 2 process routine (PROC-2) 862, and chamber 4 process routine (PROC-4) 864 which control the chamber door state and the venting of the process chambers 1, 2, and 4, respectively. As shown in FIG. 8, the first process chamber includes a soft rough and soft vent routines 861A and 861B. Process chamber 1 is the load lock chamber to the apparatus 100.

Figure 22A:
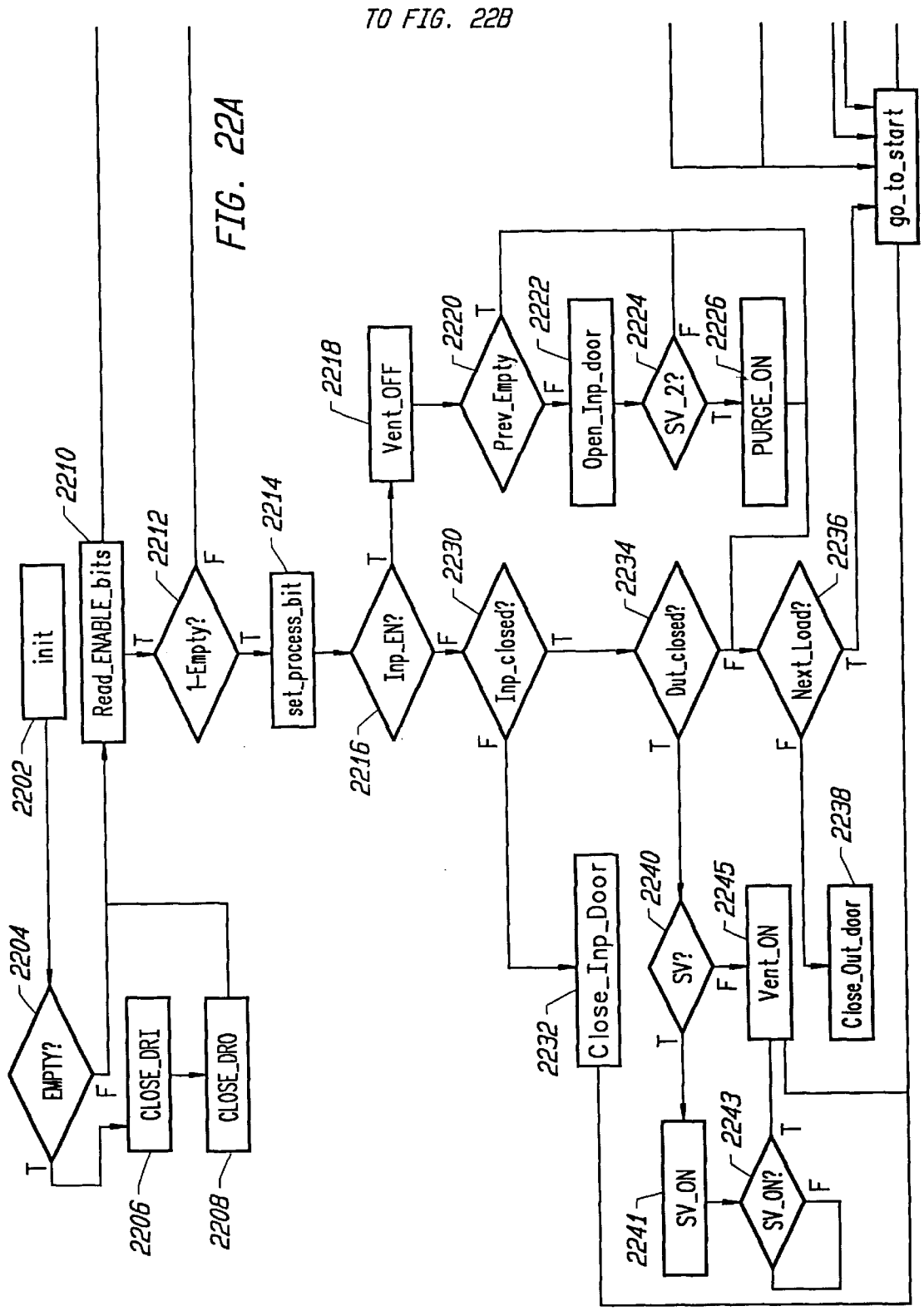
FIGS. 22A and 22B are flow charts of the control routine for controlling substrate processing in the load lock chamber.
Figure 22B:
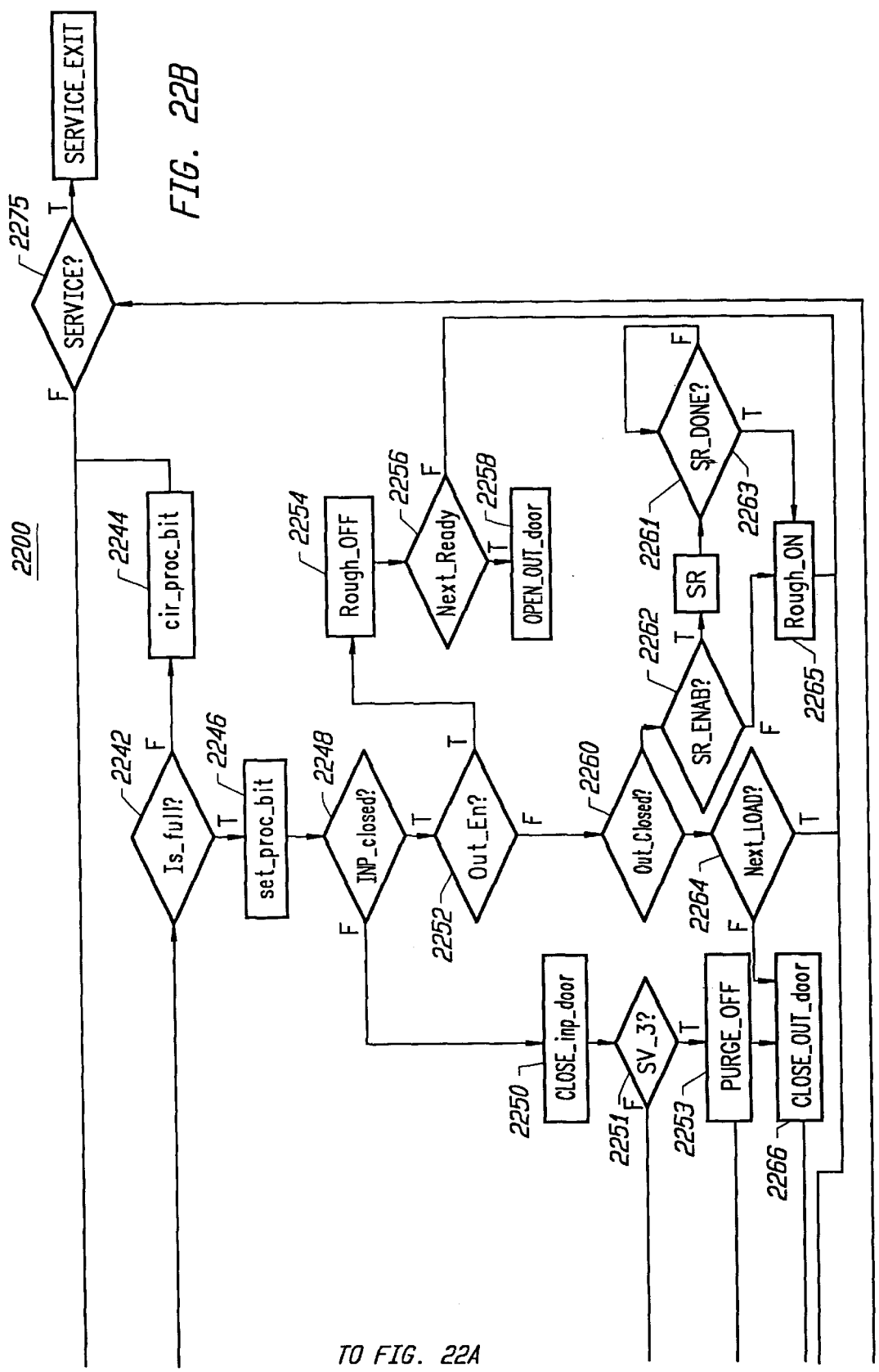

FIG. 22 shows an overview of the routine for controlling the chamber 1 processes "PROC-1" 2200 which comprises repeatedly pumping down (to vacuum) and venting (to atmosphere) chamber 1 to move pallets from the ambient pressure into the evacuated sputtering apparatus. After initialization at step 2202, a query is made at step 2204 to determine whether chamber 1 is empty. If chamber 1 is empty, the input and output doors are closed at steps 2206 and 2208. If the chamber is not empty, and after the input and output doors are closed, at step 2210 the enable bits from the status table shown in FIG. 6 are read. Again, a determination is made at step 2212 as to whether chamber 1 is empty. If chamber 1 is empty, the process bit is set at step 2214, and a query is made to determine whether the input door is enabled at step 2216. If input to the chamber is enabled, the chamber vent is set off at step 2218 and a query is made at step 2220 to determine whether the previous chamber (in this case the load-in area) is empty. If the previous chamber is not empty, the input door is opened at step 2222, a query made at step 2224 to determine whether a soft-vent request has been made (SV_2), and if so, a signal is output to initiate a soft vent chamber purge at step 2226. If the previous chamber is empty, the routine loops checks the next load step at step 2236. If, at step 2216, chamber input is enabled, a query at step 2230 determines whether the input door is closed and the routine loops to start via service query 2275. If the input door is not closed, at step 2232, the input door is closed. If the input door is closed, then a check to determine whether the output door is closed at step 2234 occurs. If the output door is closed, then a query is made at step 2240 to determine whether a soft vent of the chamber is required and if so, at step 2241, the soft vent is initiated until completed after step 2243 when the vent is enabled at step 2245. If the output door is not closed, a query is made at step 2236 to determine whether the next pallet is to be loaded. If the next pallet is not to be loaded, the output door is closed at step 2238. If the next load is waiting, the routine returns to step 2210.

If chamber 1 is not empty, as a result of its query at step 2212, a determination is made at step 2242 as to whether the chamber is full. If the chamber is not full, the process bit is cleared at step 2244. If the chamber is full, at step 2246, the process bit is set. Again, a query is made as to whether the input door is closed at step 2248. If not, the input door is closed at step 2250, a query is made at step 2251 as to whether a soft vent is required, and if so, a purge is enabled at step 2253. If the input door is closed, a query is made as to whether the output door is enabled at step 2252. If the output door is enabled, the roughing routine is turned off at step 2254 and a determination is made at step 2256 as to whether the next pallet is ready. If the next pallet is ready, the output door is opened at step 2258. If the next pallet is not ready, the routine loops back to step 2210. If, at step 2252, the output door is not enabled, a decision is made at step 2260 to determine whether the output door is closed. If the output door is closed at step 2260, a test to determine whether a soft rough pumpdown of the chamber is required at step 2262. If a soft rough is required, a soft rough is initiated at step 2261, and continues until done at step 2263. If the soft rough is not required at step 2262, or when done at step 2263, roughing of the chamber is invoked at step 2265. If the output door is not closed at step 2260, at step 2264, a query as to whether a next pallet is available for loading is made. If so, the system loops back to step 2210. If the next pallet is not available for loading at step 2264, at 2266, the output door is closed. Thus, in this manner, the load lock in chamber 1 is controlled relative to the sensing of the pallet at the input and the output doors.

Control of chamber 2 by the routine represented at block 862 (PROC-2) as shown in FIG. 8 is conducted in a similar manner.

The routine controlling chamber 4 (PROC-4), shown at block 864, controls a soak heating process in chamber 4. The soak heater process step comprises allowing the pallet to remain in the process chamber to "soak" heat from the heating elements for a predetermined period of time.

Figure 23:
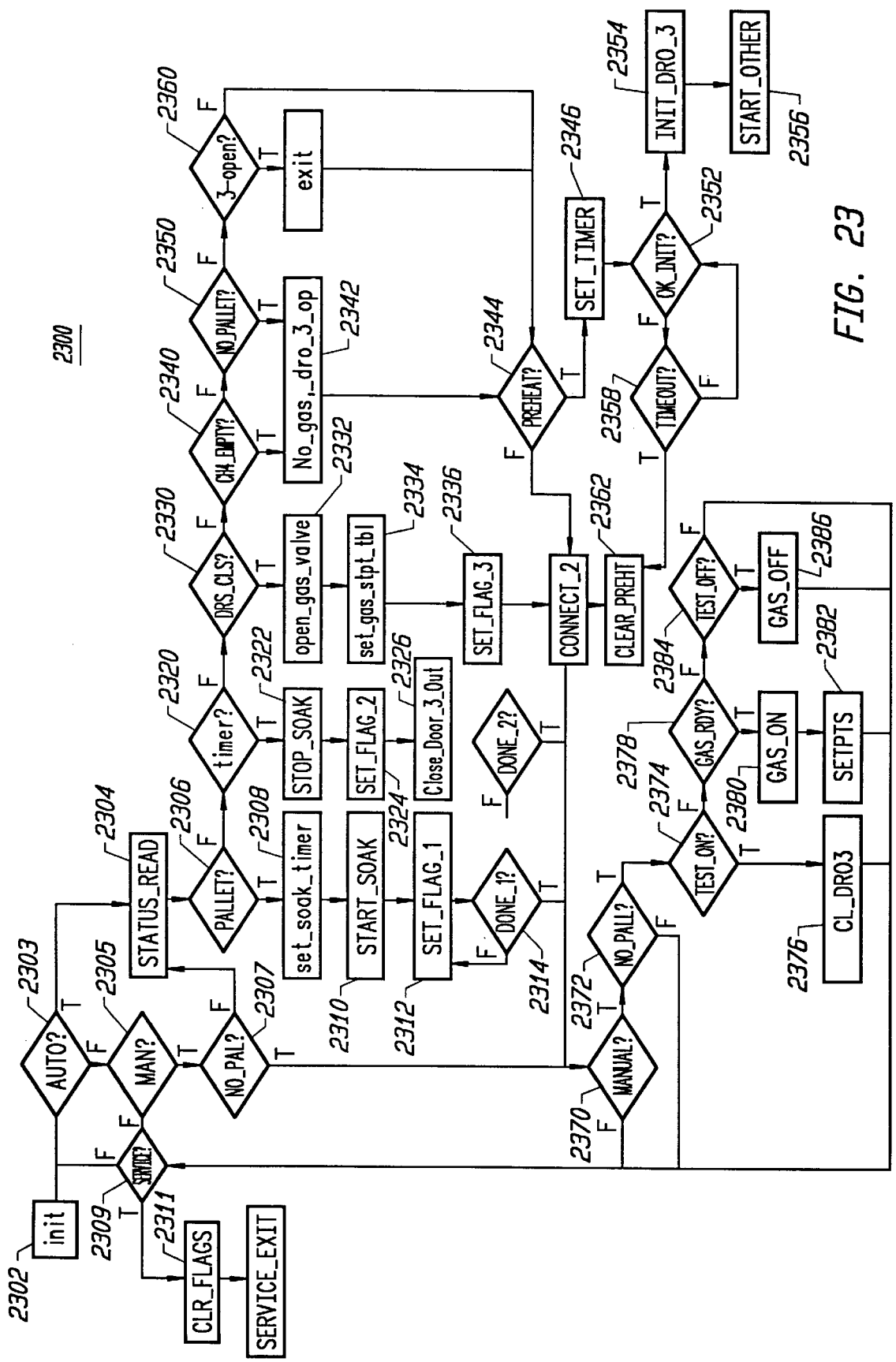
FIG. 23 is a flow chart of the steps for controlling the process in the soak heating chamber in accordance with the present invention.

The control process for chamber 4 (PROC-4) is shown in FIG. 23. After initialization at step 2302, the routine allows for an auto (2503), manual (2305) or service mode (2309) operation. In auto mode, the status of the chamber is read from the status table shown in FIG. 5 at step 2304. A query is then made to determine whether a pallet is present in the chamber at step 2306. If a pallet is present, the soak timer is set at step 2308, the soak heating is begun at step 2310, and a flag is set at step 2312. The PROC-4 routine at step 2314 maintains FLAG_1 at step 2312 until the heat timer has completed and the pallet proceeding through the system during a given process is heated to the process temperature as a result of the timed exposure in the chamber. Once completed at step 2314 the loop returns to the manual query step 2370 and, if in auto mode, returns via steps 2309 and 2303 to a status read at step 2304.

If a pallet is not present in the system at step 2306, at step 2320, the status of the timer is queried. If the timer is complete, at step 2322, the soak heating ends, the output door chamber 20 of chamber 3 is closed at step 2324, and FLAG_2 is set at step 2326. When this routine is complete, if in auto mode the routine returns to step 2304 via steps 2309 and 2303 which will be false. Step 2330 checks for door closure sensors, and if the doors are closed, the gas valves controlling the process gases used in apparatus 100 are opened, the gas set point table is set at step 2334, and FLAG_3 is set at step 2336. At step 2340, a query is made to determine whether chamber 4 is empty. If chamber 4 is empty, the no-gas, door-open flag 2342 is set. At step 2350, the system queries whether a pallet is present in the system, and if no pallet is present, the no-gas, door-open 3 flag is set. At step 2344, a preheat may be requested and, if so, a preheat timer is set at step 2346. At step 2352, if initialization of the timer is enabled, a true result at step 2352 initializes the door open 3 variable at step 2354, and exits at step 2356. If initialization fails at step 2352, a time-out step 2358 will return the routine to the connection point after clearing the preheat set at step 2362. Finally, at step 2360, the chamber 3 open sensors are queried to determine whether chamber 3's doors are open. At this point, the routine checks the integer table data to determine whether the door open and door closed sensors are active, and whether the input and output sensors on chamber 4 (SEN_INP, SEN_OUT) are active. If so, the routine exits, if not, the routine returns back to step 2304 if in automatic mode.

If a manual mode operation is selected (step 2305), the routine proceeds to step 2307 where, if no pallet is detected in the chamber, a status read is conducted at step 2404, and the process steps described above are implemented. If no pallet is present in the chamber at step 2307, the routine proceeds to step 2370 which again checks to determine whether manual operation is desired. If manual operation is desired at step 2370, another pallet check is made at step 2372, and, if no pallet is present in the chamber, at step 2374 a test is made to determine whether the routine is in a test mode. If the routine is in a test mode, the chamber 3 output door bit is set to closed at step 2376. If the routine is not in a test mode, at step 2378, a test to determine whether the gas backfill has been prepared in the apparatus 100 is made at step 2378. If the gas is not ready, at step 2384, a check is made to see whether the test to the system is to be terminated and if so, the gas is shut down at step 2386. If the gas is ready, the gas status bit is set to ON at step 2380, and the heater setpoints are set at step 2382. The routine loops back to step 2309 and the auto/manual/service loop comprised of steps 2303, 2305, and 2309.

In FIG. 8, the magnetic sputter chamber pre-heater control process (PROC 9) is shown at block 890. Process 9 at block 890 is utilized to pre-heat a pallet, prior to magnetic layer deposition, with the pallet continuing in motion between chambers 8 through 10. Thus, PROC-9 routine sets the heaters to a high power set-point for a period of time while the substrate is in the chamber, and sets the heaters to a low power set-point as the pallet moves through the chamber, to ensure even heating. The PROC-9 process control enables a low power heater routine 892b and a high power heater routine 894b, which are enabled by a heater command control 896b functioning with a heater communication control 898b.

Briefly, heater controller 890 interprets the heater low power 892b and high power 894 commands through the heater communication control. Heater command controller 896 ensures that the setpoints in blocks 892b and 894b have been reached by checking the heating setpoints against known heating times and the outputs of hardware heat sensors.

Also shown in FIG. 8 are pallet tracker 870 and bar code communications control 872 routine blocks. In conjunction with apparatus 100, each pallet may be utilized repeatedly to carry substrates through apparatus 100 and a number of pallets will be in use at any given time (some in process, some being loaded, some being unloaded, and some on return track 50). Pallets move from chamber 1 to chamber 20 and are returned to chamber 1 via the return conveyor 50. Repeated use of the pallets during the deposition process will eventually cause a build-up of material on the pallets themselves, changing the physical characteristics of the pallet after a number of process runs. These changes may be compensated for in variations in system processing (such as heating temperature and time changes, and transport speed changes); after a number of uses, the pallet may be cleaned and refurbished. In order to track the usage of each specific pallet in the system, each pallet may be provided with a bar code, identification number and a bar code scanner (not shown) is provided to read the bar code in a fashion well known to one of average skill in the art. The control system of the present invention can maintain data on each of the particular pallets in use based on the pallet's bar code identification number, and make minor adjustments to the system's operating parameters to compensate for minor changes in the pallet throughout the pallet's useful lifetime. The bar code communication control 872 interprets the bar code read commands and provides bar code ID's to pallet tracker control 870. Pallet tracker control 870 reads the bar code, determines the number of uses which the pallet has made, and records the uses.

FIG. 8 also shows a "ready" transport system block 866b which enables the chamber transport control loops 870 and the transport position correction loops 872. As noted, the hardware components of the transport system include a number of transport stages, each having a motor which powers substrate movement at each stage. In the control system of the present invention, the single motor per stage is logically divided into two motors, an "input" motor and an "output" motor. It should be understood, however, that a single motor per stage is in use and this arbitrary logical division is purely a design choice.

Ready transport control routine 860 determines whether a position correction is required for pallets in a given chamber, and for pallets moving in other chambers at the same time. A transport control test 868 is first made to determine whether transport of a pallet in the system is OK. If correction is required in chamber N, the position of pallets moving elsewhere in apparatus 100 may also be affected. Transport control routine 860 checks chambers N+1, N−1 and N−2 and selects between the chamber 1–4 position control routines represented at block 870, and the correction location control routines shown at block 892 are invoked.

Figure 24A:
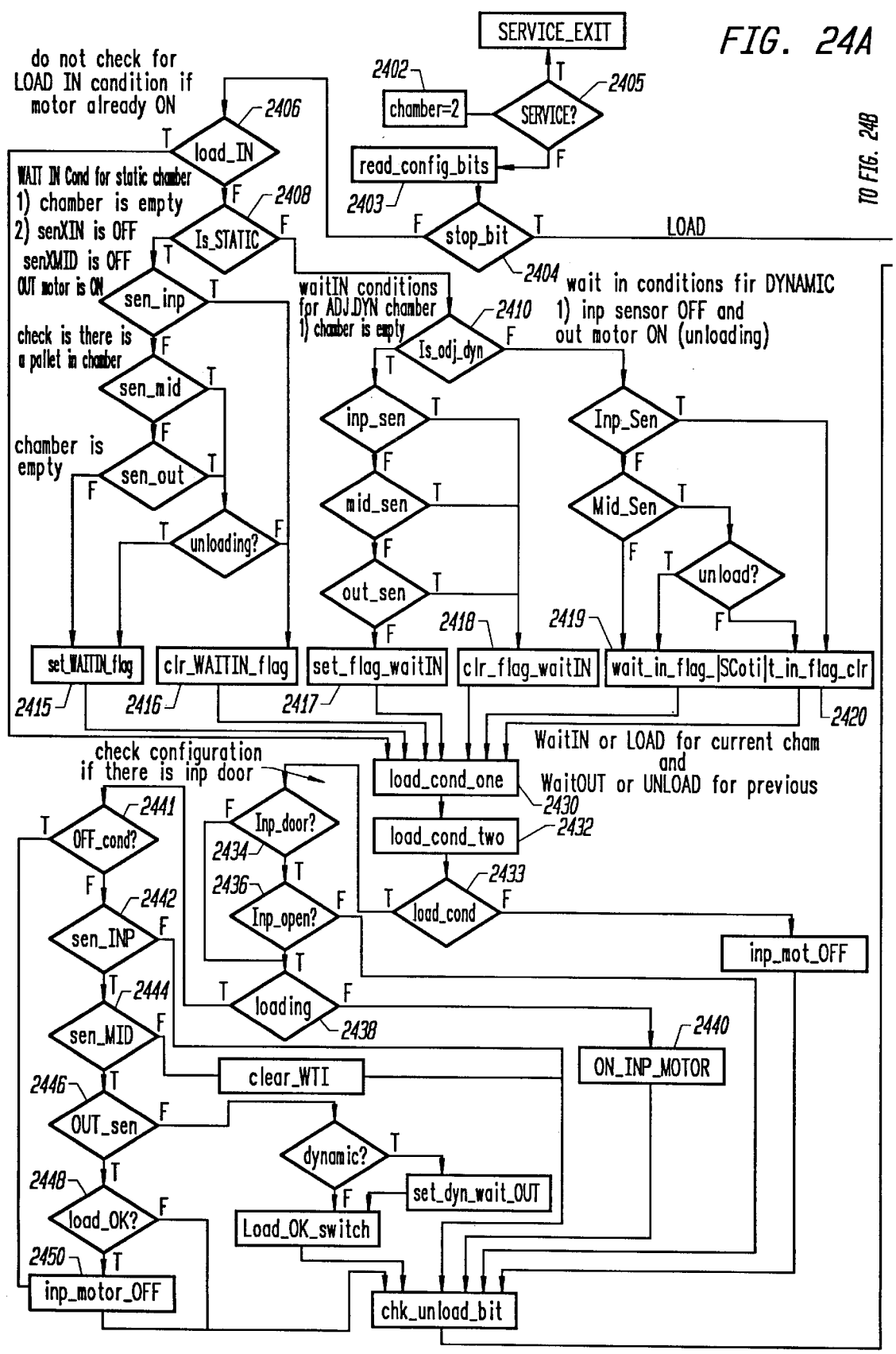
FIGS. 24A and 24B are flow charts of the process steps for controlling transport of substrates in the process in the first chamber, the load lock chamber, of the apparatus shown in FIGS. 1–2.
Figure 24B:
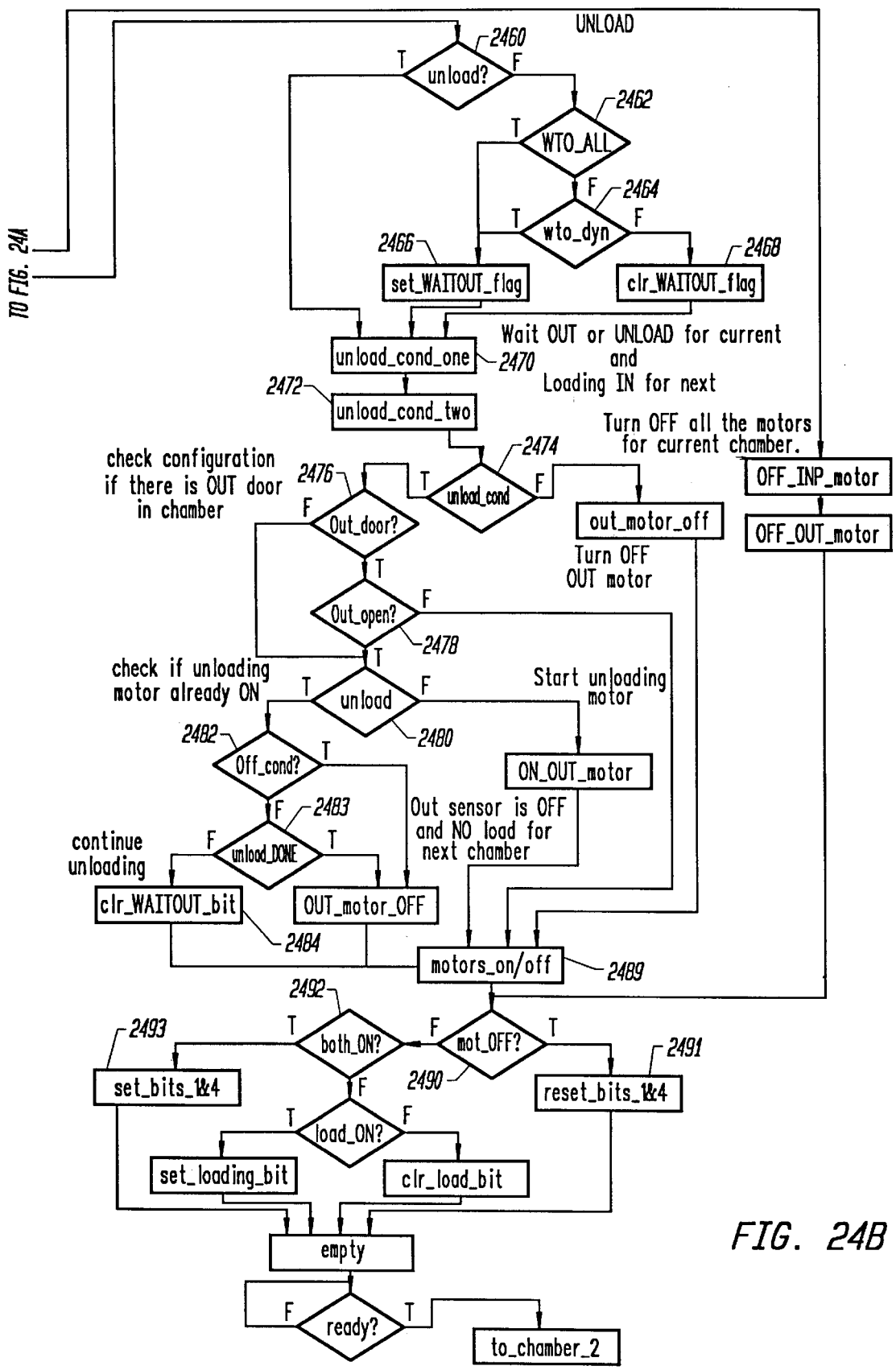

A typical transfer routine (such as those present in block 872) is shown in FIG. 24, in this case for chamber 1. After initialization at step 2402, a check to see if a service exit is desired at step 2405, and a read of the configuration table at step 2403, a determination is made at step 2404 as to whether a stop-bit on the motors has been enabled. If a stop-bit has not been enabled, the load-in condition at step 2406 is not checked since the input motor for the chamber will already be on. Steps 2408 and 2410 govern setting and clearing of the WAIT-IN flag at steps 2415–2420, respectively, based upon whether the chamber configuration is static, adjacent or dynamic. At step 2406, if a load-in condition is not detected, determination is made as to whether the chamber is a static chamber (step 2408) and if so, then if the chamber is empty, (i.e., the input, midpoint, and output sensors are false), and the output motor sensor is on, the wait-in flag is set at step 2415. If the chamber is not static, at step 2408, the chamber is a dynamic or adjacent chamber, and if the chamber is empty and unloading, the wait-in flag is set. If the chamber is not adjacent or dynamic, then only the input sensor and midpoint sensors must be vacant for the wait-in flag to be set at step 2419. Once the wait-in flags are set, the load-in conditions 1 and 2 are set at steps 2430 and 2432, respectively, for a WAIT_IN or LOAD at the current chamber, and a WAIT_OUT or unload of the previous chamber.

At step 2433, if the load conditions are established, at steps 2434 and 2436, the configuration of the chamber is checked to determine whether an input door is present. If the query at step 2438 is false, the input motor in the chamber is turned on at step 2440. If not, after a check for an OFF condition of the input motor at step 2441, each sensor input stage is queried at steps 2442, 2444, 2446, and 2448 until the pallet enters the chamber and the motor is shut off at step 2450, and the routine checks the status of the unload bit at step 2455. The routine then runs through an unload sequence, beginning at step 2460. If an unload condition is not present, as determined at step 2460, steps 2462 through 2468 determine whether there is a waiting pallet at the output of all chambers (step 2462) or dynamic chamber 5 (step 2464) to set the wait out flag, and set unload conditions 1 and 2 at steps 2470 and 2472. If unload condition 1 (a pallet waiting at the current chamber output) and condition 2 (a pallet loading into the next chamber) are true, in a manner similar to steps 2434 through 2450, the configuration is checked at steps 2474–2478, an unload check made at step 2480 (flagging the "output" motor). At step 2482, if the system is not in an OFF condition, an unload completion check is made to determine when the output sensor is off at step 2483. If this condition is true, at step 2484, the "output" motor will be turned off; if not, the wait out bit is cleared. At the end of the unload loop, the motor status will be recorded at step 2489. If the motors are in fact off, as determined at step 2490, the bits will be reset at steps 2491. If both logical motors are on (step 2492), bits 1 and 4 are set (step 2493). The routine will exit to chamber 2. If both logical motors are not on (2492 is false), a load check is made at step 2494 and the load bit set accordingly.

The routines controlling pallet movement shown in block 872 and in other chambers of the system are similar to that shown in FIG. 24 for chamber 1.

The correct location routines represented at 872 in FIG. 8 are implemented if ready transport control 868b determines that the pallets in apparatus 100 are out of position.

Figure 25B:
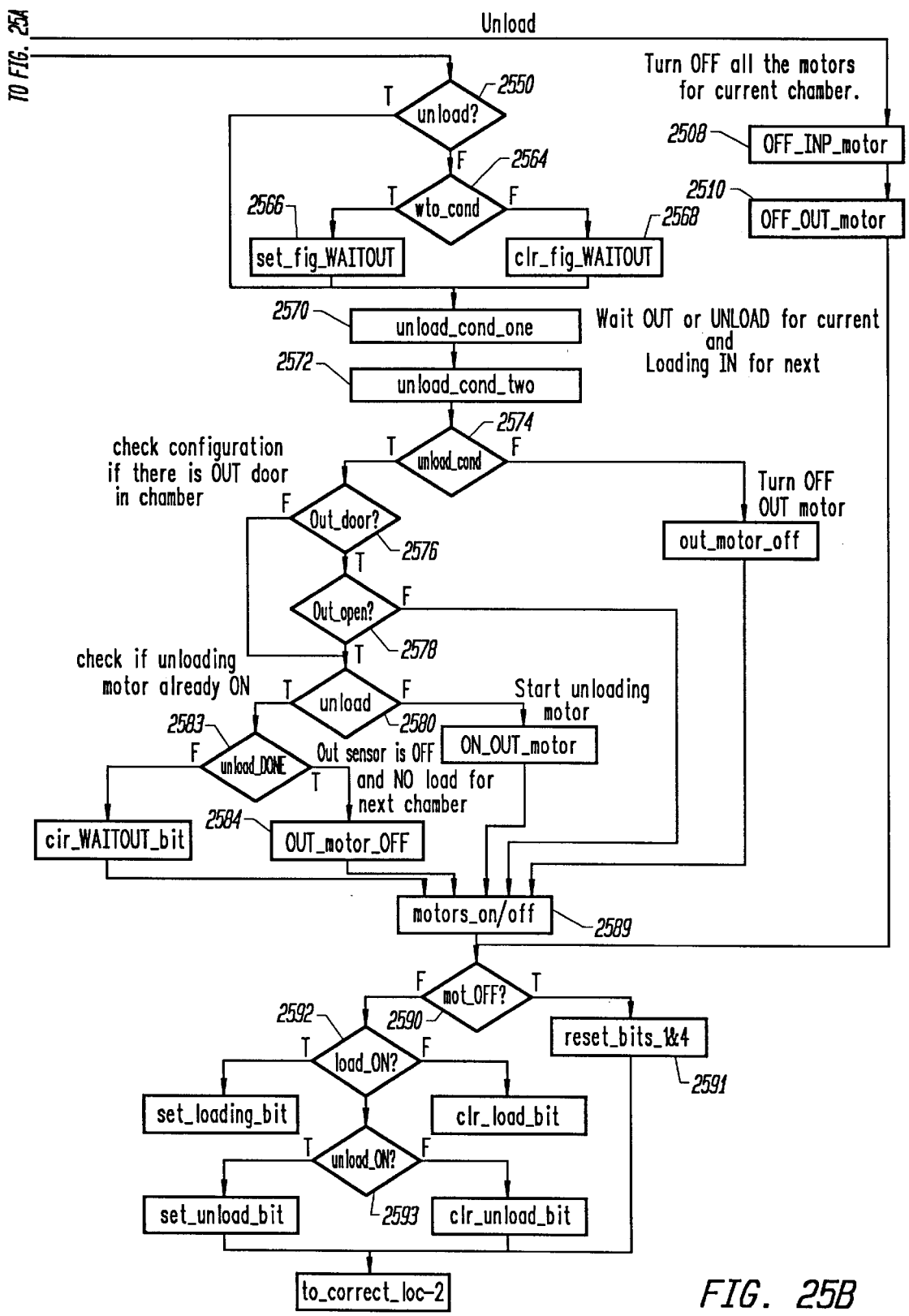

FIG. 25 shows an example of one of the correct location routines 2500 represented in block 892, for chamber no. 1. Correct location routine 2500 is similar to the chamber 1 transport routine 2400 shown in FIG. 24. After initialization of step 2502, the configuration bits are read at step 2504 and if a stop bit is present at step 2506, the motors are shut off at steps 2508 and 2510. If a stop bit is not present, the routine checks the status of whether the chamber is in a load-in mode at step 2512 and if so, load condition 1 and load condition 2 are retrieved at steps 2514 and 2516. This requires that the present chamber be in a wait-in or LOAD state, and a wait-out or LOAD state is present in the previous chamber. A query is made at step 2518 to determine whether the load condition bit is set. If so, the wait-in flag is set and load conditions 1 and 2 are returned at steps 2514 and 2516. If the load condition 1 is false, the logical "input" motor is turned off at step 2523. If load condition 1 is true and load condition 2 is true, at steps 2522 and 2524, the routine then checks for the presence of a pallet at the current chamber input at step 2526 and at the previous chamber output at step 2528. If either condition at 2526 or 2528 is true, the logical "input" motor is shut off. If load condition 1 is true and load condition 2 is false, and the system is loading, as checked at step 2530, the midpoint sensor is checked at step 2532, the output sensor is checked at step 2534, the load conditions are checked at step 2536, until the load conditions indicate that the pallet is in the correct position and the input motor is shut off at step 2538. If the system is not loading at step 2530, the input motor is turned on at step 2540. Subsequently, the unload bit is retrieved and checked at steps 2542 and 2550. The unload control steps following step 2550 are similar to the load steps set forth above.

If an unload condition is determined at step 2550, unload conditions 1 and 2 are set at steps 2570 and 2572, respectively. If an unload condition is not found at step 2550, a waiting-out condition bit is checked at step 2564, and the wait-out flags are set and cleared at steps 2566 and 2568, respectively, based on the result of step 2564. The unload condition is again checked at step 2574 and if the unload condition returns false, the logical "output" motor is turned off. If the unload condition output is true, the presence of an output door on the given chamber is checked at steps 2576 and 2578. If an output door is present, a check is made at step 2580 to determine if an unloading is to occur. If so, at step 2583 a check to determine whether the unload is completed is made at step 2583, and if so, the logical "output" motor turned off at step 2584.

The state of the logical motors is recorded at step 2589.

At step 2590, the status of the motors is checked again, and if the logical motors are off, bits 1 and 4 are re-set at step 2591. If the logical motors are not off, the load status is checked at step 2592 and the loading bit set or cleared depending on the output of steps 2592, 2593.

It should be readily recognized that the flow path of the "unload" steps of correct location are designed to provide the pallet location correction in the system relative to the chamber process in a manner similar to the load condition. Chamber correction routines for other chambers in the system are similar.

Returning to FIG. 8, a manual operation mode, shown at block 732b, allows the system operator to manually control throttling of the high vacuum valves at 830b, and to manually invoke the heater ramp-up process for chamber 9 at block 890, the pallet tracker routines 870, the control routines processes for chambers 1, 2, and 4 at blocks 860, 862, and 864, and the transport control system 866. Where applicable, interaction of the manual control with loops 890, 870, 2200, 862, 2406 and 2500 has been discussed above.

A service mode 734b includes a stop process 842, allows the system operator to open the high vacuum valves, turn off the heater power, and the sputtering gas supply at block 843b, and includes a transport control routine 844b to allow for movements of the pallets through the system during the service loop.

A number of utility routines 860 for closing the high vacuum valves, turning off heater power in chamber 9, managing the pallet data, initializing the printer, dispersing the parameters of the recipe for applying films to the pallet, restoring the non-volatile random access memory, securing the system, monitoring the system, and establishing the auto, manual, or service modes may also be implemented by processor B.

Figure 9A:
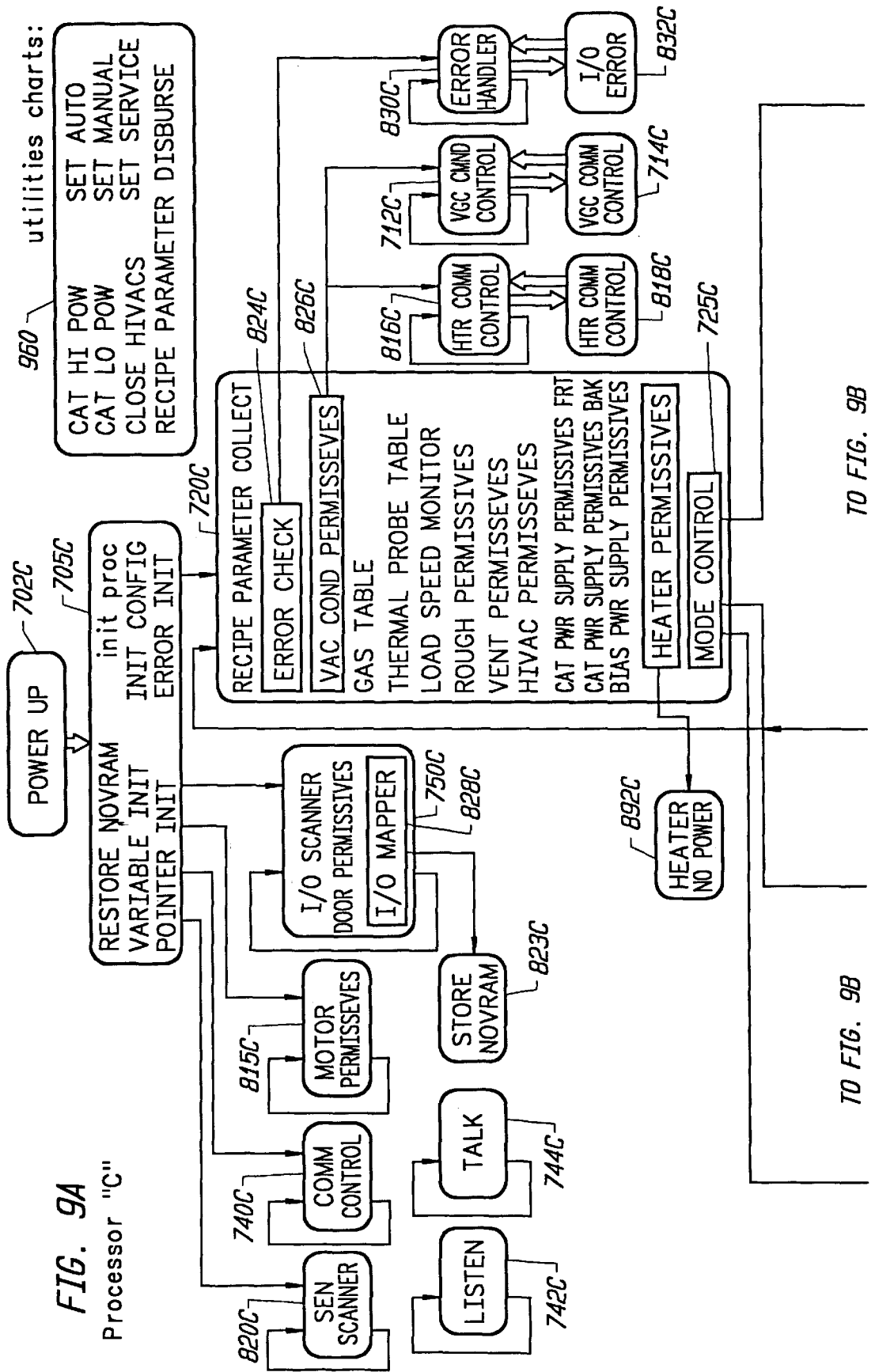
FIGS. 9A and 9B are flow diagrams of the functional control routines utilized by a third processor, processor C, in accordance with the present invention.
Figure 9B:
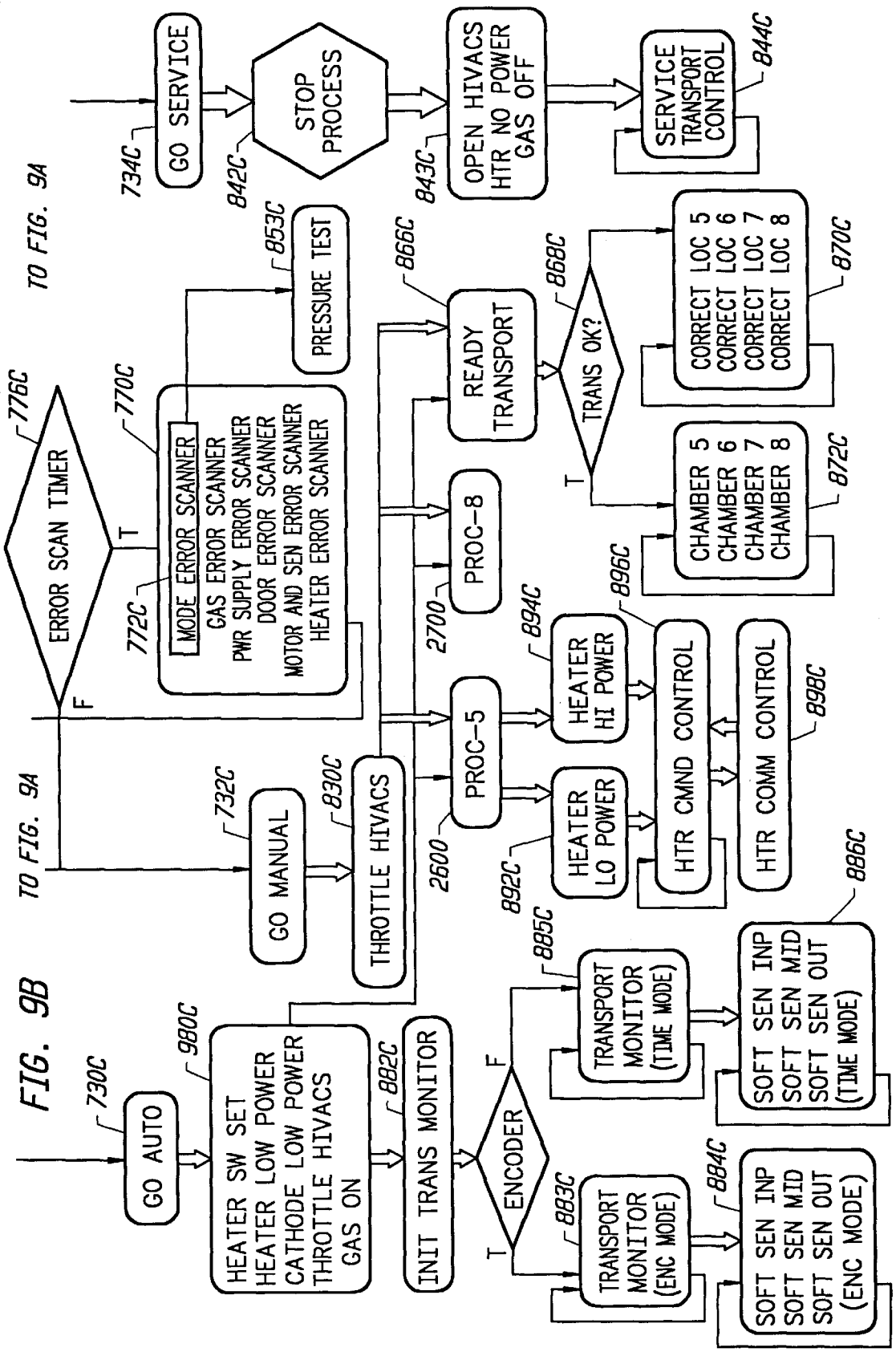

FIG. 9 is a block diagram representing the control routines executed by processor C to control processing in apparatus 100 in chambers 5 through 8. As utilized in the apparatus 100, chamber 5 is the "pass-by" heater chamber, and chamber 8 is the chrome deposition chamber. As will be understood by reference to FIG. 8, several of the functional loops which are used by processor C are equivalent to those used by processors A and B.

One distinction of the routines utilized by processor C relative to processor B is that permissive loop 720c includes additional permissive routines for the sputtering hardware in chamber 8, including cathode power supply permissives, and bias power supply permissives. (The bias power supplies are utilized to provide an AC bias to the pallets carrying the substrates during deposition. The process whereby an AC bias is provided to a pallet moving through an apparatus in accordance with the present invention is described in PCT Publication No. PCT/US92/00722.

As shown at block 980, the automatic mode initialized step 980 includes not only the heater timer set step, the heater low power set routine and the high vacuum valve throttle routines (which are utilized in processor B as shown in FIG. 8), but also a cathode low power initialization routine and a sputtering gas initialization routine. Initialization step 980 activates processing steps for the chamber process in chamber 5 at step 990, and chamber 8 at step 970, as well as the transport monitor 882c, the soft sensor routines at 883c, 884c, 885c and 886c, and the transport control system at 866c, all being equivalent to those set forth with respect to FIG. 8 and processor B, but with minor variations to accommodate chambers 5 through 8.

Figure 26:
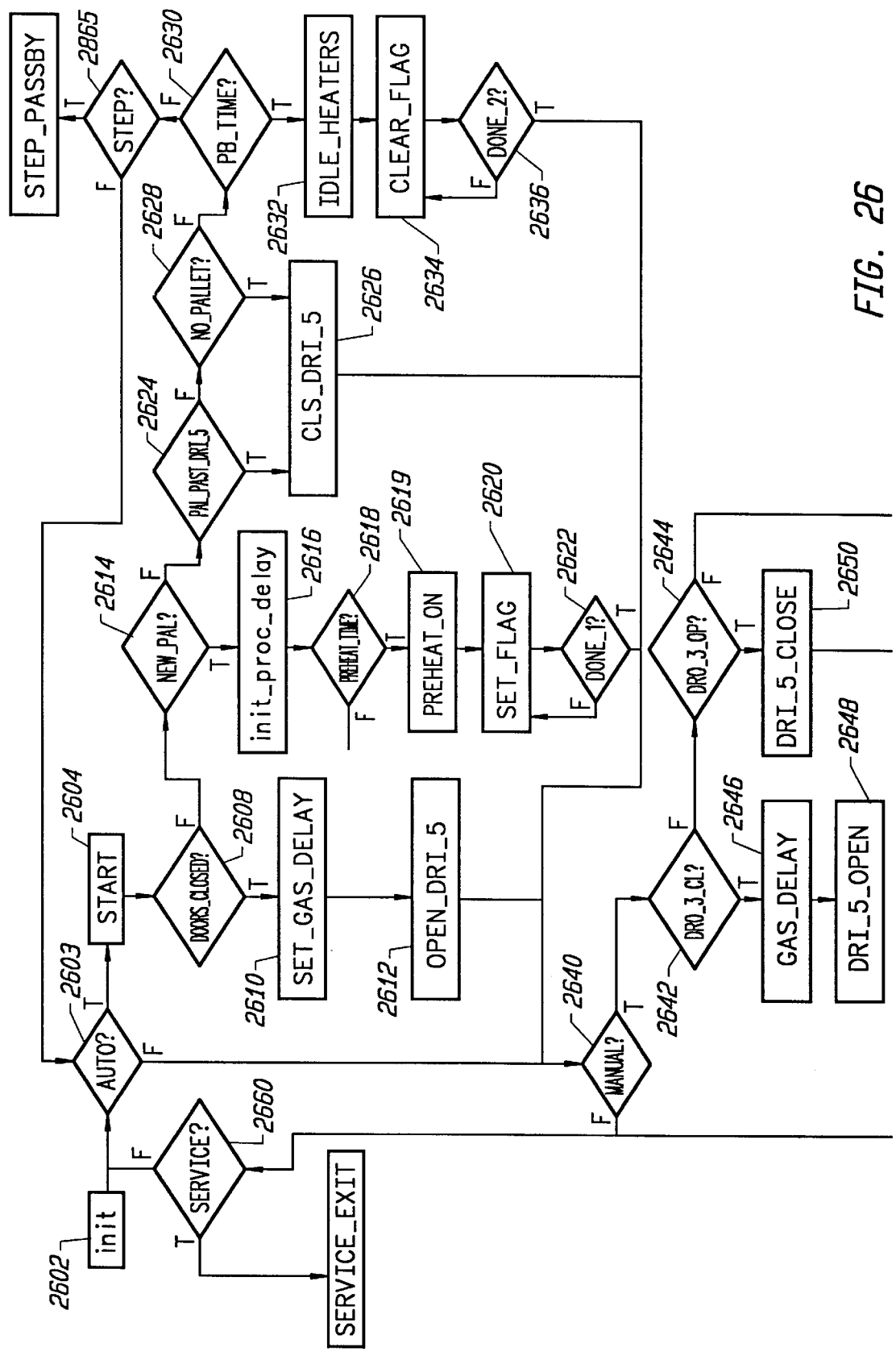
FIG. 26 is a flow chart showing the process steps for controlling the process in the pass-by heating chamber of the apparatus in FIGS. 1–2 in accordance with the present invention.

FIG. 26 shows the process control routine 990 used to control processing in chamber 5 of the apparatus of the present invention. Chamber 5 is the "pass-by" heater chamber which completes heating of pallets exiting soak heater chamber 4, and is designed to heat pallets as they move through the chamber. After an auto mode check at step 2603, at initialization 2602, routine 990 starts at block 2604 and proceeds with a check to see if the chamber doors are closed at step 2608. If the doors are closed, the gas delay is set at step 2610 and the entrance door to chamber 5 is opened at step 2612. If the chamber doors are not open, the system checks to see if a new pallet is being entered into the chamber at step 2614. If a new pallet is being entered, a process delay is set at step 2616, the pre-heat time is retrieved from the recipe parameter settings, pre-heating begins at step 2618, the pre-heat flag is set at step 2620, and pre-heating of the pallet is completed at loop 2622 until completed. If at step 2614, a new pallet is not being entered into the chamber, the system checks at step 2624 to determine whether the pallet has passed the door input to chamber 5. If the pallet has passed this step, the input door is closed at step 2626. The input door is also closed at step 2626 if no pallet is found in the system as a result of the query at step 2628. If the pallet heating time is complete at step 2630, the heaters are set to idle at step 2632, the pre-heat flag is cleared at step 2634 and the process waits for the next pallet by returning to the start at step 2604. If the preheat time has not completed at step 2630, a step query is made at 2865 and if true, the routine moves to an incremental step passby heat process, similar to the routine shown in FIG. 26. The step heat process allows incremental power levels of the heaters of chamber 5. If not, the process returns to step 2608.

If a manual mode is selected, the result of step 2603 will be false, and a manual mode check will be made at step 2640. If manual mode is selected, at step 2642, a determination will be made whether output door 3 is closed at step 2642. If door 3 is closed, the gas delay will be initiated at step 2646, and the input door of chamber 5 will be opened at step 2648. The routine will return to step 2603 via service query block 2660. If the output door of chamber 3 is not closed at step 2642, the result of query at step 2644 will be true, and the input door of chamber 5 will be closed at step 2650.

Figure 27:
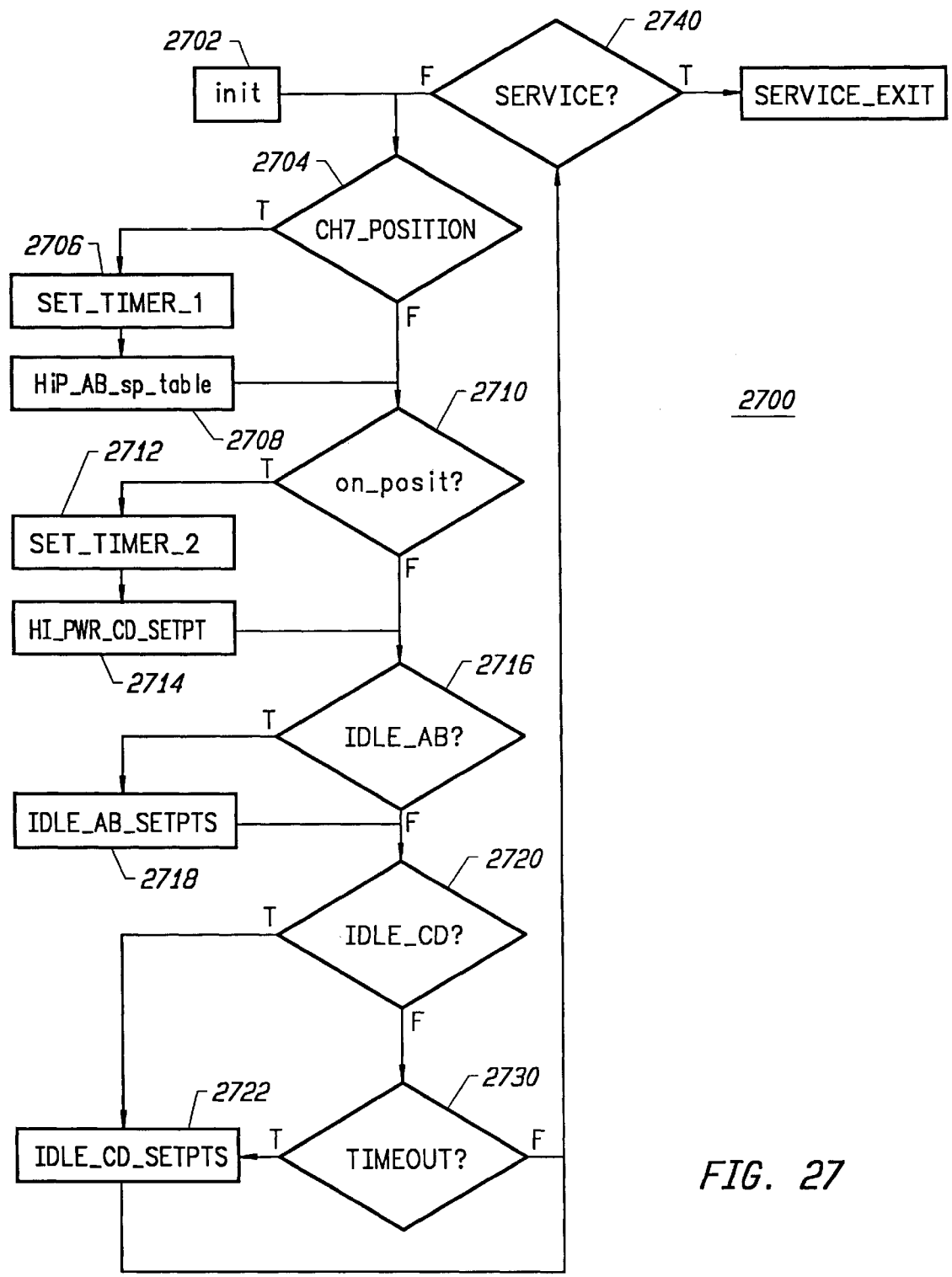
FIG. 27 is a flow chart showing the process steps for controlling the chrome deposition in the chromium sputtering chamber of the system of the present invention.

Shown in FIG. 27 is process routine 2700 for chamber 8, used in apparatus 100 to deposit a chrome layer onto substrates. Routine 2700 is a timing loop for activating and deactivating the sputtering cathodes to a high power mode when a pallet is passing through chamber 8. At process initialization at step 2702, the position of a pallet in chamber 7 is queried at step 2704. If a pallet is present in chamber 7, a first high-power timer is set at step 2706, and the high-power setting of the power supplies coupled to cathodes A and B in chamber 8 is initialized at step 2708. If the pallet is on position as a result of the query in step 2710, the second timer for cathodes C and D in chamber 8 is set at step 2712, and the high-power set-point bit is set at step 2714.

At step 2716, if cathodes A and B are idle as a result of the timer having expired or the positions queries at steps 2704 and 2710 being false, the A and B setpoints are idled and the power is returned to a low power setpoint at step 2718. The same is true at steps 2720 and 2722 for cathodes C and D. If the CD cathodes are not idle, a timer checks for a timeout fault at step 2730, which will set the CD setpoints at idle. A service block exit 2740 is provided.

Like processors A and B, processor C includes a utilities set 960 of functional routines which allow the operator to manually set the high power of the cathodes (CAT_HI_POW), set the lower power of the cathodes (CAT_LO_POW), close the high vacuum valves, disperse the recipe parameters, and set the automatic, manual, and service modes as shown at functional block 960.

Figure 10B:
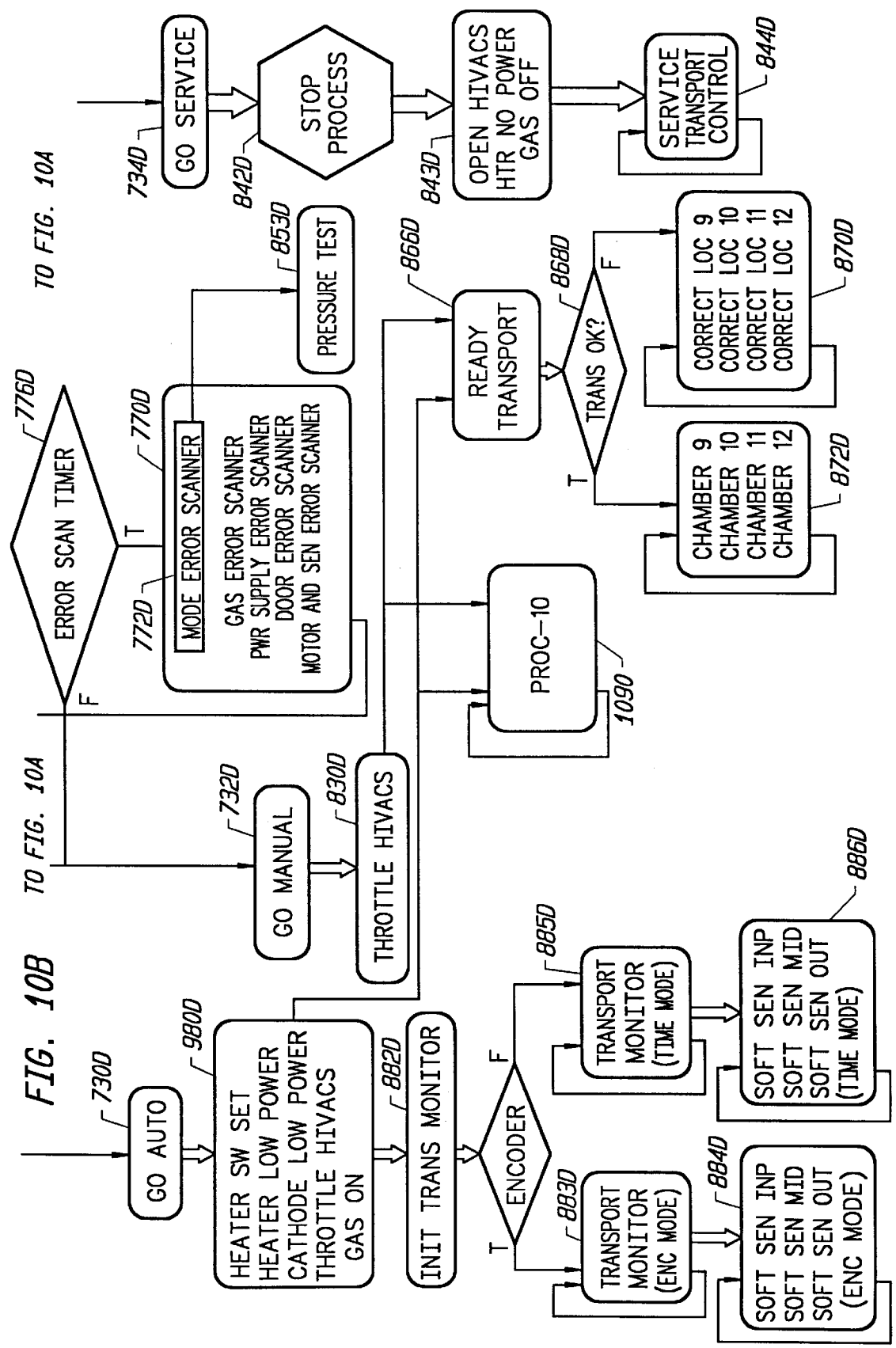

FIG. 10 shows the control routines processed by processor D controlling processing in chambers 9–12 of apparatus 100. The control routines shown in FIG. 10 for processor D are similar to those shown in FIGS. 8 and 9 for processors B and C, respectively. Again, the permissives loop 720*d* is slightly different since processor D is controlling chambers 9 through 12 of the system, which include the magnetic layer sputtering process in chamber 10, but do not include any heating process chambers. As a result, there are no heater permissives in loop 720*d* as no control over heaters is required. Initialization functional block 980 is somewhat different in that only a low power initialization for the cathodes must be implemented, the sputtering gases must be turned on, and the high vacuum valves must be throttled. A single process control loop for the process in chamber 10, PROC-10, is shown at block 1090. As should be readily recognized, all the other functional blocks shown in FIG. 10 are equivalent to those in FIGS. 8 and 9. The process loop for the magnetic sputtering occurring in chamber 10 is identical to that shown in FIG. 27, including the timing for chamber 10 is a function of the position of the pallet in chamber 7.

Figure 11B:
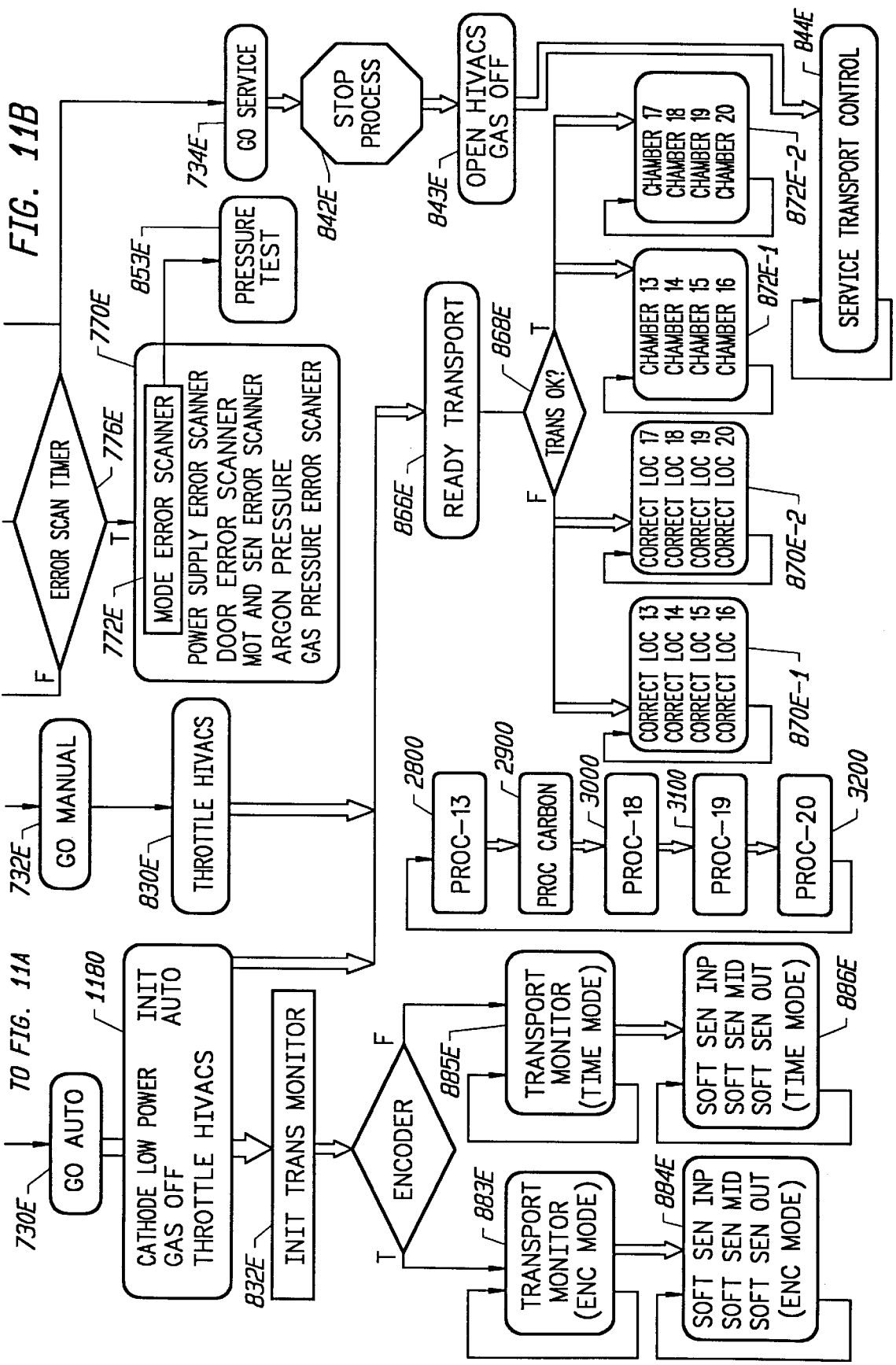

FIG. 11 is a flow diagram representing control routines which are processed by processor E to govern substrate movement and process flow in chambers 13–20.

Processor E controls twice as many chambers as processors B, C, and D, and thus additional routines are utilized by processor E. For example, two separate sensor scanner blocks 820*e*-1 and 820*e*-2, and two separate motor permissives blocks 815*e*-1 and 815*e*-2 are utilized by processor E. Again, permissives loop 720*e* is slightly different than those provided for processors B, C, and D.

Alarm control loop 770*e* includes an argon pressure measurement routine and a gas pressure error scanner routine. Again, the routines controlled by processor E allow the system operator's choice between automatic, manual, and service modes. In the automatic mode, the initialization block 880*e* initializes the low power of the sputtering cathodes, turns the gas control valves off, and throttles the high vacuum valves. The initialization step enables processing loops "PROC-13" for chamber 13 at step 2800, "PROC-15 CARBON" for carbon chamber 15 at step 2900, and an exit lock procedure for chambers 18, 19, and 20 at steps 3000, 3100, and 3200, respectively. The transport control 866*e* also includes twice the number of functional blocks since the chamber controllers 870*e*-1 and 870*e*-2 are doubled, as are the location correction controller 872*e*-1 and 872*e*-2.

Figure 28A:
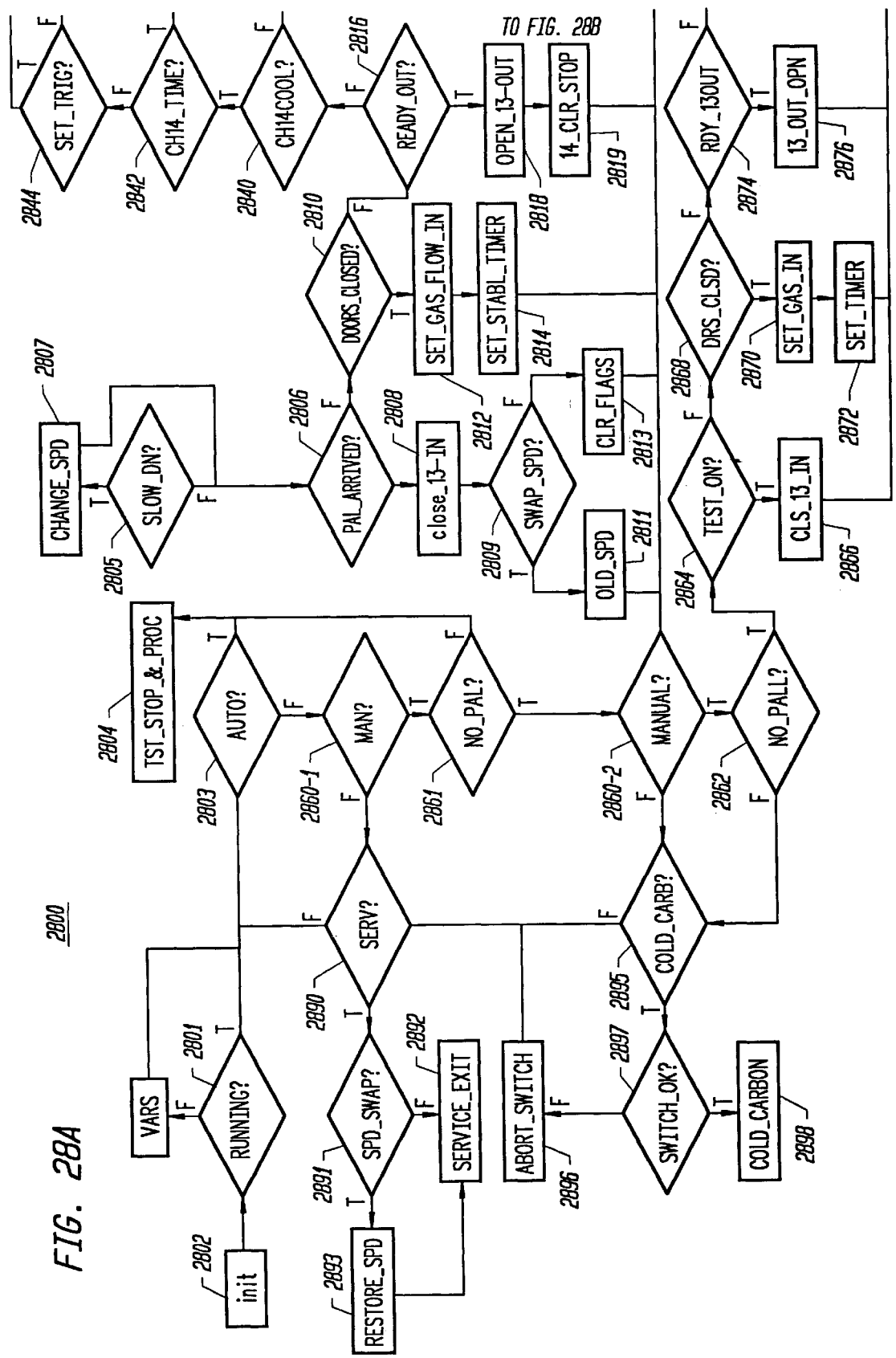
FIGS. 28A and 28B are flow charts showing the process steps for controlling the processing in a buffer chamber between the magnetic sputtering chamber and the carbon deposition chamber in accordance with the apparatus shown in FIGS. 1–2.
Figure 28B:
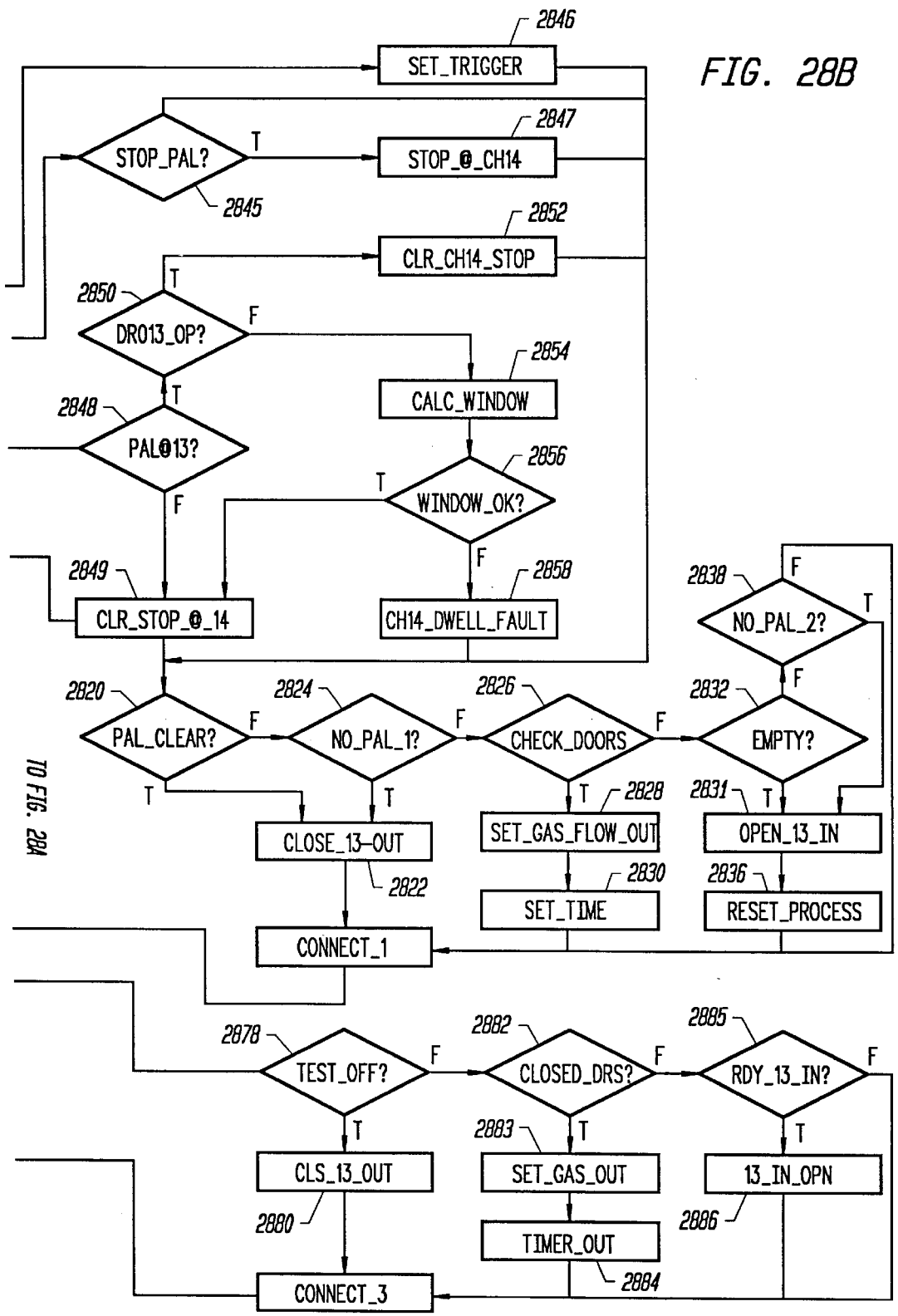

FIG. 28 shows the process routine for providing a process isolation buffer chamber by controlling chamber isolation doors in chamber 13. Chamber 13 comprises a buffer chamber which provides total isolation between the pressure status of chambers 1 through 12 from chambers 14 through 20. The specific uses and advantages of such a chamber are described in co-pending patent application Ser. No. 08/311,351. After initialization at step 2802, initially, a check is made at step 2801 to determine that the manufacturing process is running. If auto mode is selected (step 2803), the status of the stop and process bit is checked in step 2804. A first decision step 2805 determines whether a speed slowdown in the chamber is necessary, and if so, a speed change occurs at step 2807. Thereafter, step 2806 queries whether a pallet has arrived in the chamber. If a pallet has arrived at step 2808, the input door to chamber 13 is closed and a query made at step 2809 as to whether the non-slowdown speed may be re-initialized. If so, the old speed is returned at step 2811, and if not, the flags are cleared at step 2813. If no pallet has arrived, step 2810 determines whether the chamber doors are closed, and if the doors are closed, the gas flow to the chamber is set at step 2812 and the stabilization timer is initialized at step 2814. If the doors are not closed, a pallet may be ready to exit the chamber at step 2816. If this is true, the output chamber door is opened at step 2818 and the chamber 14 output door is opened and the chamber flag cleared.

If the pallet is not ready to exit the chamber, step 2840 queries whether cooling panels provided in chamber 14 are to be utilized to cool a pallet as it exits chamber 13. If so, the chamber 14 durational rest time for the pallet is queried at step 2842. If there is no time set, a check is made at step 2844 to determine whether a trigger should be set, and if so, the trigger is set at step 2846. If no cooling is to be used at step 2840, the clear_stop bit at chamber 14 bit is set at step 2849, and the routine proceeds to step 2820. If no trigger is to be set at step 2844, a query is made as to whether the pallet should be stopped at step 2845. If the pallet should be stopped, the stop bit at chamber 14 is set at step 2847. If cooling is to occur (step 2840=TRUE) and the timer is to be initialized in chamber 14, at step 2848, the routine queries whether the pallet is in chamber 13, and if so, at step 2850, queries whether the output door for chamber 13 is open. If the output door is open, the chamber 14 stop bit is cleared at step 2852. If the output door to chamber 13 is not open, a calculation window is checked at step 2854, and if the window is OK at step 2856, the stop at chamber 14 is cleared at step 2849. If the window is not OK, at step 2858 a chamber 14 dwell fault is initiated.

At step 2820 a check is made to determine whether the pallet has cleared chamber 13. If the pallet has cleared the chamber at step 2820, the output door is closed (step 2822) and if there is no pallet in the chamber as queried at step 2824, the output door is also closed at step 2822. A second door query is made at step 2826, and if the doors are in fact closed, the gas flow_out bit is set at step 2828, and the timer for gas flow is set at step 2830. If the chamber is empty as a result of the query at step 2832, the input door is opened at steps 2831 and the process re-set at step 2836. A check is made at step 2838 for a second pallet. If the chamber is not empty, and no second pallet is approaching the system, the result of the decision step at step 2838 will return the loop to step 2860-2.

If a manual operation mode is selected, block 2803 will be false and block 2860-1 will be true. At block 2861, a test will be made to determine whether a pallet is present in chamber 13. If there is a pallet in chamber 13, the stop in process bit is checked at step 2804 and the routine proceeds through the above-described steps. If no pallet is present in chamber 13, a second test for a manual operation mode is made at step 2860-2 and if manual operation mode is in fact desired, a second pallet check is made at step 2862. If no pallet is present in the chamber, a test at step 2864 determines whether the testing sequence is on. If the testing sequence is on, the input door to chamber 13 is closed at step 2866. If the testing sequence is not on, a check to determine whether both doors of chamber 13 are closed is made at step 2868. If both doors are closed, the input gas is set at step 2870 and the timer for the input gas is set at step 2872. If both doors are not closed a check is made to determine whether the pallet is ready to exit chamber 13 at step 2874. If so, at step 2876, the output door to chamber 13 is opened. If the pallet is not ready to exit chamber 13, a query as to whether the system test is off is made at step 2878. If the test is completed, the output door to chamber 13 is closed at step 2880. If the test is not completed, a second check to determine whether the doors are closed is made at step 2882 and if so, a gas release is set at step 2883 and a timer to implement the output of the gas is set at step 2884. If both doors are not closed at step 2882, a check is made to determine whether chamber 13 is ready for an input pallet at step 2885. If so, chamber 13's input doors open at step 2886.

At step 2895, a check is made to determine whether a cold carbon process is desired in subsequent process chamber 15. This will enable cooling panels utilized in chamber 14 to be activated. If a cold carbon process is desired at step 2895, a test is made at step 2897 to determine whether the switch is on. If the switch is OK, the cold carbon process is initiated at step 2898. If not, at step 2896, the switch is aborted.

A service loop is accessible at step 2890. Before a service exit at step 2892, the system checks at step 2891 to determine whether a speed swap was enabled by routine 2800, and the speed is restored at step 2893 if the speed swap occurred.

Figure 29:
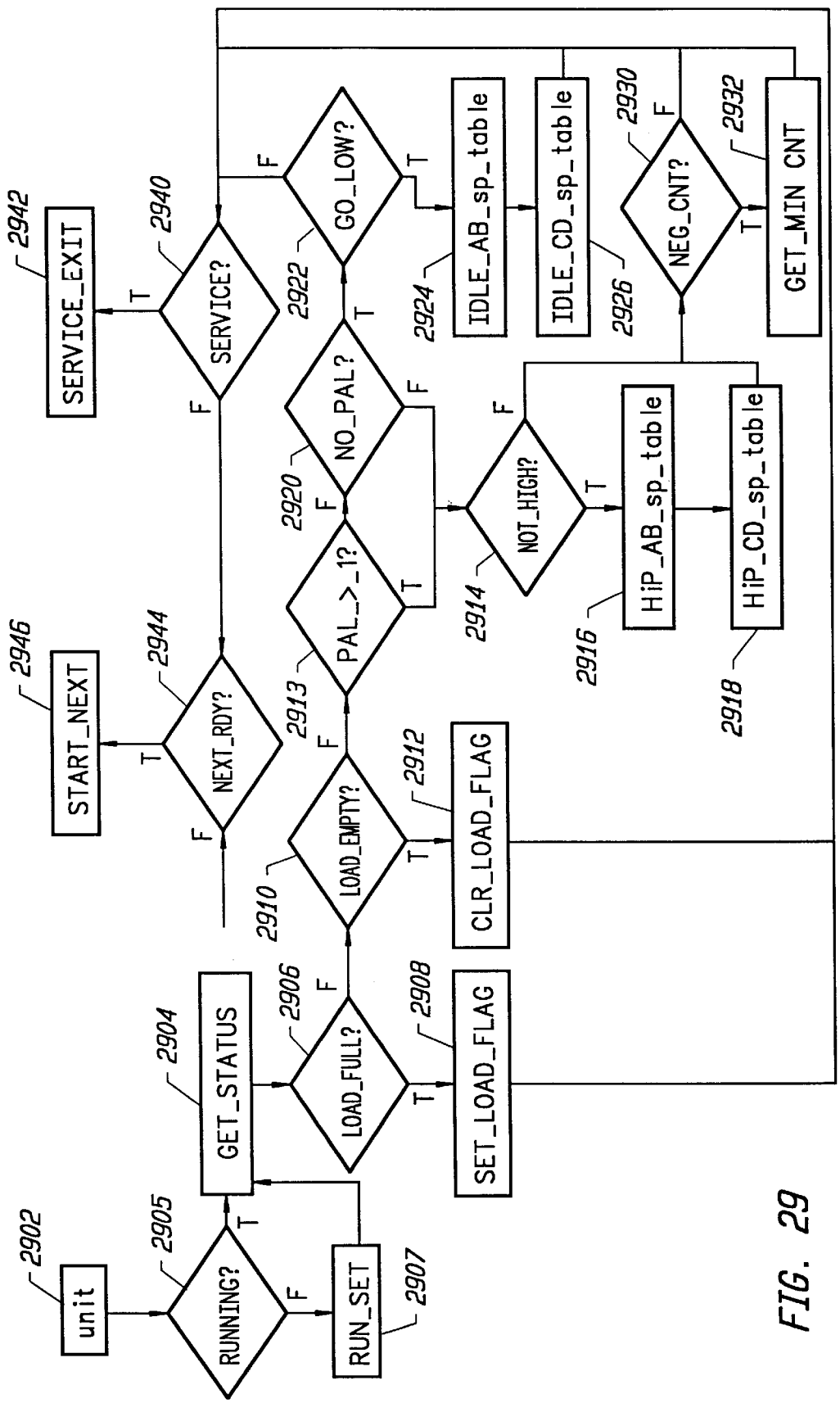
FIG. 29 is a flow chart showing the process steps for controlling the processing in a carbon deposition chamber of the system of the present invention.

FIG. 29 shows a flow diagram of the control routine for the processing in chamber 15, initialized in apparatus to deposit a carbon overcoat layer on a disk substrate.

After initialization at step 2902, and the running query loop represented by steps 2905 and 2907, the status of the carbon chamber is retrieved at step 2904. A query is made to determine if a pallet is to be loaded into the chamber at step 2906. If a pallet is to be loaded, a load flag is set at step 2908 and the routine loops back to the status check step 2904. If no load is to be made, a query is made at step 2910 to ensure the load is empty, and the load flag cleared at step 2912. If the number of pallets moving into the chamber is greater than 1, as tested at step 2913, and the power supplies coupled to the carbon cathodes are not on high power (step 2914), the high power setpoints are set at steps 2916 and 2918. If step 2914 is false or after the high power setpoints of cathodes C and D are set, a test to determine whether a negative load 2930 count was returned, and if so, a minimum count is set at step 2932. (A pallet count is maintained when each pallet is loaded into the system; steps 2930, 2932 act as a fail-safe in the event pallets are removed from the system manually and the counter does not reflect an accurate count of actual pallets in the system.) If no pallet is present, the result of step 2920 will be true and step 2922 will set the cathode supplies to low power at steps 2924 and 2926. The system then loops to a service exit at steps 2940, 2942 and a next ready step loop at steps 2944 and 2946.

Figure 30:
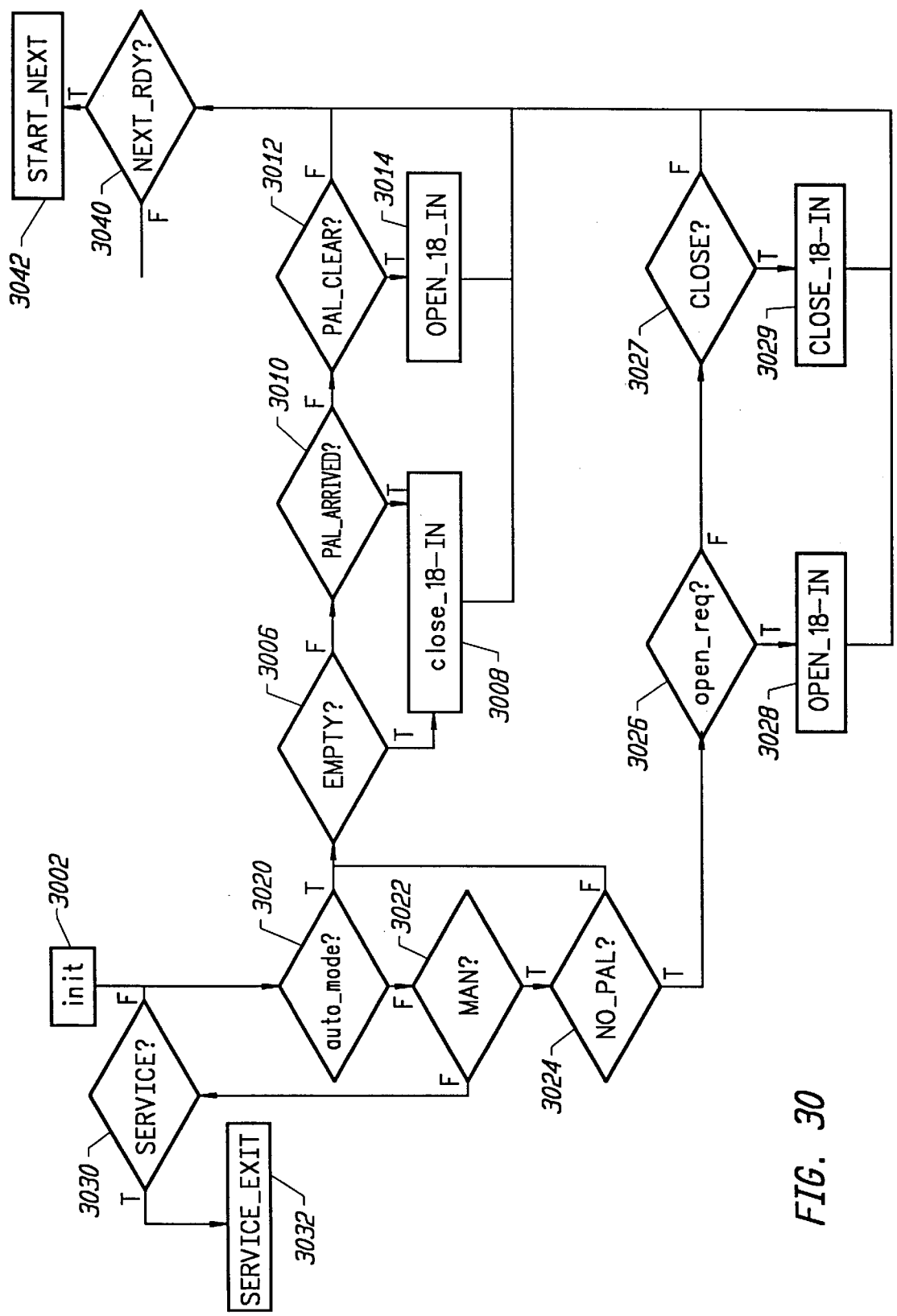
FIG. 30 is a flow chart showing the process steps for controlling a first output buffer in accordance with the system of the present invention.
Figure 31:
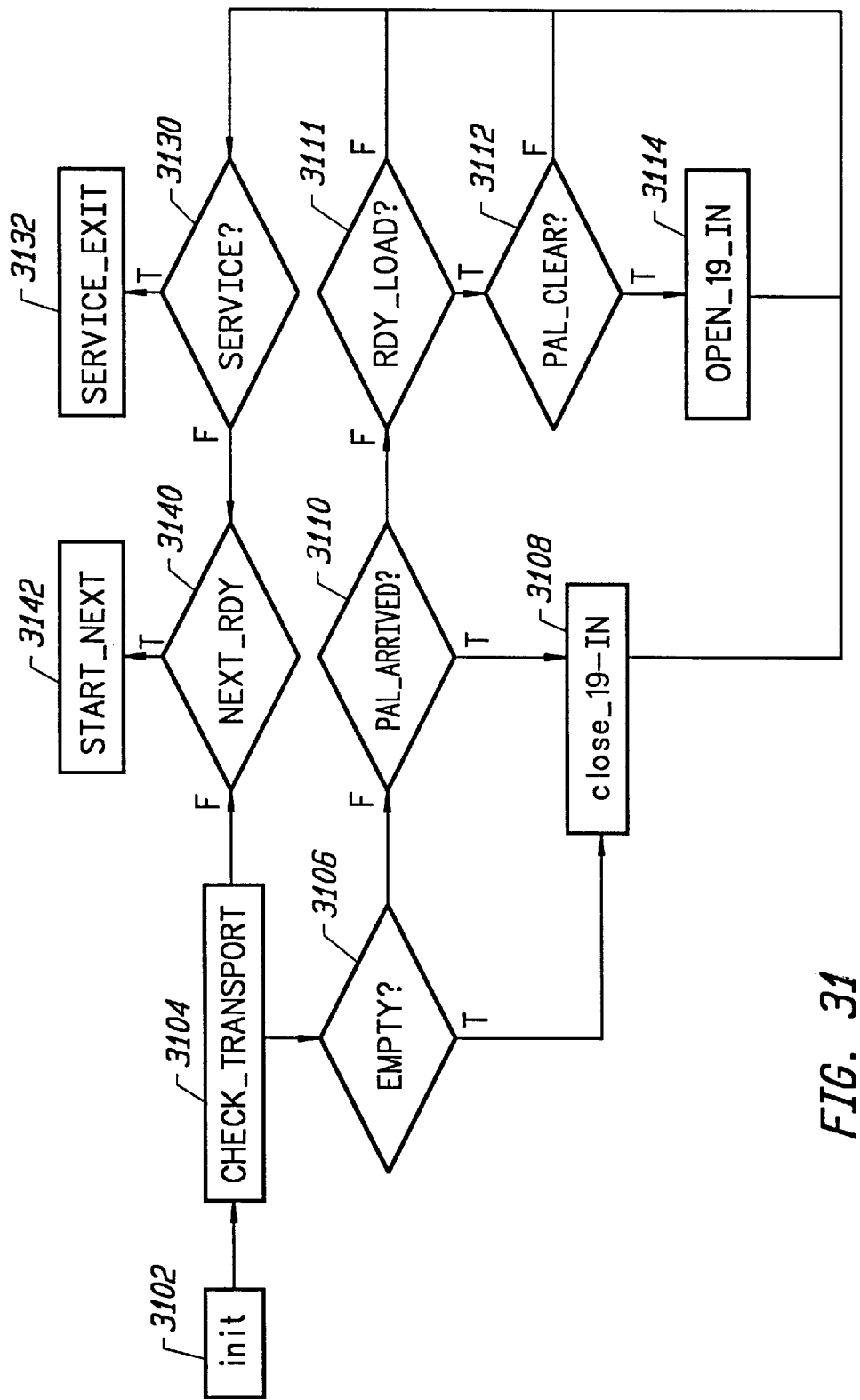
FIG. 31 is a flow chart showing the process steps for controlling a second output chamber in accordance with the system of the present invention.
Figure 32A:
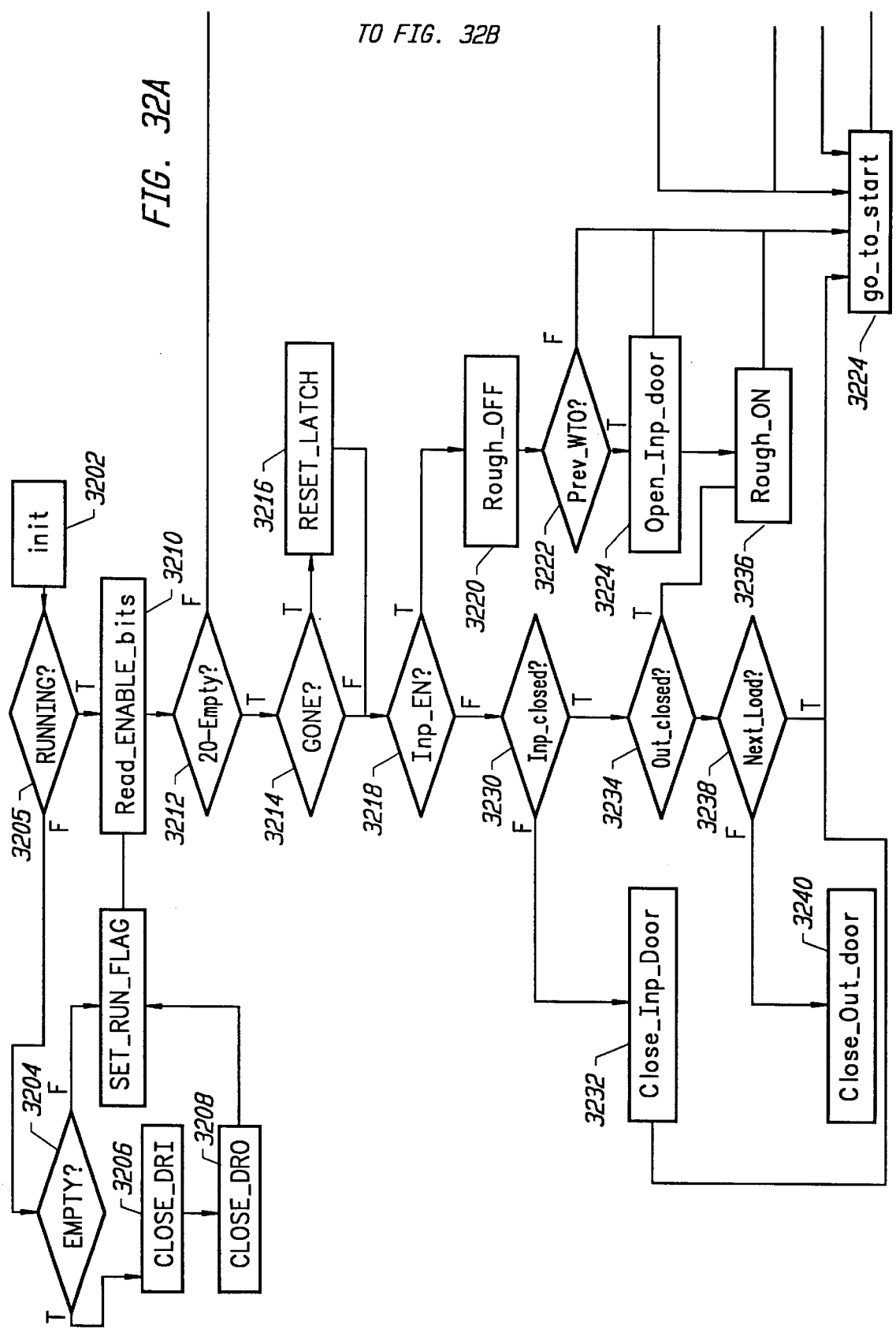
FIGS. 32A and 32B are flow charts showing the process steps for controlling an exit lock chamber in accordance with the system of the present invention.
Figure 32B:
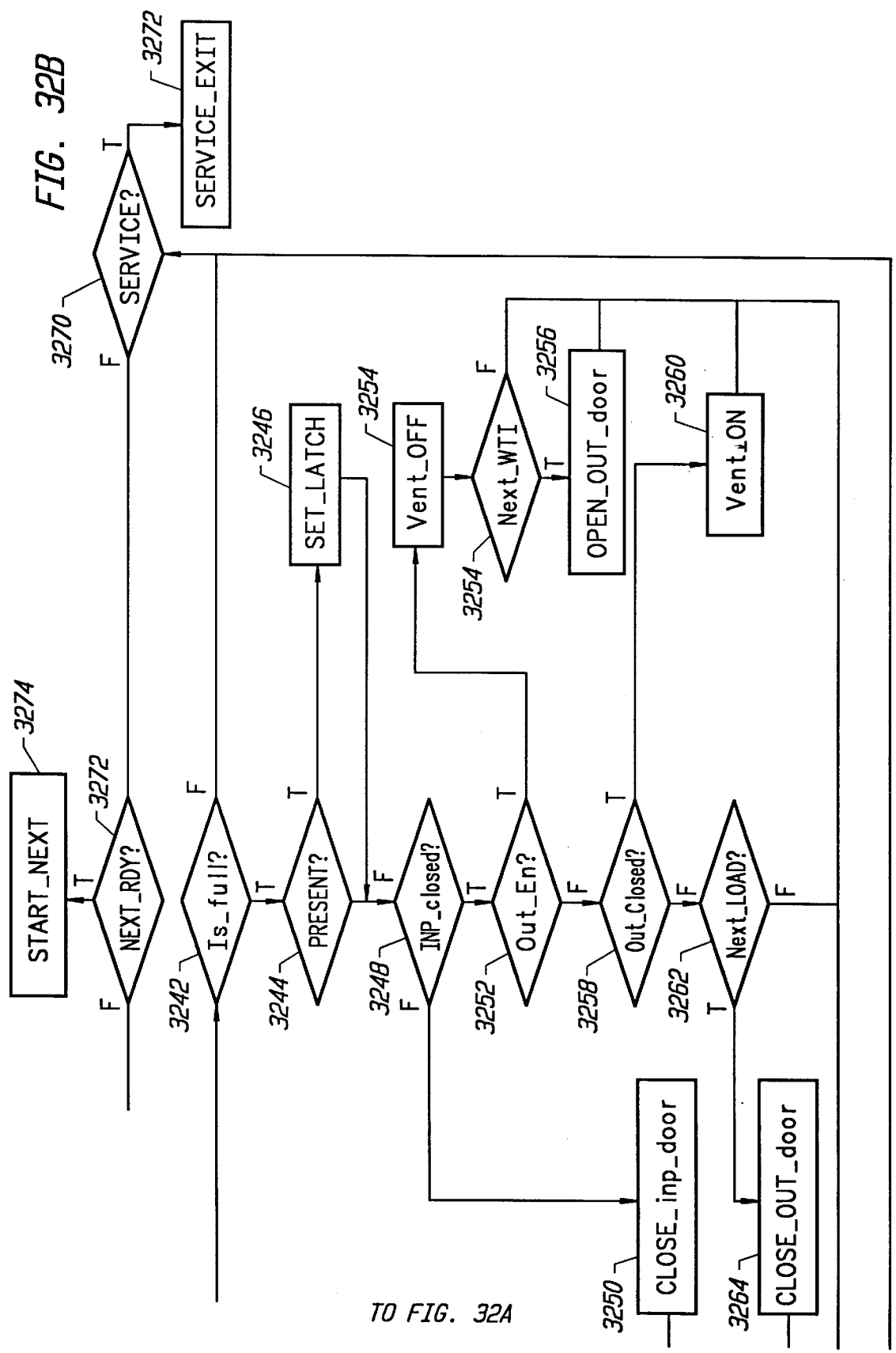

FIGS. 30, 31, and 32 show flow diagrams of the control routines for the exit buffer chambers 18 and 19, and the exit lock in chamber 20. As shown in FIG. 30, the exit buffer process begins upon initialization at step 3002 with a determination of whether an auto mode is run at step 3020. If so, a query of whether the chamber is empty is made at step 3006. If a chamber is not empty, it means a pallet has arrived in the chamber and this is detected at step 3010. In either case, if the pallet has arrived, the input door is closed at step 3008. If a pallet has not arrived, a check is made to determine whether the pallet has cleared the chamber at step 3012. If a pallet has cleared the chamber, the input door to the chamber is opened at step 3014. If not, the routine proceeds to the next ready query 3040 and start 3042.

A manual mode is provided at step 3022 which first initiates a query to determine whether a pallet is present in the chamber at step 3024. If no pallet is present in the chamber, a query is made at step 3026 to determine whether it is necessary to open the input door of chamber 18. If so, the door is opened at step 3028. If the opening of the door is not required, a check is made at step 3027 to determine whether closing is necessary, and if so, the input door to chamber 18 is closed at step 3029. A service loop is provided at step 3030 which allows choice of a service exit at step 3032.

FIG. 31 is similar to FIG. 30 and like reference numerals indicate like steps. After initialization at step 3102, a check of the transport status is made at step 3104. At step 3111, a query is made to determine if the chamber is prepared to load a pallet as a result of a query at step 3110 which indicates that a pallet has not arrived in the chamber. If in fact the chamber is prepared to load a pallet, the query at step 3112 is made to determine if a pallet has cleared the chamber, and the routine queries instructions to open chamber 9 input door at step 3114 or head to service loop 3130.

As shown in FIG. 32, the exit lock control process utilized in chamber 20 is a pump down and venting control routine similar to process 1 shown in FIG. 22. After initialization at step 3202, a running query is made at step 3205. If the process is not running, a query is made at step 3204 to determine if the chamber is empty. If the chamber is empty, the input door is shut at step 3206, and the exit door is shut at step 3208. If the chamber is not empty, or once chamber 20's output door is closed at step 3208, the run flag is set at step 3209. Subsequently, the enable bits are checked at step 3210. Again, a query is made to determine if chamber 20 is empty at step 3212. If chamber 20 is empty, step 3214 is used to determine if a pallet has been removed at the output end of apparatus 100. If so, the latch for the exit buffer is re-set at step 3216. If the pallet has not been removed from the area adjacent to the exit door of chamber 20, at step 3218, a query is made to determine whether the input door is enabled. If the input door is enabled at step 3220, the roughing pumps are turned off, and a query is made to determine whether a pallet is waiting at the output of the previous chamber (chamber 19 at step 3222). If a pallet is waiting at chamber 19, the input door is opened at step 3224, and the routine loops back to step 3210. If the input door is not enabled, a query is made at step 3230 to determine if the input door is closed. If the input door is not closed, it is closed at step 3232. If the input door is closed, a query is made to determine whether the output door is closed at step 3234. If the output door is closed, the roughing pumps are turned on at step 3236. If the output door is not closed, a query is made to determine whether there is a next pallet to be loaded into the chamber at step 3238. If so, the routine loops back to start. If a pallet is not ready to be loaded into the chamber at step 3240, the output door of chamber 20 is closed. If chamber 20 is not empty, the results of the query at step 3242 would be true, and a confirmation query that a pallet is present in chamber 20 made at step 3244, results in the exit buffer latch being set at step 3246. If a pallet is not present or once the latch is set, a query is made at step 3248 to determine whether the input door is closed. If the input door is not closed, it is closed at step 3250. At step 3252, a query is made to determine whether the output of the chamber is enabled. If so, the vent is turned off at step 3254, and a query is made at step 3254 to determine whether a pallet is waiting at the input. If a pallet is waiting at the input of chamber 20, at step 3256, the output door is enabled and the system loops back to step 3210. If, as a result of step 3252, output is not enabled, at step 3258, a query is made to determine whether the output door is closed. If the output door is closed, the vent is turned on at step 3260 and the chamber vents up to atmosphere to allow output from the chamber to be enabled. If the output door is not closed, the routine waits for a next pallet to be loaded into the chamber at step 3262. If the next load is waiting, the output door is closed at step 3264.

Processors G and H handle the servo control loops and the automatic robot loaders which are utilized to load substrates into pallets prior to the pallets being submitted into apparatus 100 for sputtering.

Figure 12:
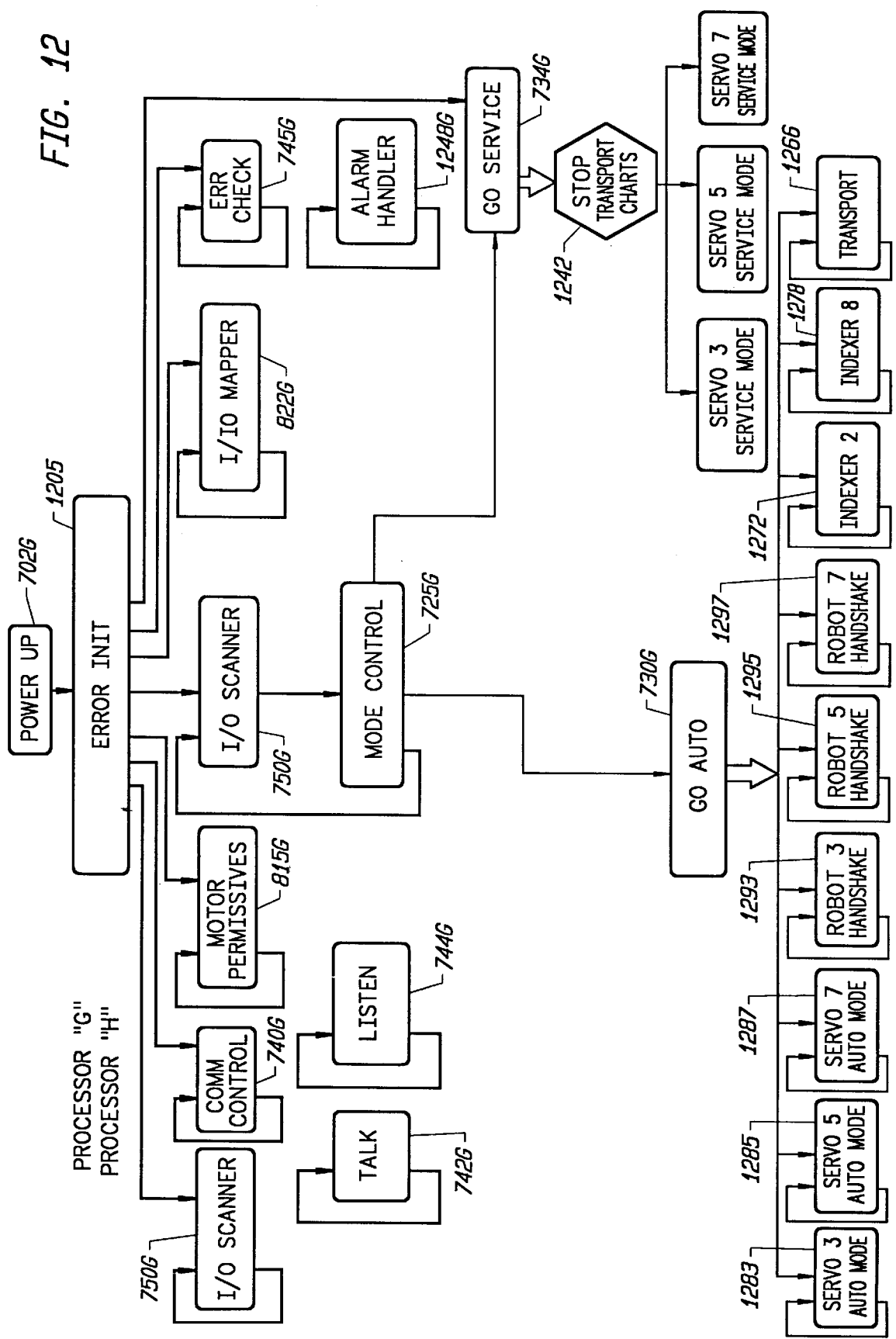
FIG. 12 is a flow diagram of the functional control routines utilized by a sixth and seventh processors, processors G and H, respectively, in accordance with the present invention.

As shown in FIG. 12, processors G and H have essentially identical control routines for controlling the load and unload robots, respectively. As shown in FIG. 12, the main difference for the control routines utilized with respect to processors G and H is in the robot control, servo loops, and indexers which are initialized in the automatic run mode at block 730G. For example, processor G controls robots 3, 5, and 7, through the use of servo loops 1283, 1295, and 1287, handshake loops 1293, 1295, and 1297, and indexer routines 1272 and 1278. Indexer routines 1272 and 1278 allow for the pallets to be rotated about the horizontal axis at the center of the pallet.

Robot 3 control loop routine 1293 is generally described as follows. Robot control loop 1293 first tests to see if the robot is active, and if not, provides an activation initialization for the particular robot. Next, the routine establishes the position of the robot loading arm, and initializes the robot loading arm to a starting position. The robot loading arm includes a clamp which engages the substrates to be loaded into the pallet, and routine 1293 locks and unlocks the clamp depending upon the position of the arm relative to the servo control loops.

The servo loops set the positioning of the robot arm based on a row-wise looping to install substrates in the pallet from top to bottom, row by row. In one embodiment of the control system, different robots are utilized to load different rows of an individual pallet, thus each pallet is loaded by more than one robot and each robot loads only specific horizontal rows of substrates into the pallet.

Finally, transport loop 1266 positions the pallet relative to the load robots to synchronize the loading sequence such that a pallet is positioned adjacent to the load (or unload) robot when a substrate is to be loaded into a particular row.

Figure 13:
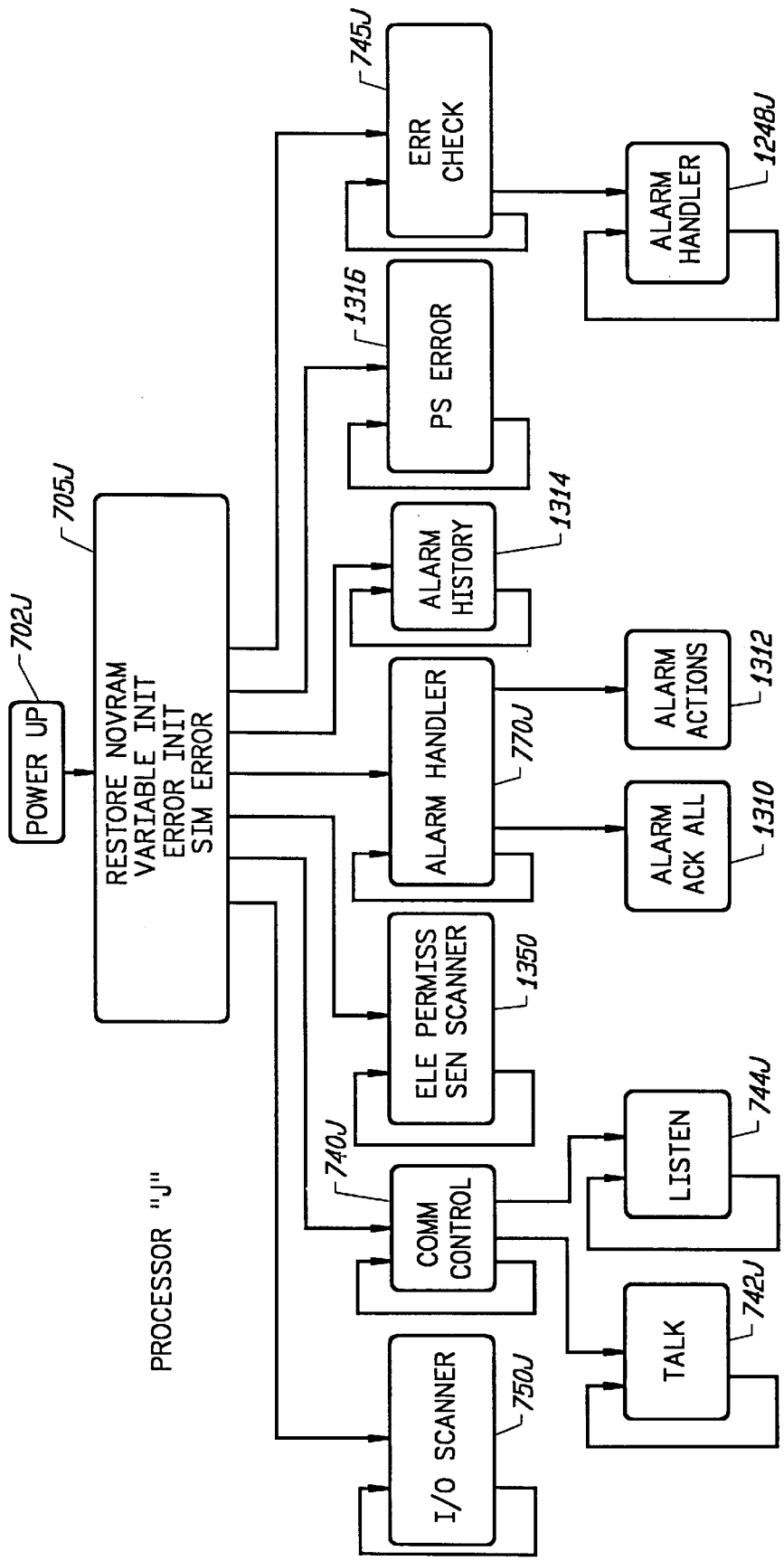
FIG. 13 is a flow diagram of the functional control routines utilized by an eighth processor, processor J, in accordance with the present invention.

FIG. 13 shows processor J which handles the global alarm and error loops to the man-machine interface.

As shown in FIG. 13, an elementary permissive block is included in a sensor scanner routine 1350, an alarm history routine is maintained, and a power supply air alarm routine 1316 is provided for the man-machine interface.

As a result of the distributed control functions of each of the processors utilized in the control system of the present invention, the system functions much more efficiently, and is able to handle much greater processing power distributed across a network. By utilizing processors which control different areas of the system, the processing of each of the substrates can be handled more efficiently and the throughput of the system can be increased. In addition, developmental time for additional systems is produced since redundancy in the programming of the functional blocks may be utilized for portions of the system having similar functions.

Moreover, software control over hardware-centered functions is allowed in the system of the present invention to give the system operator the option of overriding the hardware air signals if the operator determines that the air signal is a result of a faulty piece of hardware. This reduces system downtime, and allows the operator to determine when is a more efficient time to replace defective component parts in the system.

The many features and advantages of the present invention will be readily apparent to one of average skill in the art. Such features and advantages are intended to include all modifications and variations which will be readily obvious to one of average skill. All such modifications are intended to be within the scope of the invention as described herein and as defined in the attached claims.

What is claimed is:

1. A control system for a film deposition apparatus having a plurality of processing chambers, comprising:

a plurality of control processors, each of the plurality of processors including a memory, being coupled to a subset of the plurality of chambers, and controlling processing in said subset of the plurality of chambers; and a data structure provided in said memory including configuration data for each of said plurality of processing chambers;

wherein said apparatus includes deposition processing hardware to deposit films on a plurality of substrates passing through said plurality of processing chambers, said processing hardware being arranged into subsystems, said subsystems including a pumping system, a heating system, a transport system, and a sputtering gas control system; and wherein each of said plurality of processors controls a portion of said subsystems as the plurality of substrates are processed.

2. The control system of claim 1 further including a network coupling the plurality of processors and including a network hub, said hub and said plurality of control processors being coupled to the network such that each of said plurality of processors and said hub are in communication with all processors coupled to the network.

3. The control system of claim 2 wherein said apparatus processes a plurality of substrates which are transported through the apparatus via the transport system, the transport system including a plurality of transport stages, said transport stage including a plurality of position sensors with each said stage having at least one sensor providing an output which indicate the presence or absence of a substrate at the position sensor, and at least a subset of said plurality of control processors communicate with said sensors to establish the position of the substrate in the deposition apparatus.

4. The control system of claim 3 wherein each processor includes means for reading the output of the sensor to determine whether a substrate is positioned at the location of the sensor; and means for determining the position of the substrate at a given sensor when the output of said given sensor is unavailable, said means determining said position based on the output of one or more other sensors providing and data provided by at least one encoder associated with at least one of the sensors.

5. The control system of claim 4 wherein the control system includes control routines for enabling continued operation of the deposition apparatus when a failure is detected in at least one of the position sensors, such that the position of the substrate is indicated to the control system by the control routines and the position of the substrate can be determined based on the output of the functioning processors.

6. The control system of claim 5 further including at least one encoder provided with each transport stage, providing data on the rotation of wheels supporting each substrate at each said stage, wherein said control routines utilize the encoder data to determine the position of a substrate.

7. The control system of claim 5 wherein said control routines include timing means for determining the position of the substrate based on a rate movement of the substrate in the system.

8. The control system of claim 1 wherein each of said processors operate in parallel to process requests from a user and data input/output from the film deposition apparatus.

9. The control system of claim 1 wherein the control system includes a scanner level of routines for interpreting the output of the apparatus hardware, a permissives level of routines, and a control level of routines, the permissives level interacting with the control level to allow or inhibit control level requests from initiating control functions in the apparatus.

10. The control system of claim 1 wherein the deposition apparatus includes twenty processing chambers, and a first control processor controls processing in a subset comprising chambers 1–4, a second control processor controls processing in a subset comprising chambers 4–8, a third control processor controls processing in a subset comprising chambers 9–12, and a fourth control processor controls processing in a subset comprising chambers 13–20.

11. The control system of claim 1 wherein each processor includes means for reading the output of at least one sensor positioned in each of said plurality of processing chambers to determine whether a substrate is positioned at the location of the sensor; and means for determining the position of the substrate at a given sensor when the output of said given sensor is unavailable, said means determining said position based on the output of one or more other sensors providing and actual known position of the substrate and a rate of movement of the substrate at each transport stage of the system, and for outputting a signal.

12. The control system of claim 11 wherein each transport stage includes three sensors per processing chamber, and the means for determining the positioning of the substrate provides an output to the processors to enable other control routines operating in the system to function.

13. The control system of claim 11 wherein the means for determining is selectively enabled and disabled by the system operator.

14. A control system for a film deposition apparatus having a plurality of processing chambers, comprising:

a network hub;

a plurality of control processors, communicating via the hub, each of said plurality of processors including non-volatile memory and being coupled to a subset of the plurality of chambers and controlling processing in said subset of the plurality of chambers; and a data structure provided in said non-volatile memory including configuration data for each of said plurality of processing chambers.

15. The control system of claim 14 wherein said apparatus processes a plurality of substrates, each of said processing chambers includes a transport apparatus and at least one sensor associated with the transport apparatus, each transport apparatus for transporting one of said plurality of substrates through said chamber.

16. The control system of claim 15 including an encoder associated with each transport apparatus, and the control system includes means for determining the position of a substrate relative to a transport apparatus based on the encoder.

17. The control system of claim 15 including means for determining the position of a substrate relative to the film deposition apparatus based on a rate of movement of the substrate.

18. A control system for a film deposition apparatus, the apparatus processing including a plurality of substrates which are transported through the apparatus via a transport system, the transport system including a plurality of transport stages, each said stage having at least one sensor providing an output, the system including:

means for reading the output of each sensor to determine whether a substrate is positioned at the location of the sensor; and means for determining the position of the substrate at a given sensor when the output of said given sensor is unavailable, said means determining said position based on the output of at least one functioning sensor providing an actual known position of the substrate and the rate of movement of the substrate at each transport stage of the system;

wherein each transport stage includes three sensors per processing chamber, and the means for determining the positioning of the substrate provides an output to the processors to enable other control routines operating in the system to function.

19. The control system of claim 18 wherein the film deposition apparatus including a plurality of process chambers, and the means for determining includes a plurality of control processors, each of the plurality of processors including a memory, being coupled to a subset of the plurality of chambers, and controlling processing in said subset of the plurality of chambers; and a data structure provided in said memory including configuration data for each of said plurality of processing chambers.

20. The control system of claim 19 wherein said plurality of processors are coupled to receive the output of the sensor, and wherein said means for determining includes determining the position of the substrate relative to the rate of the substrate and the time the substrate has moved.

21. The control system of claim 19 wherein said plurality of processors are coupled to receive the output of the sensor, and wherein said means for determining further includes an encoder associated with each of said transport stages, said means determining the position of the substrate relative to data provided by said encoder.

22. The control system of claim 18 wherein the means for determining is selectively enabled and disabled by the system operator.

23. The control system of claim 18 wherein said sensors are provided at the input, midpoint and endpoint of each of said plurality of transport stages.

24. An apparatus for controlling an in-line sputtering machine having an input end, an output end, a plurality of processing chambers between the input end and the output end, a pumping system, a heating system, a transport system, and a sputtering gas control system, the transport system including a plurality of position sensors, each said system cooperating to process a plurality of substrates as the substrates pass from the input end to the output end, comprising:

a network, including a network hub; and a plurality of processors including non-volatile storage means for storing configuration data for said apparatus, coupled to the hub and network, each of said plurality of processors being coupled to a subset of the plurality of chambers and controlling a portion of each of said pumping, heating, transport and sputtering gas systems of the sputtering machine relative to said subset of chambers, such that each said processor controls processing in a subset of said chambers of the sputtering apparatus, at least one of said processors including means for reading the output of said sensors to determine whether a substrate is positioned at the sensor; and means for determining the position of the substrate at a given sensor when the output of one of said sensors is unavailable, said means determining said position based on the output of at least one functioning sensor providing an actual known position of the substrate and the rate of movement of the substrate at each transport stage of the system, and for outputting a signal.

25. The control system of claim 24 wherein each of said plurality of processors controls a portion of said systems as the plurality of substrates are processed.

26. The control system of claim 24 wherein the control system includes a scanner level of routines for interpreting the output of the apparatus hardware, a permissives level of routines, and a control level routines, the permissive level interacting with the control level to allow or inhibit operator or control level requests from initiating control functions in the apparatus.

27. The control system of claim 24 wherein said plurality of position sensors indicate the presence or absence of a substrate at the position sensors, and a subset of said plurality of processors communicate with each said sensor to establish the position of the substrate in the deposition apparatus.

28. The control system of claim 24 wherein the control system includes control routines for enabling continued operation of the deposition apparatus when a failure is detected in at least one of the position sensors, such that the position of the substrate is indicated to the control system by the control routines and the position of the substrate can be determined based on the output of the functioning processors.

* * * * *